(12) United States Patent
Kumta et al.

(10) Patent No.: US 10,435,803 B2
(45) Date of Patent: Oct. 8, 2019

(54) NON-NOBLE METAL BASED ELECTRO-CATALYST COMPOSITIONS FOR PROTON EXCHANGE MEMBRANE BASED WATER ELECTROLYSIS AND METHODS OF MAKING

(71) Applicant: UNIVERSITY OF PITTSBURGH—OF THE COMMONWEALTH SYSTEM OF HIGHER EDUCATION, Pittsburgh, PA (US)

(72) Inventors: Prashant N. Kumta, Pittsburgh, PA (US); Karan Sandeep Kadakia, Pittsburgh, PA (US); Moni Kanchan Datta, Pittsburgh, PA (US); Oleg Velikokhatnyi, Pittsburgh, PA (US); Prashanth Jampani Hanumantha, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 16/032,139

(22) Filed: Jul. 11, 2018

(65) Prior Publication Data
US 2018/0320278 A1 Nov. 8, 2018

Related U.S. Application Data

(60) Division of application No. 15/387,100, filed on Dec. 21, 2016, now Pat. No. 10,041,179, which is a (Continued)

(51) Int. Cl.
*B01J 23/00* (2006.01)
*C25B 11/04* (2006.01)
(Continued)

(52) U.S. Cl.
CPC ............ *C25B 11/0484* (2013.01); *C25B 1/10* (2013.01); *C25B 11/0405* (2013.01);
(Continued)

(58) Field of Classification Search
CPC ... C25B 11/0484; C25B 11/0405; C25B 1/10; H01M 4/881; H01M 4/9016;
(Continued)

(56) References Cited

PUBLICATIONS

Velikokhatnyi et al., "Ab-Initio Study of Fluorine-Doped Tin Dioxide: A Prospective Catalyst Support for Water Electrolysis", Physica B 406 (2011) 471-477, Nov. 6, 2010.
(Continued)

*Primary Examiner* — Haytham Soliman
(74) *Attorney, Agent, or Firm* — Eckert Seamans Cherin & Mellott, LLC; Carol A. Marmo

(57) ABSTRACT

The invention provides electro-catalyst compositions for an anode electrode of an acid mediated proton exchange membrane-based water electrolysis system. The compositions include a noble metal component selected from the group consisting of iridium oxide, ruthenium oxide, rhenium oxide and mixtures thereof, and a non-noble metal component selected from the group consisting of tantalum oxide, tin oxide, niobium oxide, titanium oxide, tungsten oxide, molybdenum oxide, yttrium oxide, scandium oxide, cooper oxide, zirconium oxide, nickel oxide and mixtures thereof. Further, the non-noble metal component can include a dopant. The dopant can be at least one element selected from Groups III, V, VI and VII of the Periodic Table. The compositions can be prepared using any solution based methods involving a surfactant approach or a sol gel approach. Further, the compositions are prepared using noble metal and non-noble metal precursors. Furthermore, a thin film containing the compositions can be deposited onto a substrate to form the anode electrode.

5 Claims, 83 Drawing Sheets

Related U.S. Application Data continuation-in-part of application No. 13/961,327, filed on Aug. 7, 2013, now Pat. No. 9,561,497.

(60) Provisional application No. 61/680,857, filed on Aug. 8, 2012.

(51) Int. Cl.
  *C25B 1/10* (2006.01)
  *H01M 4/88* (2006.01)
  *H01M 4/90* (2006.01)
  *B82Y 30/00* (2011.01)

(52) U.S. Cl.
  CPC ......... *H01M 4/881* (2013.01); *H01M 4/8828* (2013.01); *H01M 4/9016* (2013.01); *H01M 4/9075* (2013.01); *B82Y 30/00* (2013.01); *Y02E 60/366* (2013.01)

(58) Field of Classification Search
  CPC . H01M 4/9075; H01M 4/8828; Y02E 60/366; B82Y 30/00
  USPC .......................................................... 502/325
  See application file for complete search history.

(56) References Cited

PUBLICATIONS

Velikokhatnyi et al., "Exploring Calcium Tantalates and Niobates as Prospective Catalyst Supports for Water Electrolysis", Journal of Power Sources 202 (2012) 190-199, Nov. 7, 2011.

Kadakia et al., "Novel (Ir,Sn,Nb)O2 Anode Electrocatalysts with Reduced Noble Metal Content for PEM Based Water Electrolysis", SciVerse ScienceDirect, International Journal of Hydrogen Energy 37 (2012) 3001-3013, Nov. 8, 2011.

Kadakia et al., "Novel F-Doped IrO2 Oxygen Evolution Electrocatalyst for PEM Based Water Electrolysis", Journal of Power Sources 222 (2013) 313-317, Aug. 20, 2012.

Velikokhatnyi et al., "Theoretical Study of Magnesium and Zinc Tantalates and Niobates as Prospective Catalyst Supports for Water Electrolysis", Journal of the Electrochemical Society, 159 (10) F607-F616, Aug. 29, 2012.

Datta et al., "High Performance Robust F-Doped Tin Oxide Based Oxygen Evolution Electro-Catalysts for PEM Based Water Electrolysis", Journal of Materials Chemistry A, 2013, 1, 4026-4037, Jan. 17, 2013.

Kadakia et al., "High Performance Fluorine Doped (Sn,Ru)O2 Oxygen Evolution Reaction Electro-Catalysts for Proton Exchange Membrane Based Water Electrolysis", Journal of Power Sources 245 (2014) 362-370, Jun. 17, 2013.

Marshall et al., "Preparation and characterisation of nanocrystalline IrxSn1-xO2 electrocatalytic powders", Materials Chemistry and Physics 94 (2005) pp. 226-232, Published by Elsevier B.V.

Ardizzone et al., "Composite ternary SnO2—IrO2—Ta2O5 oxide electrocatalysts", Journal of Electroanalytical Chemistry 589 (2006) pp. 160-166, Published by Elsevier B.V.

Kim et al., "Transparent conducting F-doped SnO2 thin films grown by pulsed laser deposition", Thin Solid Films 516 (2008) pp. 5052-5056, Published by Elsevier B.V.

NON-NOBLE METAL BASED ELECTRO-CATALYST COMPOSITIONS FOR PROTON EXCHANGE MEMBRANE BASED WATER ELECTROLYSIS AND METHODS OF MAKING

CROSS REFERENCE TO RELATED APPLICATIONS

This application is a divisional of U.S. patent application Ser. No. 15/387,100, filed Dec. 21, 2016, entitled "NON-NOBLE METAL BASED ELECTRO-CATALYST COMPOSITIONS FOR PROTON EXCHANGE MEMBRANE BASED WATER ELECTROLYSIS AND METHODS OF MAKING, which is a continuation-in-part (CIP) of U.S. patent application Ser. No. 13/961,327, filed Aug. 7, 2013, entitled "Non-Noble Metal Based Electro-Catalyst Compositions for Proton Exchange Membrane Based Water Electrolysis and Methods of Making", now U.S. Pat. No. 9,561,497, issued on Feb. 7, 2017, which claims priority under 35 U.S.C. § 119(e) to U.S. Provisional Patent Application Ser. No. 61/680,857, filed Aug. 8, 2012, entitled "Novel Low Cost Electrocatalyst and Catalyst Supports for Water Electrolysis with Reduced Noble Metal Content". The contents of which are incorporated in their entirety.

GOVERNMENT SUPPORT

This application was made with government support under grant #DE-SC0001531 awarded by the Department of Energy (DOE). The government has certain rights in the invention.

1. FIELD OF THE INVENTION

This invention relates to electro-catalyst compositions including a combination of noble metal and non-noble metal oxides for proton exchange membrane-based water electrolysis, and methods of preparing the electro-catalyst compositions and forming electrodes therefrom.

2. BACKGROUND

Hydrogen is considered an attractive alternative to fossil fuels, particularly, over the past decade and as the most lightweight fuel, it has the potential to provide a supply of clean, reliable and affordable energy to meet growing demands. However, there have been problems associated with the commercialization of hydrogen fuel, such as, the inability to economically generate clean and pure hydrogen combined with cost-effective storage and distribution.

One approach to hydrogen production involves splitting water using electricity, i.e., water electrolysis. In this approach, electric current is passed through water which splits the water into hydrogen and oxygen. In certain embodiments, electricity-induced splitting of water is conducted using alkaline, neutral or acidic pH mediated proton exchange membrane (PEM)-based water electrolysis.

Electricity-induced splitting of water using alkaline, neutral or acidic pH mediated proton exchange membrane (PEM)-based water electrolysis is potentially an advantageous approach for hydrogen production because it offers essentially no greenhouse gas emission or toxic byproducts, particularly if the electric current is generated using renewable energy sources such as wind, solar, geothermal, hydropower, or nuclear energy sources.

In principle, PEM-based water electrolyzers are built-up similar to PEM fuel cells, however, they work in a different manner. During PEM fuel cell operation, oxygen reduction takes place at the cathode and hydrogen oxidation occurs at the anode of the fuel cell. In summary, water and electrical current is produced. In a PEM-based water electrolyzer, the current flow and the electrodes are reversed and water decomposition takes place. Oxygen evolution occurs at the anode (abbreviated "OER", i.e., oxygen evolution reaction) and reduction of protons (W) which travel through the membrane occurs at the cathode. As a result, water is decomposed into hydrogen and oxygen by means of the electric current.

The capital costs for current electrolyzer technology is a significant barrier to hydrogen production. Thus, progress in the production of hydrogen fuel by water electrolysis has been slow due to prohibitive costs of current electrolyzer technology. The high capital costs of current electrolyzers is due to one or more of the following: deployment of expensive noble metal-based electro-catalysts (e.g., $IrO_2$, $RuO_2$, Pt), use of relatively small and comparatively low efficiency systems, customized power electronics and labor intensive fabrication.

Rutile-type noble metal oxides, such as $IrO_2$ and $RuO_2$, are well known for OER anode electrode catalysts in alkaline and PEM-based water electrolysis. However, the anodic over-potential and the cell resistance in electrolysis contribute to a majority of the losses observed in catalytic performance. In addition, $IrO_2$ and $RuO_2$ electro-catalysts undergo electrochemical or mechanical degradation under extreme and highly corrosive electrochemical environments prevalent in acid assisted water electrolysis which reduces the performance with time and diminishes the service life of the electrode during OER.

The use of non-precious metal catalysts for electrodes in PEM-based electrolysis cells would decrease the overall costs of hydrogen production. It is, however, unlikely that a non-noble metal catalyst would be effective to produce hydrogen in a PEM-based electrolysis system. Although, it is contemplated that a decrease in the noble metal loading (e.g., and the use of a purely non-noble metal in combination with the noble metal) may produce an electrode catalyst capable of demonstrating activity and stability comparable to a pure noble metal catalyst for a reduced cost.

There are a limited number of materials that are known to exhibit the desired electrical conductivity, as well as the electrochemical, structural, physical and chemical stability needed in the 1.8 to 2.0 V potential window and therefore, would be suitable for use in producing a non-noble metal-containing catalyst electrode for PEM-based water electrolysis. Thus, it is an object of this invention to develop highly efficient and stable electro-catalyst compositions which include a combination of non-noble metal and noble metal oxides to significantly reduce the amount expensive noble metal required for use as anode electrodes in PEM-based water electrolysis.

SUMMARY OF THE INVENTION

In one aspect, the invention provides an electro-catalyst composition for an anode electrode of a proton exchange membrane-based water electrolysis system. The composition includes a noble metal component selected from the group consisting of iridium oxide, ruthenium oxide, rhenium oxide and mixtures thereof, and a non-noble metal component selected from the group consisting of tantalum oxide, tin oxide, niobium oxide, titanium oxide, tungsten oxide, molybdenum oxide, yttrium oxide, scandium oxide, copper oxide, zirconium oxide, nickel oxide, and mixtures thereof.

The non-noble metal component can also include a dopant selected from the group consisting of at least one element from Group III, V, VI and VII of the Periodic Table. The dopant can be selected from the group consisting of fluorine, chlorine, bromine, iodine, sulfur, selenium, tellurium, and mixtures thereof. The dopant can be present in an amount from greater than 0 to 20 weight percent based on weight of the composition.

The noble metal component can be present in an amount of from greater than zero to 99 weight percent, based on weight of the composition. The non-noble metal component can be present in an amount of from greater than zero to 99 weight percent, based on weight of the composition.

The non-noble metal component and the noble metal component can form a complete oxide alloy or a complete solid solution. The electro-catalyst composition of the invention mimics the electronic structure of a noble metal electro-catalyst absent of non-noble metal.

The composition can be in the form of a nanocrystalline thin film, nanorods, nanoplates, nanoshells, nanospheres, any nano-scale morphology, or combinations thereof, at least partially coated on a current collector substrate.

The composition can have a general formula selected from one of $N_xM_{1-x}O_2$ and $N_xM_{1-x}O_2$:D wherein N represents iridium, ruthenium, rhenium or mixtures thereof, M represents tantalum, tin, niobium, titanium, tungsten, molybdenum, yttrium, scandium, copper, zirconium, nickel, or mixtures thereof. D represents at least one element selected from Group III, V, VI, or VII of the Periodic Table and x is a value from greater than zero to 99% (i.e., greater than 0 to 0.99) based on weight of the composition. Further, the composition can have a general formula selected from one of $Ir_{1-2x}Sn_xM_xO_2$ and $Ir_{1-2x}Sn_xM_xO_2$:D wherein M represents tantalum, niobium, titanium, tungsten, molybdenum, yttrium, scandium, copper, zirconium, nickel, or mixtures thereof. D represents at least one element selected from Group III, V, VI, or VII of the Periodic Table and x is a value from greater than zero to 49.5% (i.e., greater than 0 to 0.495) based on weight of the composition.

In another aspect, the invention provides a method for preparing an electro-catalyst composition for an anode electrode in a proton exchange membrane-based water electrolysis system. The method includes preparing a surfactant in solution, adding an ammonium compound to the surfactant in solution to form a first mixture, preparing a non-noble metal precursor in solution, combining the first mixture and the non-noble metal precursor in solution to form a first precipitate, separating and drying the first precipitate to form a non-noble metal oxide powder, preparing a noble metal precursor in solution, combining the non-noble metal oxide powder with the noble metal precursor in solution to form a second mixture, and separating and drying a precipitate from the second mixture to form the electro-catalyst composition.

In still another aspect, the invention provides a method for preparing an electro-catalyst composition for an anode electrode in a proton exchange membrane-based water electrolysis system. The method includes obtaining an ammonium compound, preparing a non-noble metal precursor in solution, combining the ammonium compound and the non-noble metal precursor in solution to form first a precipitate, separating the first precipitate, dispersing the first precipitate in solvent to form a sol gel, drying the sol gel to form a non-noble metal oxide powder, preparing a noble metal precursor in solution, combining the non-noble metal oxide powder with the noble metal precursor in solution to form a second mixture, and separating and drying a precipitate from the second mixture to form the electro-catalyst composition.

The aforementioned methods can also include doping the non-noble metal oxide powder with a dopant precursor containing at least one element selected from the group consisting of Group III, V, VI and VII of the Periodic Table to form a doped non-noble metal oxide powder.

The surfactant can be cetyltrimethylammonium bromide or any other amphiphilic surfactant. The ammonium compound can be ammonium hydroxide. The non-noble metal precursor can be selected from tin chloride, niobium chloride, any other organometallic, metallo-organic, or inorganic salts of tin, niobium and other transition metals, and mixtures thereof. The noble metal precursor can be iridium chloride, any other Ir precursor, and mixtures thereof. The solvent can be hydrogen peroxide. The dopant precursor for fluorine can be trifluoroacetic acid or other organometallic, as well as inorganic salts of fluorine.

The aforementioned methods can also include applying a thin film of the electro-catalyst composition to a current collector substrate to form an anode electrode.

BRIEF DESCRIPTION OF THE DRAWINGS

A further understanding of the invention can be gained from the following description of the preferred embodiments when read in conjunction with the accompanying drawings in which:

FIG. 31a is a plot showing electronic density of states for $CaNb_2O_6$ doped with As;

FIG. 34 is a plot showing cohesive energy $-E_{coh}$ for all the materials in eV/at;

DETAILED DESCRIPTION OF THE PREFERRED EMBODIMENTS

Figure 1:
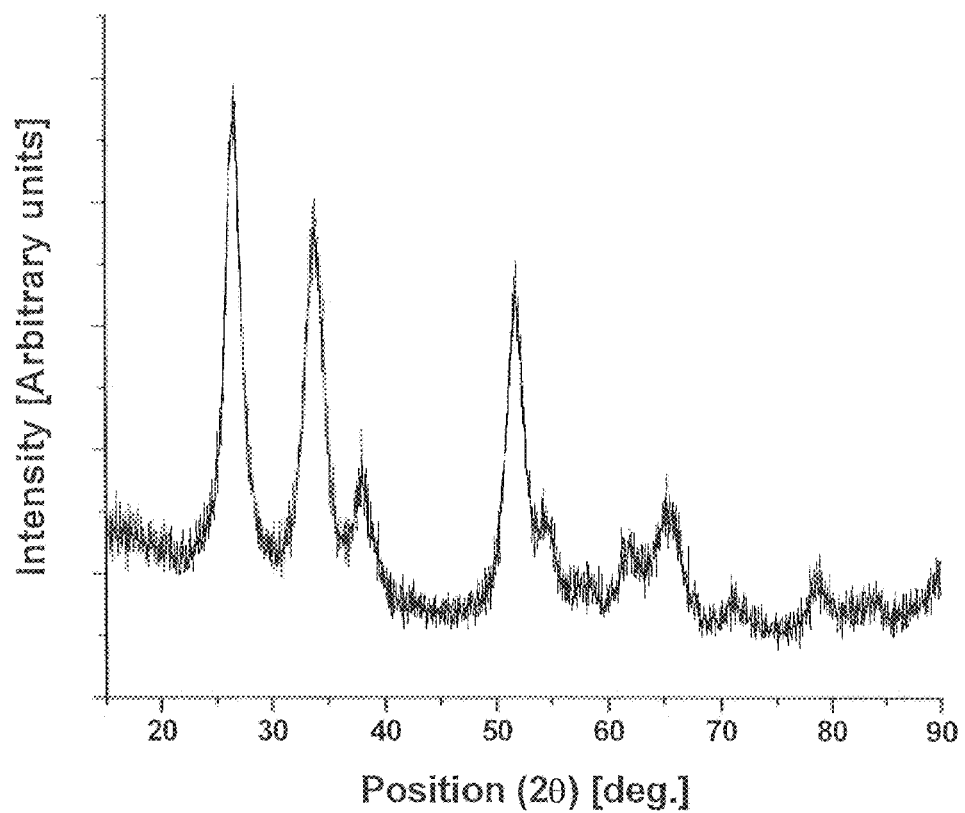
FIG. 1 is a XRD pattern of $SnO_2$ and 10% fluorine doped $SnO_2$.

The invention relates to electro-catalyst compositions for anode electrodes in proton exchange membrane (PEM)-based water electrolysis. The compositions include a noble metal component and a non-noble metal component. It is an object of this invention for the presence of the non-noble metal component to reduce the amount of the precious noble metal loading required, without decreasing the electrochemical activity as compared to pure noble metal oxide electro-catalysts that are known in the art. The compositions also demonstrate equivalent or improved corrosion stability in oxygen reduction processes, as compared to known pure noble metal oxide electro-catalysts. The compositions can be used to at least partially coat a support or substrate, such as but not limited to a current collector, e.g., titanium (Ti) foil, for use as an anode electrode in PEM-based water electrolysis.

The noble metal component includes a noble metal oxide, such as iridium oxide ($IrO_2$,), ruthenium oxide ($RuO_2$) rhenium oxide, ($ReO_2$) and mixtures thereof. The non-noble metal component includes a transition metal oxide and can be selected, for example, from tin oxide ($SnO_2$), niobium oxide ($Nb_2O_5$), tantalum oxide ($Ta_2O_5$), titanium oxide ($TiO_2$), tungsten oxide ($WO_x$), molybdenum oxide ($MoO_3$), yttrium oxide ($Y_2O_3$), scandium oxide ($Sc_2O_3$), copper oxide (CuO), zirconium oxide ($ZrO_2$), nickel oxide (NiO), and mixtures thereof. The non-noble metal component can include a dopant. The dopant can be selected from various elements known in the art which can enhance electronic conductivity and stability of the composition. The dopant can be an electron donor element. Suitable dopants include the elements in Groups III, V, VI and VII of the Periodic Table, and mixtures thereof. In certain embodiments, the transition metal oxide is doped with fluorine, chlorine, bromine, iodine, sulfur, selenium, tellurium or mixtures thereof. Without intending to be bound by any particular theory, it is believed that doped transitional metal oxide has a higher electronic conductivity and therefore, should provide improved stability to a catalyst support. Further, the doped transition metal oxide exhibits electro-catalytic activity. The presence of the dopant is effective to modify the electronic structure of the transitional metal oxides to mimic the electronic structure of noble metals, making the catalysts electro-active. The addition of the dopant results in a multi-component solid solution mimicking the electronic structure of a highly active noble metal oxide electro-catalyst.

In certain embodiments, the composition includes the following general formulas for undoped and doped electro-catalysts respectively:

$$N_xM_{1-x}O_2 \text{ and } N_xM_{1-x}O_2\text{:D}$$

wherein N represents Ir, Ru, Re or mixtures thereof, M represents Sn, Nb, Ta, Ti, W, Mo, Y, Sc, Cu, Zr, Ni or mixtures thereof, D represents at least one element from Groups III, V, VI and VII of the Periodic Table, such as but not limited to Cl, Br, I, S, Se, Te, or mixtures thereof, and x is a value from greater than zero to 99% (i.e., greater than 0 to 0.99) based on weight of the composition.

In certain embodiments, the composition can include the following general formulas for undoped and doped electro-catalyst, respectively:

$$Ir_{1-x-y}Sn_xM_yO_2 \text{ and } Ir_{1-x-y}Sn_xM_yO_2\text{:D}$$

wherein M represents tantalum, niobium, titanium, tungsten, molybdenum, yttrium, scandium, copper, zirconium, nickel, or mixtures thereof. D represents at least one element selected from Group III, V, VI, or VII of the Periodic Table, each of x and y is independently a value from greater than zero to 99% (i.e., greater than 0 to 0.99), and x+y is less than or equal to 99% (i.e., 0.99) based on weight of the composition.

Further, in certain embodiments, the composition can include the following general formulas for undoped and doped electro-catalyst, respectively:

$$Ir_{1-2x}Sn_xM_xO_2 \text{ and } Ir_{1-2x}Sn_xM_xO_2\text{:D}$$

wherein M represents tantalum, niobium, titanium, tungsten, molybdenum, yttrium, scandium, copper, zirconium, nickel, or mixtures thereof. D represents at least one element selected from Group III, V, VI, or VII of the Periodic Table and x is a value from greater than 0% to 49.5% (i.e., greater than 0 to 0.495) based on the weight of the composition.

Furthermore, in certain embodiments, the composition can include the following general formula for doped electro-catalysts:

$$Ir_{1-x}M_xO_2\text{:F}$$

wherein M represents tantalum, niobium, titanium, tungsten, molybdenum, yttrium, scandium, copper, zirconium, nickel, or mixtures thereof, and x is a value from greater than 0 to 99% (i.e., greater than 0 to 0.99) based on weight of the composition.

The amount of the noble metal component and the non-noble metal component can vary. In certain embodiments, the noble metal component can constitute from greater than 0 to 99 weight percent based on weight of the composition and the non-noble metal component can constitute from greater than 0 to 99 weight percent based on weight of the composition. Further, the amount of dopant can vary. In certain embodiments, the dopant can be present in an amount from greater than 0 to 20 weight percent based on weight of the composition.

The composition of the invention can include a binary oxide composition or a ternary oxide composition. In a ternary oxide composition, the noble metal component can include one noble metal oxide, such as Ir, and the non-noble metal component can include two non-noble metal oxides, such as Sn and Nb. The compositions are typically prepared using a surfactant approach or a sol gel approach. Both of these approaches are described in detail in the Examples provided herein. In general, a solid solution of the noble metal and non-noble metal components are formed and then heat treated to form a powder.

In accordance with a surfactant approach, an amphiphilic surfactant such as, but not limited to cetyltrimethylammonium bromide (CTAB) in solution, e.g., substantially dissolved in water, and stirred to produce a substantially homogeneous solution. An ammonium compound, such as but not limited to ammonium hydroxide ($NH_4OH$), for example, can be added to the solution to form a mixture. An inorganic, organometallic, metallo-organic or non-noble metal precursor in solution is prepared, for example, tin chloride ($SnCl_2$) or niobium chloride ($NbCl_5$) is substantially dissolved in water and introduced into the CTAB and $NH_4OH$ mixture. Following stirring, a precipitate is formed and separated from solution by centrifuging and washing in order to remove chlorine traces and impurities. The precipitate is dried, typically at room temperature, and then heat treated to form a non-noble metal oxide, such as tin oxide or niobium oxide.

In certain embodiments, the non-noble metal precursor includes tin chloride, niobium chloride, as well as any other inorganic, or organometallic, or metallo-organic salts of tin, niobium and other transition metals, or mixtures thereof.

In certain embodiments, the non-noble metal oxide is doped with an element such as, but not limited to fluorine. A dopant precursor, such as but not limited to ammonium fluoride, tetralkyl ammonium fluoride wherein the alkyl group can be ethyl, methyl, butyl or higher order alkyl group or mixtures thereof, is combined with the inorganic, non-noble metal precursor.

The non-noble metal oxide can be combined with a noble metal precursor in solution to synthesize a noble metal-containing material. For example, iridium chloride can be added to ethanol, stirred for complete dissolution and combined with the non-doped or doped tin oxide to form a mixture. The mixture is dried and then heat treated to form $Ir_xSn_{1-x}O_2$ or to form $Ir_xSn_{1-x}O_2$:F, respectively, wherein x is from 0.2 to 0.8 and wherein F is present in an amount of from greater than 0 to 20 weight percent based on weight of the composition.

In certain embodiments, the noble metal precursor includes iridium chloride, any other Ir precursor or mixtures thereof.

In accordance with a sol gel approach, for example, niobium chloride ($NbCl_5$) can be employed as an inorganic, non-noble metal precursor for synthesis of a non-noble metal oxide, i.e., niobium oxide. The niobium chloride is dissolved in solvent, such as but not limited to alcohol, e.g., ethanol, and added to an ammonium compound, e.g., ammonium hydroxide, in solution. Precipitate is formed, separated and washed, as above-described. The precipitate is then dispersed in a solvent, e.g., solution of hydrogen peroxide, and stirred until a (clear yellow) sol is obtained. The sol is heated to form an amorphous, high surface area gel and dried to form niobium oxide powder.

In certain embodiments, the niobium oxide is doped with 10 weight percent fluorine by using trifluoroacetic acid as a fluorine precursor. The trifluoroacetic acid is combined with niobium chloride and ethanol (as above-described) to subsequently form fluorine doped niobium oxide. The non-doped and doped niobium oxide can be used to synthesize a material comprising iridium. For example, iridium chloride is added to ethanol, stirred for complete dissolution and combined with the non-doped niobium oxide and the doped niobium oxide to form a mixture. The mixture is dried and then heat treated to form $Ir_xNb_{1-x}O_2$ and $Ir_xNb_{1-x}O_2$:F, respectively, wherein x is from 0.2 to 0.8 and wherein F is present in an amount of from greater than 0 to 20 weight percent based on weight of the composition.

In certain embodiments, the dopant precursor includes trifluoroacetic acid, any other trifluoro organic acid, or mixtures thereof.

For a ternary oxide composition, for example, a solid solution of iridium oxide ($IrO_2$), tin oxide ($SnO_2$) and niobium oxide ($NbO_2$) of compositions $(Ir_{1-2x}Sn_xNb_x)O_2$ can be synthesized by thermal decomposition of a mixture of metal salt precursors on Ti foil as a thin film anode electrocatalyst for PEM-based electrolysis. In this embodiment, x=0, 0.125, 0.20, 2.25, 0.30, 0.35, 0.40, 0.425 and 0.50. The metal salt precursors can include a mixture of $IrCl_4$, $SnCl_2 \cdot 2H_2O$ and $NbCl_5$ ethanol solution. It has been shown that $(Ir_{1-2x}Sn_xNb_x)O_2$ of composition up to x=0.30 [$(Ir_{0.40}Sn_{0.30}Nb_{0.30})O_2$] shows similar electrochemical activity compared to pure iridium oxide (x=0) resulting in approximately 60 mol percent reduction in noble metal content. Further, it has been shown that $(Ir_{1-2x}Sn_xNb_x)O_2$ of composition x=0.20 [$(Ir_{0.20}Sn_{0.40}Nb_{0.40})O_2$] shows only 20% lower activity compared to pure $IrO_2$ though the noble metal oxide, iridium oxide loading is reduced by 80 mol percent.

In certain embodiments, the composition can be in the form of a nanocrystalline thin film, nanorods, nanoplates, nanoshells, nanospheres, as well as any nano-scale morphology or combinations thereof, coated on a current collector substrate.

In certain embodiments, minute amounts of iridium oxide (20 at. %) solute are combined with a tin oxide, fluorine doped matrix to form a homogeneous single phase solid solution, $(Sn_{1-x}Ir_x)O_2$:F[$(Sn,Ir)O_2$:F]. Without intending to be bound by any particular theory, it is believed that alloying oxides with tin oxide may likely change their electronic structure, which in turn could positively influence the electronic conductivity.

In certain embodiments, the non-noble metal component and the noble metal component form a complete oxide alloy or a complete solid solution.

In certain embodiments, ternary oxides, such as but not limited to $SnTa_2O_6$, $SnNb_2O_6$, $Sn_2Ta_2O_7$, $Sn_2Nb_2O_7$, may be doped with small concentration of elements selected from groups 3A, 3B, 5B, 6A and 7B of the Periodic Table, including but not limited to F, Cl, Br, I, S, Se, Te and mixtures thereof.

In addition to Sn—Nb/Ta—O oxides there is a large family of bivalent niobates and tantalates which may be employed in the compositions of the invention. It is contemplated that tantalates and niobates of Ca, Mg or Sr are suitable for use in demonstrating high structural stability. For example, Ca—Nb/Ta—O oxides may be formed. These elements may serve as donors of additional free electrons participating in the charge transfer and thus, increasing the electronic conductivity. Such elements substituting divalent $Ca^{2+}$ at corresponding sites in the crystal lattice may belong to Groups III and V of the Periodic Table, while those elements substituting $Nb^{5+}$ and $Ta^{5+}$ in the lattice may belong to Group VI of the Periodic Table. Further, another pathway for donating free electrons into the system is to dope the oxides with a small amount of fluorine substituting the corresponding oxygen ions in the crystal structure. In certain embodiments, $CaNb_2O_6$, $Ca_2Nb_2O_7$, $CaTa_2O_6$, and $Ca_2Ta_2O_7$ are formed and are doped with a small amount of a Group III element, such as Sc, Y, B, Al, Ga, In, a Group VI element, such as Cr, Mo, W, and a Group V element, such as As, Sb, Bi, or a Group VII element, such as F. The formula units of the doped materials can be [$Ca_{1-x}$(Group III and/or V elements)$_x$][Nb/Ta]$_2$O$_6$, Ca[(Nb/Ta)$_{1-y}$(Group VI elements)$_y$]$_2$O$_6$, Ca[(Nb/Ta)]$_2$O$_{6-x}$F$_x$ and [Ca$_{1-z}$(Group III and V elements)$_z$]$_2$[Nb/Ta]$_2$O$_7$, Ca$_2$[(Nb/Ta)$_{1-z}$(Group VI elements)$_z$]$_2$O$_7$, Ca$_2$[(Nb/Ta)]$_2$O$_{7-x}$F$_x$, wherein x=0.25, y=0.125 and z=0.0625.

EXAMPLES

Example 1

Electro-catalyst powders of Ir$_x$Sn$_{1-x}$O$_2$ and Ir$_x$Nb$_{1-x}$O$_2$ with fluorine doping were prepared for the oxygen evolution reaction in PEM-based water electrolysis. Fluorine doped SnO$_2$ and Nb$_2$O$_5$ were prepared using a surfactant approach and a sol-gel route, respectively.

Material Preparation

Cetyltrimethylammonium bromide [CTAB, Sigma Aldrich, 95%] was used as a surfactant for the synthesis of tin oxide and fluorine doped tin oxide. CTAB was dissolved in D.I. water and stirred vigorously to get a homogeneous solution. Ammonium hydroxide [NH$_4$OH, Alfa Aesar, 28-30 wt. %] was added to the above solution along with D.I. water. Tin (II) chloride [SnCl$_2$.$_x$H$_2$O, Alfa Aesar, 99.995%] was used as the inorganic precursor. It is dissolved in D.I. water and introduced to the mixture of CTAB and ammonium hydroxide solution. This solution was stirred vigorously for 3 hours and the mixture then rested at room temperature for 48 hours. The precipitate was separated from the solution by centrifuging and washing it with D.I. water multiple times in order to remove any chlorine traces and impurities from the solution. The powder was then dried at room temperature and heat treated in air at 300° C. for 4 hours. This concluded the formation of tin oxide. 10 wt. % fluorine doped tin oxide was also synthesized and the fluorine precursor used for the same was ammonium fluoride [NH$_4$F, Alfa Aesar, 98%]. All the other experimental precursors and conditions remained the same for preparing fluorine doped tin oxide, the only difference being that ammonium fluoride was mixed with tin (II) chloride in D.I. water during the synthesis. After forming tin oxide and fluorine doped tin oxide, these materials were used to form Ir$_x$Sn$_{1-x}$O$_2$ and Ir$_x$Sn$_{1-x}$O$_2$:F respectively, of varying compositions of x ranging from 0.2 to 0.8. Iridium (IV) chloride [IrCl$_4$, Alfa Aesar, 99.95%] was used for the synthesis. IrCl$_4$ was added to ethanol and stirred vigorously for complete dissolution. The prepared tin oxide and 10% fluorine doped tin oxide powder were added to the solution and then stirred for more time. This mixture was dried in an oven at 60° C. and then heat treated in air at 400° C. for 4 hours. The same procedure was repeated for preparing powders of all the composition.

Niobium (V) chloride [NbCl$_5$, Alfa Aesar, 99.9%] was used as the inorganic precursor for the synthesis of niobium oxide and fluorine doped niobium oxide. It is dissolved in ethanol and then added to a solution of 0.3M ammonium hydroxide. A white precipitate was obtained at this point which was separated and washed with D.I. water multiple times in a centrifuge to get rid of any impurities and chlorine traces from the solution. The precipitate was dispersed in a solution of hydrogen peroxide [H$_2$O$_2$, Fisher Scientific, 30%] under ice and stirred for 10 minutes until a clear yellow sol was obtained. The flask in which the sol was formed was sealed and heated to 75° C. for 24 hours in order to form an amorphous high surface area gel. This gel was dried in the flask at 75° C. for 48 hours. This niobium oxide is used to form our further product of Ir$_x$Nb$_{1-x}$O$_2$. For preparation of fluorine doped niobium oxide, trifluoroacetic acid [CF$_3$COOH, Alfa Aesar, 99.5%] was used as the fluorine precursor. The same procedure and experimental conditions are used for preparing 10% fluorine doped niobium oxide except for the solution of NbCl$_5$ dissolved in ethanol also contained an appropriate amount of trifluoroacetic acid. The prepared niobium oxide and fluorine doped niobium oxide were used to synthesize Ir$_x$Nb$_{1-x}$O$_2$ and Ir$_x$Nb$_{1-x}$O$_2$:F respectively, of varying compositions ranging from x=0.2 to 0.8. IrCl$_4$ was added to ethanol and stirred vigorously for complete dissolution. The prepared niobium oxide and 10% fluorine doped niobium oxide powder were added to the solution and then stirred for more time. This mixture was dried in an oven at 60° C. and then heat treated in air at 400° C. for 4 hours. The exact procedure was repeated for synthesizing powders of all the compositions.

Physio-Chemical Characterization

The synthesized materials were analyzed by X-ray diffraction incorporating a state-of-the-art detector (XRD, Philips XPERT PRO system with CuK$_\alpha$ radiation). Typical scans were recorded in the 2θ range of 15°-90°. The operating voltage and current were kept constant at 45 kV and 40 mA respectively.

Specific surface area of the catalysts was measured using the Brunauer-Emmett-Teller (BET) technique. The powder was first vacuum degassed and then tested using a Micromeritics ASAP 2020. Multipoint BET surface areas are reported for the synthesized powders.

Electrochemical Characterization

Electrochemical characterization was conducted on the sample using a five port jacketed reaction cell (Ace Glass Inc.) in which was assembled a 3-electrode test system. The testing was done using a VersaSTAT 3 (Princeton Applied Research). A solution of 1M sulfuric acid was used as the electrolyte. The solution was kept at a constant temperature of 40° C. using a Fisher Scientific 910 Isotemp Refrigerator Circulator. The working electrodes were prepared by uniformly spreading the catalyst ink on a porous Titanium plate (Accumet Materials, 50% dense, 0.010 in. thick) in an area of 1 cm$^2$. The iridium oxide loading on the electrodes was 0.3 mg/cm$^2$. The reference electrode was a XR 200 mercury/mercurous sulfate electrode [Hg/Hg$_2$SO$_4$] (Radiometer Analytical) that has a potential of ~+0.65 V with respect to the Normal Hydrogen Electrode (NHE). Platinum foil (Alfa Aesar, 0.25 mm thick, 99.95%) was used as the counter electrode. The polarization curves were recorded at a scan rate of 1 mV/s from 0 to 2V (NHE).

Results

Figure 2:
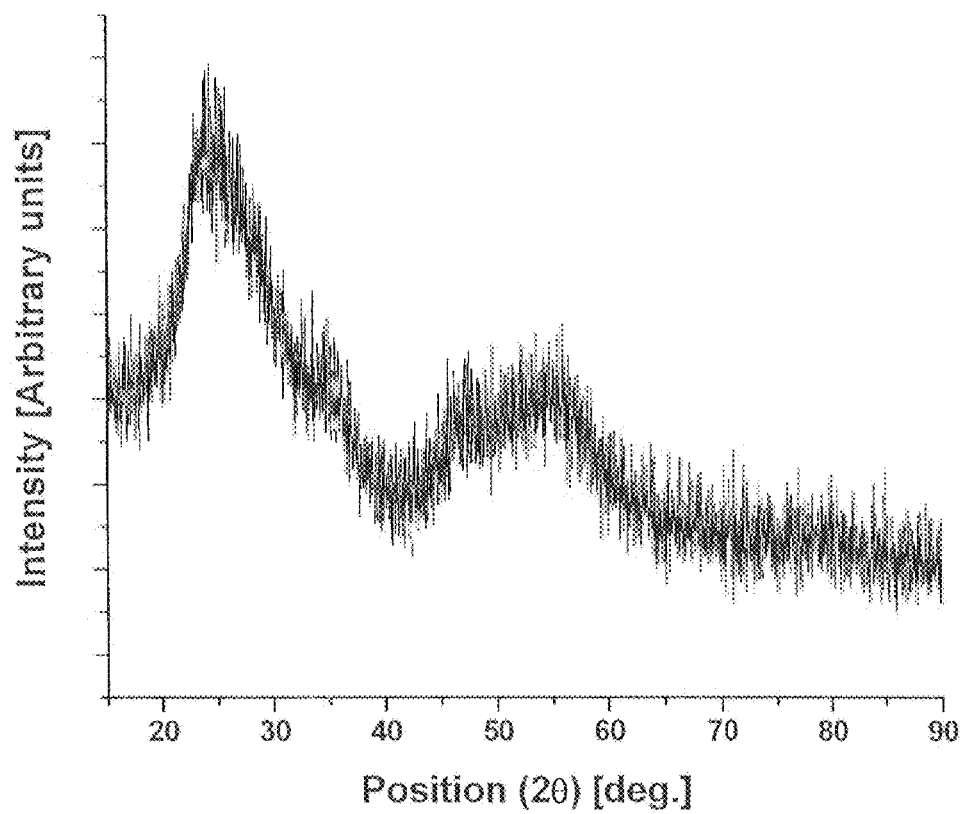
FIG. 2 is a XRD pattern of $Nb_2O_5$ and 10% fluorine doped $Nb_2O_5$.
Figure 3:
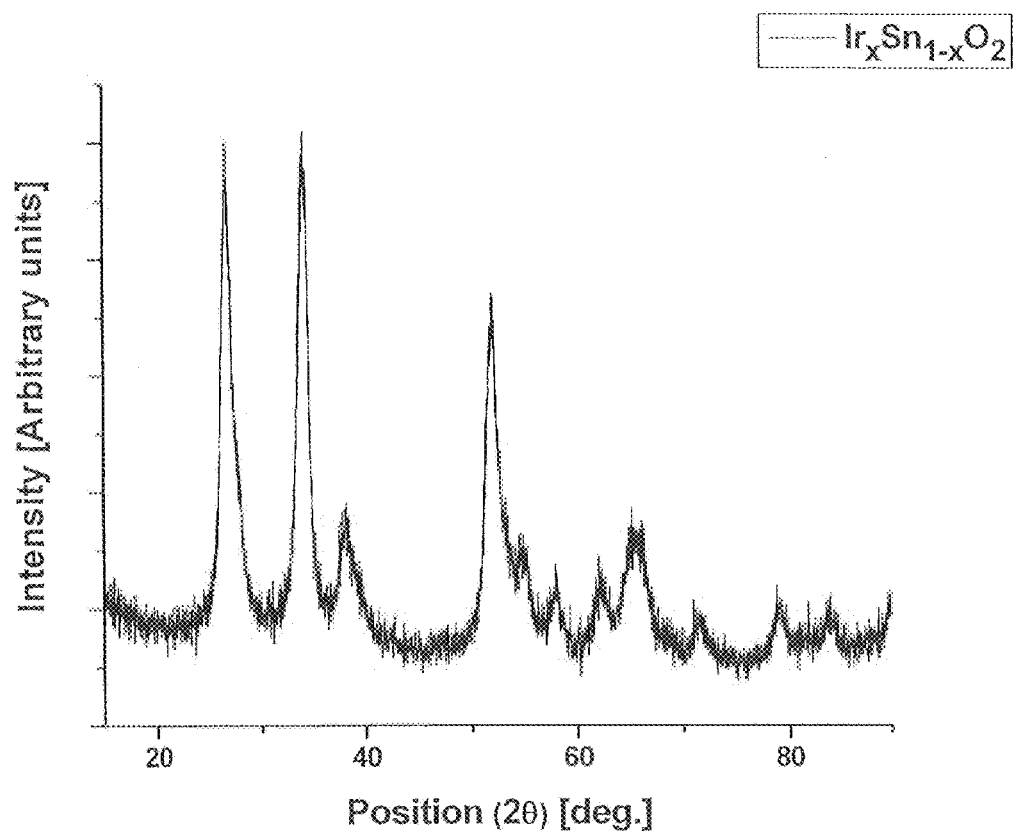
FIG. 3 is a XRD pattern of the $Ir_xSn_{1-x}O_2$.
Figure 4:
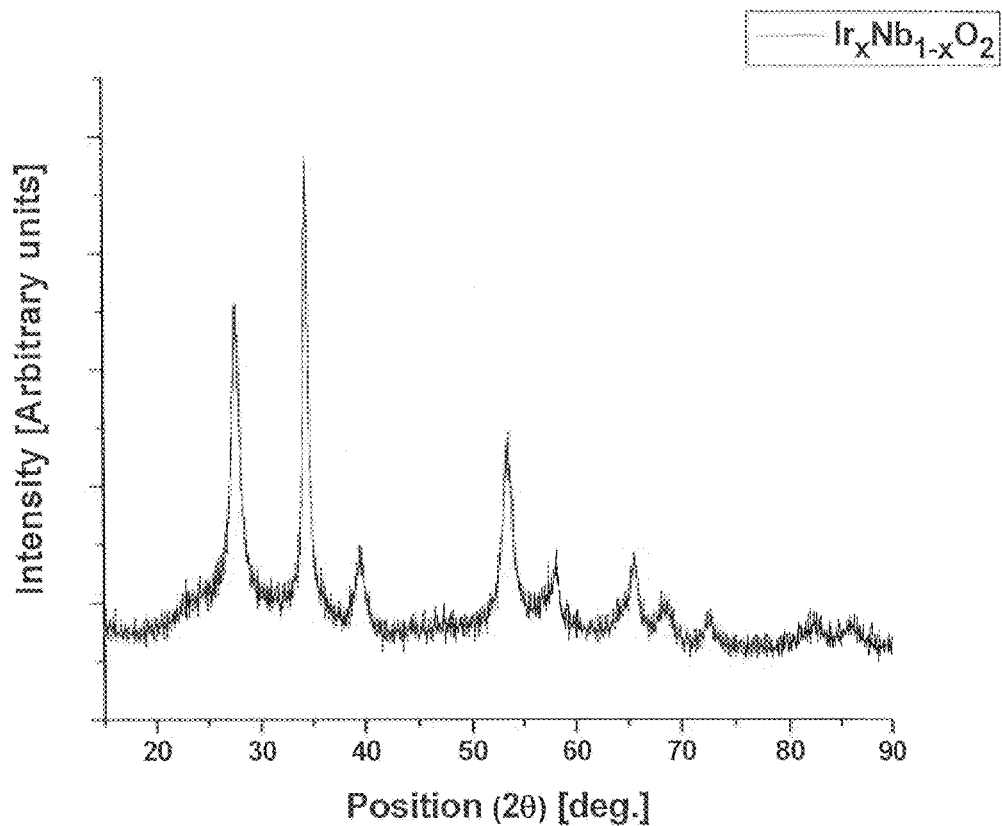
FIG. 4 is a XRD pattern of the $Ir_xNb_{1-x}O_2$.

FIG. 1 shows the x-ray diffraction (XRD) pattern of the as prepared SnO$_2$ and fluorine doped SnO$_2$ after heat treatment to 300° C. FIG. 2 shows the XRD of the dried gel of Nb$_2$O$_5$ and 10% fluorine doped Nb$_2$O$_5$ at 75° C. FIGS. 3 and 4 show the XRD pattern of the Ir$_x$Sn$_{1-x}$O$_2$ and Ir$_x$Nb$_{1-x}$O$_2$ respectively. These XRD patterns show peaks corresponding to the tetragonal structure of IrO$_2$ suggesting formation of complete solid solution between IrO$_2$ and SnO$_2$, and IrO$_2$ and Nb$_2$O$_5$. There are no additional peaks from SnO$_2$ and Nb$_2$O$_5$.

Figure 5:
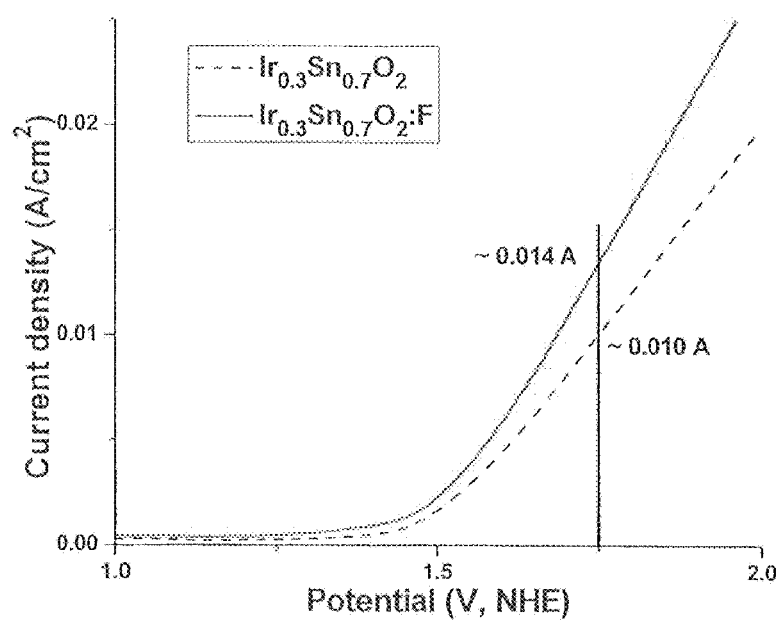
FIG. 5 is a polarization curve of $Ir_{0.3}Sn_{0.7}O_2$ and $Ir_{0.3}Sn_{0.75}O_2$:F at 40° C. in 1N $H_2SO_4$ solution.
Figure 6:
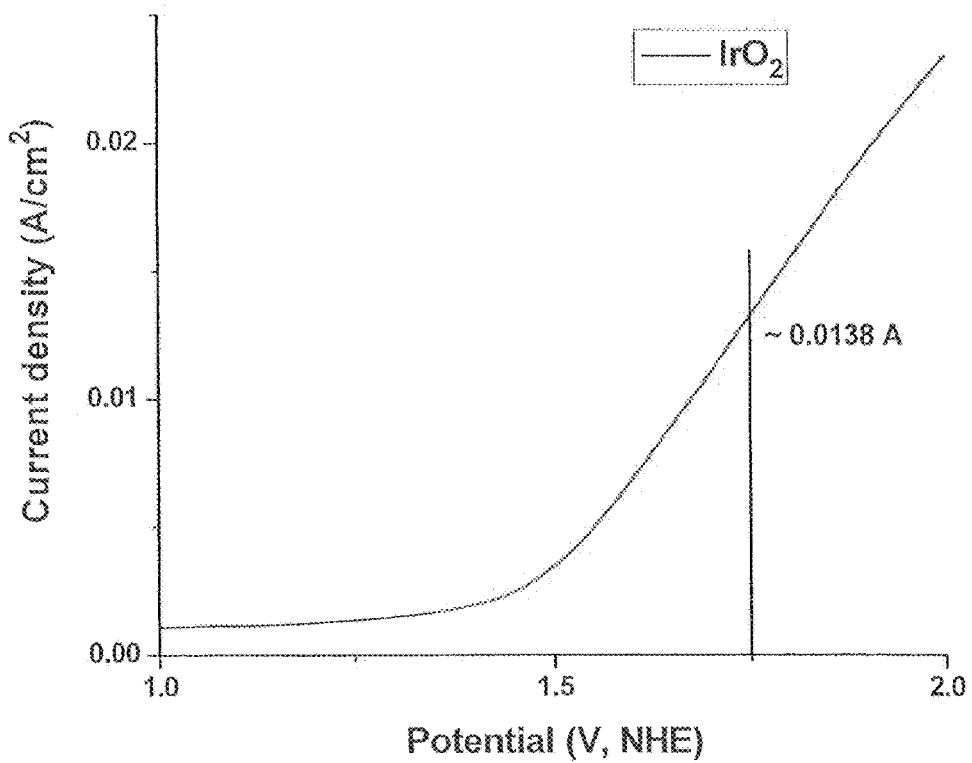
FIG. 6 is a polarization curve of pure $IrO_2$ at 40° C. in 1M $H_2SO_4$ solution.
Figure 7:
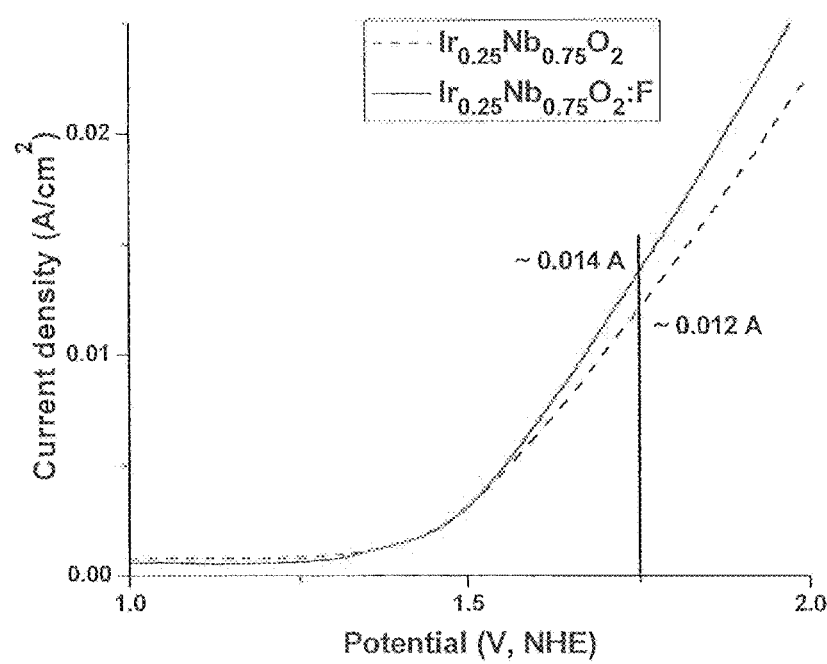
FIG. 7 is a polarization curve of $Ir_{0.25}Nb_{0.75}O_2$ and $Ir_{0.25}Nb_{0.75}O_2$:F at 40° C. in 1N $H_2SO_4$ solution.

FIG. 5 shows the electrochemical activity of Ir$_{0.3}$Sn$_{0.7}$O$_2$ and Ir$_{0.3}$Sn$_{0.7}$O$_2$:F. Polarization was conducted in a solution of 1N sulfuric acid at a scan rate of 1 mV/sec. The oxygen evolution or water splitting occurred at ~1.43 V vs. NHE. The current density of undoped Ir$_{0.3}$Sn$_{0.7}$O$_2$ at 1.75 V (vs. NHE) is 0.010 A/cm$^2$. Further, 10% fluorine doping of the catalyst gave a current density at 1.75V (vs. NHE) of ~0.014 A/cm$^2$. This was comparable to pure IrO$_2$ which had a current density of ~0.0138 A/cm$^2$ at 1.75 V (vs. NHE) which is shown in FIG. 6. It also showed an increase of ~40% current density with respect to the undoped sample of similar composition. FIG. 7 shows the electrochemical activity of $Ir_{0.25}Nb_{0.75}O_2$ and $Ir_{0.25}Nb_{0.75}O_2$:F. The current density of $Ir_{0.25}Nb_{0.75}O_2$ and $Ir_{0.25}Nb_{0.75}O_2$:F at 1.75 V (vs NHE) was ~0.012 A/cm$^2$ and 0.014 A/cm$^2$ respectively. The current densities in these catalysts were also comparable to pure $IrO_2$. There was an increase of ~20% in current density when $Ir_{0.25}Nb_{0.75}O_2$ was doped with 10% fluorine. These results clearly indicate that even after reducing the noble metal loading by 75 at %, electrochemical performance comparable to pure $IrO_2$ is obtained by doping the catalysts with 10% fluorine.

Specific surface area (SSA) of the supports and the catalysts were measured using the BET technique. The $SnO_2$ support had a SSA of 161 m$^2$/g and the 10% fluorine doped $SnO_2$ had a SSA of 240 m$^2$/g. The $Nb_2O_5$ support had a SSA of 257 m$^2$/g and the 10% fluorine doped $Nb_2O_5$ had a SSA of 389 m$^2$/g. The surface area of $Ir_xSn_{1-x}O_2$ and $Ir_xSn_{1-x}O_2$:F ranged from 30 m$^2$/g to 70 m$^2$/g. The surface area decreased with increasing x but was relatively more for the fluorine doped catalysts. The surface area of $Ir_xNb_{1-x}O_2$ and $Ir_xNb_{1-x}O_2$:F ranged from 45 m$^2$/g to 170 m$^2$/g with the SSA decreasing with increasing x and was greater for the 10% fluorine doped electro-catalysts.

Example 2

Preparation of the Electrodes

Figure 8:
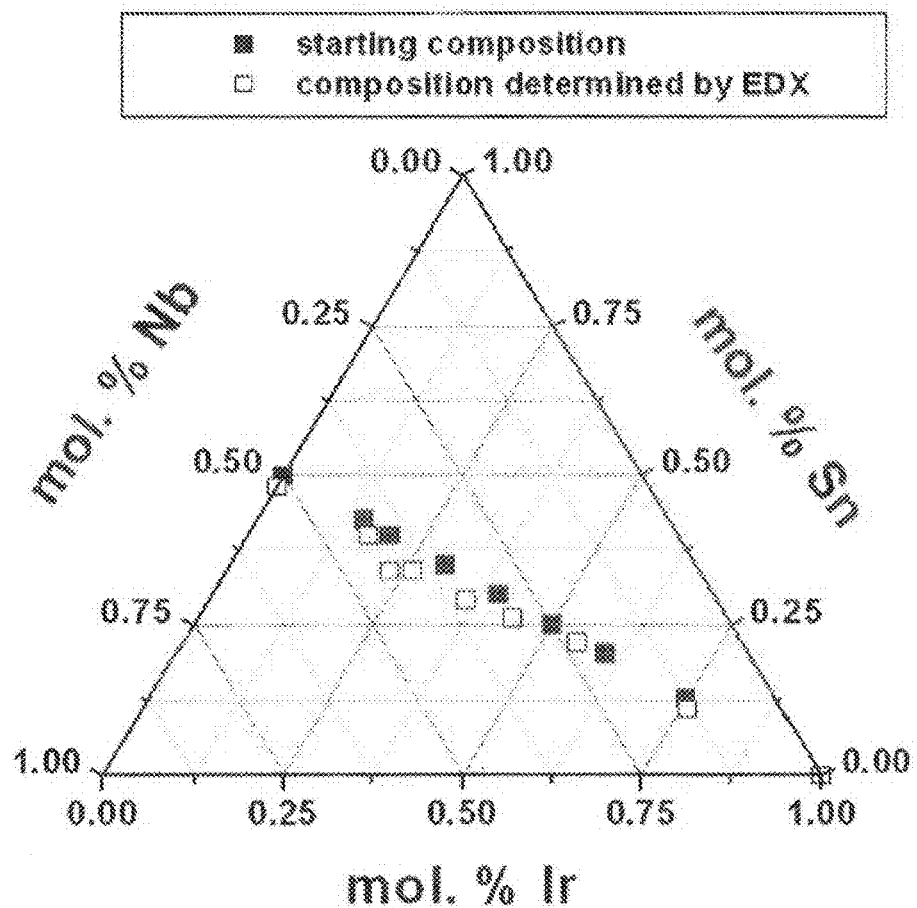
FIG. 8 is a diagram showing the molar ratio of Ir—Sn—Nb oxide chosen as an anode electrocatalyst for PEM based water electrolysis.

FIG. 8 shows the molar ratio of Ir:Sn:Nb and the corresponding compositions selected for investigation of the anode electrocatalyst for PEM-based water electrolysis. Iridium tetrachloride [$IrCl_4$, 99.5%, Alfa Aesar], niobium chloride [$NbCl_5$, 99.95%, Alfa Aesar] and tin (II) chloride dihydrate [$SnCl_2 \cdot 2H_2O$, 98%, Alfa Aesar] were used as the sources for Ir, Nb and Sn, respectively. The starting precursor compositions used to synthesize (Ir,Sn,Nb)$O_2$ electrocatalyst is tabulated in Table 1. Stock solution corresponding to $IrCl_4$, $SnCl_2 \cdot 2H_2O$ and $NbCl_5$ of the desired compositions were dissolved in absolute ethanol inside an atmosphere controlled glove box (MBraun Unilab Work station) to prevent any undesired side reaction. The resulting solution was then spin coated on pretreated titanium (Ti) substrates of ~1 cm$^2$ areas (Speciality coating Systems Inc, Model P6712) with rotating speed of 500 rpm for 10 sec. Prior to coating, the Ti substrates were sand blasted and then etched in boiling HCl (30%) for 30 min in order to ensure maximum adhesion of the coating. The HCl-treated Ti foil was washed with purified water by the Milli-Q system (18 Mohm·cm deionized water, Milli-Q Academic, Millipore) and dried at 130° C. before coating. The thin film precursors deposited on the pretreated titanium substrate were dried at 60° C. for 2 h. Following this treatment, they were thermally treated at 723K for 6 h in air to decompose the precursors and, as a result (Ir,Sn,Nb)$O_2$ film of different compositions (Table-1) were generated on the Ti foils. The loading of the active (Ir,Sn,Nb)$O_2$ deposited on the Ti foil was ~0.3 mg/cm$^2$ irrespective of the different compositions.

Materials Characterization

X-Ray Diffraction Analysis

In order to perform qualitative phase analysis, the (Ir,Sn,Nb)$O_2$ thin film electrode of different compositions coated on the Ti foil were characterized by X-ray diffraction (XRD) using Philips XPERT PRO system employing CuK$_a$ ($\lambda$=0.15406 nm) radiation with operating voltage and current at 45 kV and 40 mA, respectively. The XRD peak profile of (Ir,Sn,Nb)$O_2$ film of different compositions was analyzed using the Pseudo-Voigt function to determine the Lorentzian and Gaussian contribution of the peaks. The integral breadth of the Lorentzian contribution, determined from peak profile analysis using single line approximation method after eliminating the instrumental broadening and lattice strain contribution, was implemented in the Scherrer formula to calculate the effective crystallite size of the (Ir,Sn,Nb)$O_2$ electrode of different compositions. The lattice parameter of $IrO_2$, $SnO_2$, (Sn,Nb)$O_2$ and (Ir,Sn,Nb)$O_2$ has been calculated using least square refinement techniques.

Microstructural Analysis

To investigate the microstructure of the thin film electrodes, scanning electron microscopy (SEM) was conducted. Quantitative elemental analysis was investigated using the energy dispersive X-ray spectroscopy (EDX) analyzer attached with the SEM machine. Philips XL-30FEG equipped with an EDX detector system comprised of an ultrathin beryllium window and Si(Li) detector operating at 20 kV was employed for the secondary electron (SE) image and elemental analyses.

X-Ray Photoelectron Spectroscopy (XPS) Analysis

X-ray photoelectron spectroscopy (XPS) was used to investigate the valency of iridium, tin and niobium ions. All the catalysts were analyzed by XPS using a Physical Electronics (PHI) model 32-096 X-ray source control and a 22-040 power supply interfaced to a model 04-548 X-ray source with an Omni Focus III spherical capacitance analyzer (SCA). The system was routinely operated within the pressure range of 10$^{-8}$ to 10$^{-9}$ Torr (1.3×10$^{-6}$ to 1.3×10$^{-7}$ Pa). The system was calibrated in accordance with the manufacturer's procedures utilizing the photoemission lines $E_b$ of Cu 2p$_{3/2}$—932.7 eV, $E_b$ of Au 4f$_{7/2}$—84 eV and $E_b$ of Ag 3d$_{5/2}$—368.3 for a magnesium anode. All reported intensities were experimentally determined peak areas divided by the instrumental sensitivity factors. Charge correction was obtained by referencing the adventitious C 1 s peak to 284.8 eV.

Electrochemical Tests

The electrochemical activity of $IrO_2$, (Sn,Nb)$O_2$ and (Ir,Sn,Nb)$O_2$ of different compositions, used as an oxygen reduction anode for PEM based water electrolysis, was conducted in an electrochemical workstation (VersaSTAT 3, Princeton Applied Research) using a three electrode cell configuration. A solution containing 1M sulfuric acid ($H_2SO_4$) was used as the electrolyte while also serving as the source of the fuel. The $H_2SO_4$ solution was kept at a constant temperature of 40° C. using a Fisher Scientific 910 Isotemp Refrigerator Circulator. Thin films of $IrO_2$, (Sn,Nb)$O_2$ and (Ir,Sn,Nb)$O_2$ of different compositions coated on Ti foil were used as the working electrode with an exposed surface area ~1 cm$^2$ with a total loading of ~0.3 mg/cm$^2$ for each system. The polarization curve was recorded with a scanning rate of ~1 mV/sec using platinum as the counter electrode and Hg/Hg$_2$SO$_4$ as the reference electrode that had a potential of +0.65V with respect to the Normal hydrogen electrode (NHE). In order to assess the accelerated life test of the (Ir,Sn,Nb)$O_2$ electrode as an anode for PEM-based water electrolysis, chronoamperometry (current vs. time) as well as chronopotentiometry (potential vs. time) of selected samples had been performed for 48 h using 1M $H_2SO_4$ as the electrolyte in the same three electrode cell configuration. The chronopotentiometry (CP) test had been performed with a constant current density of ~0.011 A/cm$^2$, whereas chronoamperometry (CA) test had been performed with a constant potential of ~1.65V of NHE at a operating temperature of 40° C. Elemental analysis of the electrolyte ($H_2SO_4$ solution), collected after 48 h of CP test, was performed by inductively coupled plasma optical emission spectroscopy (ICP-OES, iCAP 6500 duo Thermo Fisher) in order to determine the amount of iridium, tin and niobium leached out in the solution from the electrode.

Theoretical Approaches and Details of the Methodology

In the present theoretical calculation, the thin film of (Ir,Sn,Nb)$O_2$ synthesized by thermal decomposition of chloride precursors on Ti substrate had been considered to exhibit the rutile structure with a tetragonal unit cell and space group P42/mnm following experimental validation. The rutile structure of (Ir,Sn,Nb)$O_2$ thin film electrode had been confirmed experimentally from XRD analysis presented herein. This unit cell was chosen as the basis for construction of the different super cells corresponding to the specific Ir, Sn and Nb concentrations of the oxide solid solution. In particular, for Ir$O_2$ and (Sn$_{0.5}$Nb$_{0.5}$)$O_2$ the super cell had been chosen as the regular rutile unit cell with two metal and four oxygen atoms in the primitive unit cell. (Ir$_{1-2x}$Sn$_x$Nb$_x$)$O_2$ with x=0.125, 0.25 and 0.375 compositions were made to fit a four-fold super cell [1×1×4] comprising 8 metal and 16 oxygen atoms in the cell unit. For calculation of the surface electronic properties of the materials a two-dimensional slab repeated in [1,−1, 0] direction with a vacuum distance ~15 Å between adjacent images of the slab was selected.

For calculating the total energies, electronic structure and density of electronic states, the Vienna Ab-initio Simulation Package (VASP) was used within the projector-augmented wave (PAW) method and the generalized gradient approximation (GGA) for the exchange-correlation energy functional in a form suggested by Perdew and Wang. This program calculated the electronic structure and via the Hellmann-Feynman theorem, the inter-atomic forces were determined from first-principles. Standard PAW potentials were employed for the elemental constituents and the Ir, Sn, Nb, and O potentials thus contained nine, four, eleven and six valence electrons, respectively.

For all the materials considered, the plane wave cutoff energy of 520 eV had been chosen to maintain a high accuracy of the total energy calculations. The lattice parameters and internal positions of atoms were fully optimized employing the double relaxation procedure, and consequently, the minima of the total energies with respect to the lattice parameters and internal ionic positions had been determined. This geometry optimization was obtained by minimizing the Hellman-Feynman forces via a conjugate gradient method, so that the net forces applied on every ion in the lattice were close to zero. The total electronic energies were converged within $10^{-5}$ eV/un·cell resulting in the residual force components on each atom to be lower than 0.01 eV/Å/atom, thus allowing for the accurate determination of the internal structural parameters. The Monkhorst-Pack scheme was used to sample the Brillouin Zone (BZ) and generate the k-point grid for the solids and the different isolated atoms used herein. A choice of the appropriate number of k-points in the irreducible part of the BZ was based on convergence of the total energy to 0.1 meV/atom.

For Ir—Sn—Nb ternary oxide compositions, the corresponding atomic distributions were ambiguous and could be represented by different spatial configurations. To eliminate this uncertainty several atomic configurations for each given composition had been constructed and only those configurations corresponding to minimal total energies were selected for further numerical evaluation of these specific compositions of the ternary oxides.

Results

Figure 9:
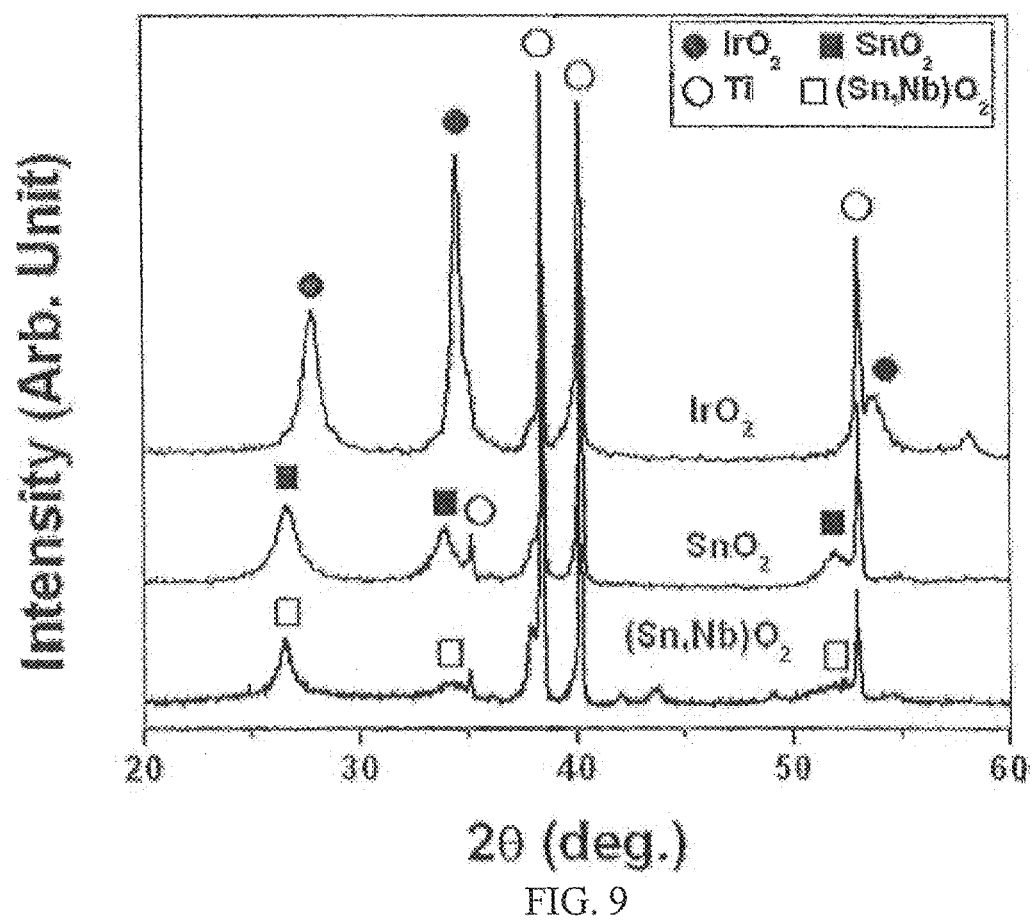
FIG. 9 is a XRD pattern of thin film $IrO_2$, $SnO_2$ and $(Sn_{0.50}Nb_{0.50})O_2$ coated on Ti foil.

FIG. 9 shows the XRD patterns of thin films of pure Ir$O_2$ and Sn$O_2$ synthesized by the thermal decomposition of IrCl$_4$ and SnCl$_2$.2H$_2$O ethanol solution, respectively, coated on Ti foil at 723K for 4 h. FIG. 2 also shows the XRD patterns of (Sn$_{0.5}$Nb$_{0.5}$)$O_2$ synthesized by thermal decomposition of homogeneous mixture SnCl$_2$.2H$_2$O and NbCl$_5$ ethanol solution with Sn:Nb molar ratio 1:1 coated on Ti foil at 723K for 4 h. The XRD patterns of Ir$O_2$ and Sn$O_2$ showed tetragonal structure as expected. The XRD pattern of (Sn$_{0.5}$Nb$_{0.5}$)$O_2$ also showed the tetragonal structure similar to tetragonal Sn$O_2$ structure without any detectable peaks of orthorhombic or monoclinic Nb$_2$O$_5$ which suggest that Nb$_2$O$_5$ forms a solid solution with Sn$O_2$ [(Sn,Nb)$O_2$]. Formation of solid solution of Nb$_2$O$_5$ with Sn$O_2$ using the Pechini process was also reported. The lattice parameter (nm) as well as molar volumes, calculated using least square refinement techniques of thin film Ir$O_2$, Sn$O_2$ and (Sn$_{0.5}$Nb$_{0.5}$)$O_2$ are shown in Table 2. The lattice parameter and the molar volume of (Sn,Nb)$O_2$ was very close to pure Sn$O_2$ due to the ionic radius of Sn$^{+4}$ (69 pm) being comparable with Nb$^{+4}$ (68 pm) as well as the molar volume of Sn$O_2$ (21.65 cm$^3$/mol) and Nb$O_2$ (21.17 cm$^3$/mol) being close to each other in the bulk state. Table 2 also shows the effective crystallite sizes calculated using the Pseudo-Voigt function involving single line approximation method of the thin films of Ir$O_2$, Sn$O_2$ and (Sn$_{0.5}$Nb$_{0.5}$)$O_2$. As shown in Table 2 the thin films of Ir$O_2$, Sn$O_2$ and (Sn$_{0.5}$Nb$_{0.5}$)$O_2$ were nanocrystalline in nature (crystallite size below 20 nm). The molar volume of nanocrystalline (~14 nm) Ir$O_2$ was higher (~2%) than the corresponding volume in the bulk (~19.22 cm$^3$/mol) which suggested that Ir$O_2$ exhibited lattice softening with refinement of crystallite size (as reported for other systems).

Figure 10:
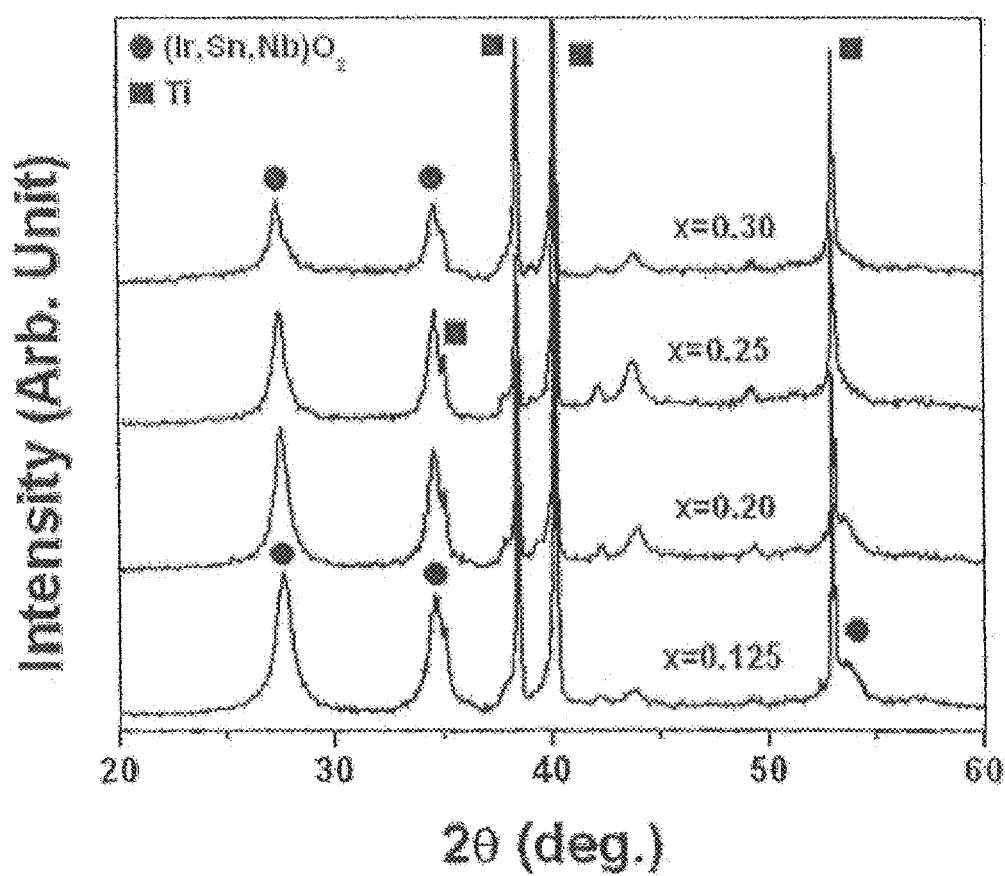
FIG. 10 is a XRD pattern of thin film $(Ir_{1-2x}Sn_xNb_x)O_2$ with x=0.125, 0.20, 0.25, 0.30 coated on Ti foil.
Figure 11:
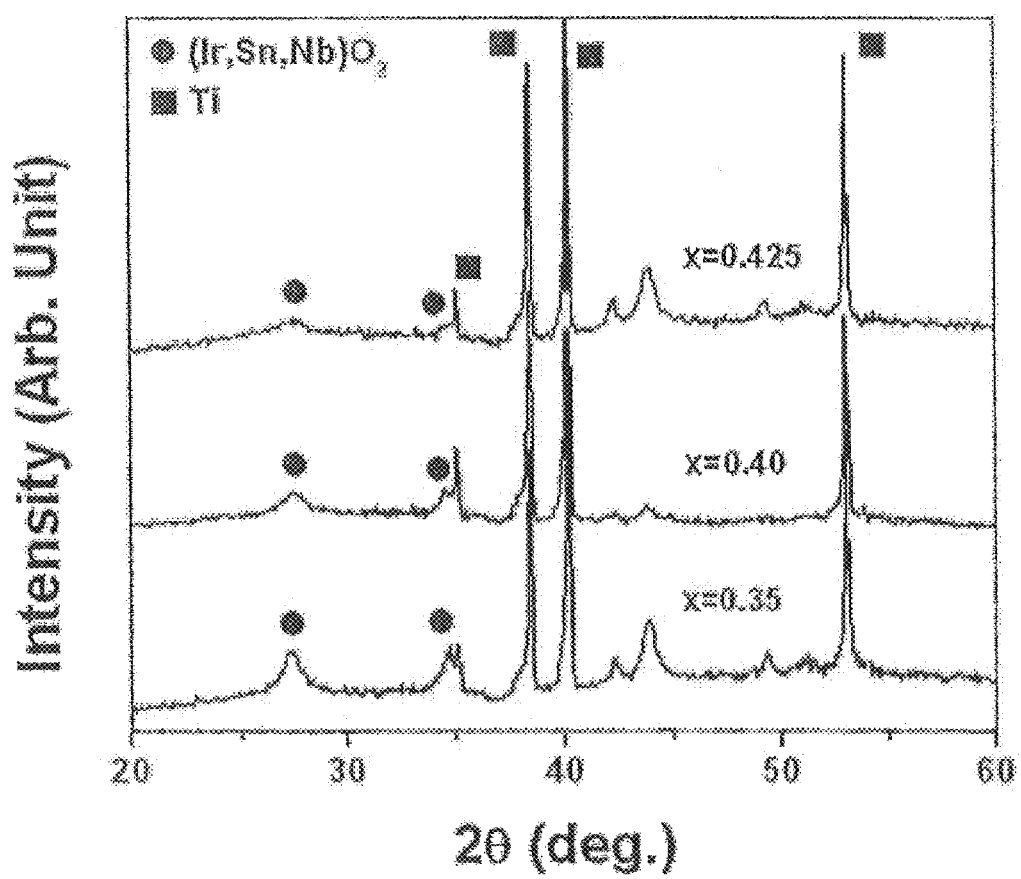
FIG. 11 is a XRD pattern of thin film $(Ir_{1-2x}Sn_xNb_x)O_2$ with x=0.35, 0.40 and 0.425 coated on Ti foil.
Figure 12:
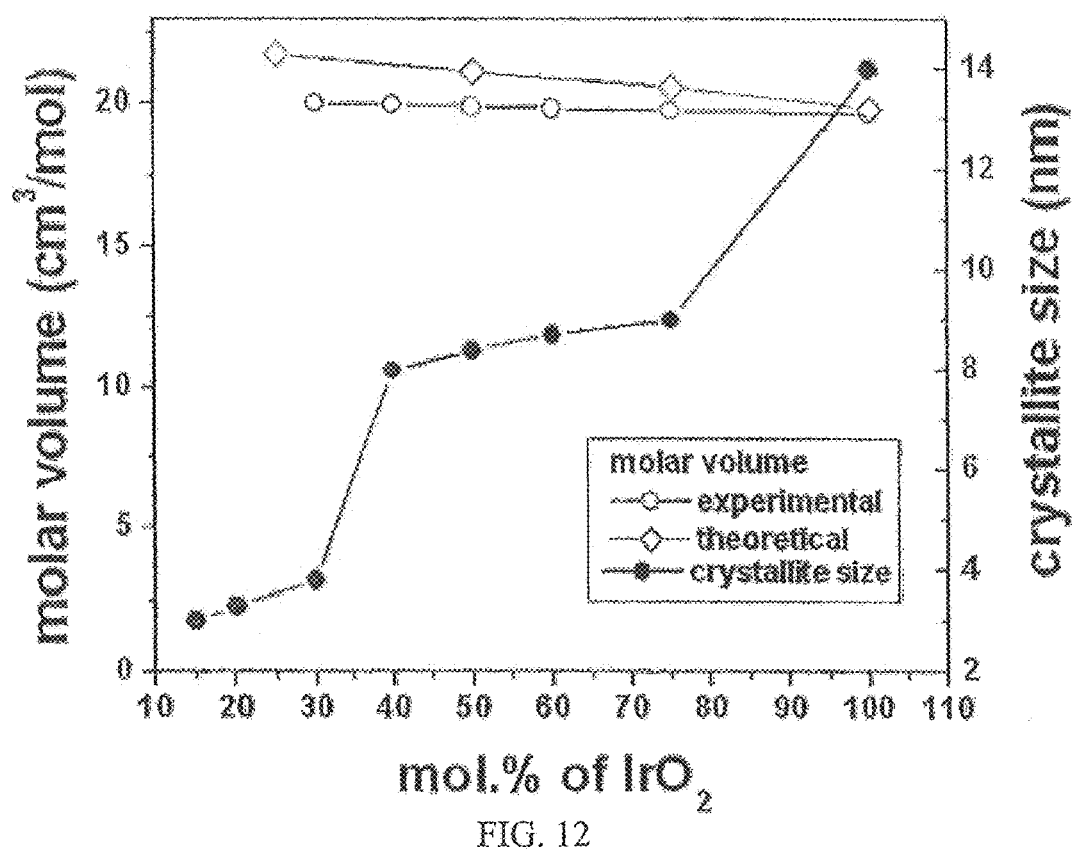
FIG. 12 is a plot showing the variation of experimental and theoretical molar volume of $(Ir,Sn,Nb)O_2$ with compositions.

The XRD patterns of ternary Ir$O_2$—Sn$O_2$—Nb$O_2$ system of different compositions (Table 1) synthesized by thermal decomposition of homogeneous mixture of IrCl$_4$, SnCl$_2$.2H$_2$O and NbCl$_5$ ethanol solution coated on Ti foil are shown in FIGS. 10 and 11. The XRD patterns of the different compositions showed the peaks corresponding to tetragonal structure which suggested the formation of complete solid solution between Ir$O_2$, Sn$O_2$ and Nb$O_2$ to form [(Ir,Sn,Nb)$O_2$]. Formation of metastable solid solution between Ir$O_2$ and Sn$O_2$ (Ir$_{1-x}$Sn$_x$O$_2$) as well as in the other systems such as Ir$O_2$—Sb$O_2$—Sn$O_2$ and Sn$O_2$—Ir$O_2$—Ta$_2$O$_5$ had been reported. The lattice parameters and molar volume, calculated using least square refinement techniques of (Ir, Sn, Nb)$O_2$ of different compositions are tabulated in Table 2. The lattice parameter and molar volume of (Ir$_{0.20}$Sn$_{0.40}$Nb$_{0.40}$)$O_2$ (x=0.40) and (Ir$_{0.15}$Sn$_{0.425}$Nb$_{0.425}$)O2 (x=0.425) had not been reported in Table 2 since the XRD peak position was not accurately detectable due to the low intensity and significant broadening of XRD peaks (FIG. 11). The variation of molar volume of (Ir,Sn,Nb)O with composition, shown in FIG. 12, clearly showed that the molar volume increases with increasing amount of (Sn,Nb)$O_2$ as expected due to ionic radius of Nb$^{+4}$ (68 pm) and Sn$^{+4}$ (69 pm) being higher than Ir$^{+4}$ (62.5 pm) as well as molar volumes of (Sn,Nb)$O_2$ being higher than Ir$O_2$ (Table 2). The variation of crystallite size, calculated from the most intense peak using single line approximation method with composition is also shown in FIG. 12 and tabulated in Table 2. As shown in FIG. 12, the crystallite size remained almost same (~8-9 nm) up to x=0.30 (40 mol %. Ir$O_2$), whereas a sudden decrease of crystallite size (~3 nm) was observed at x=0.35 (30 mol. % Ir$O_2$). This result clearly suggested that (Ir,Sn, Nb)$O_2$ with higher percentage of (Sn,Nb)$O_2$ exhibited smaller crystallite size than Ir$O_2$ rich composition. It was also suggested that high surface charge, proportional to the active surface concentration, of $SnO_2$ rich $IrO_2+SnO_2$ system could arise due to increase in surface area with addition of $SnO_2$.

Figure 13A:
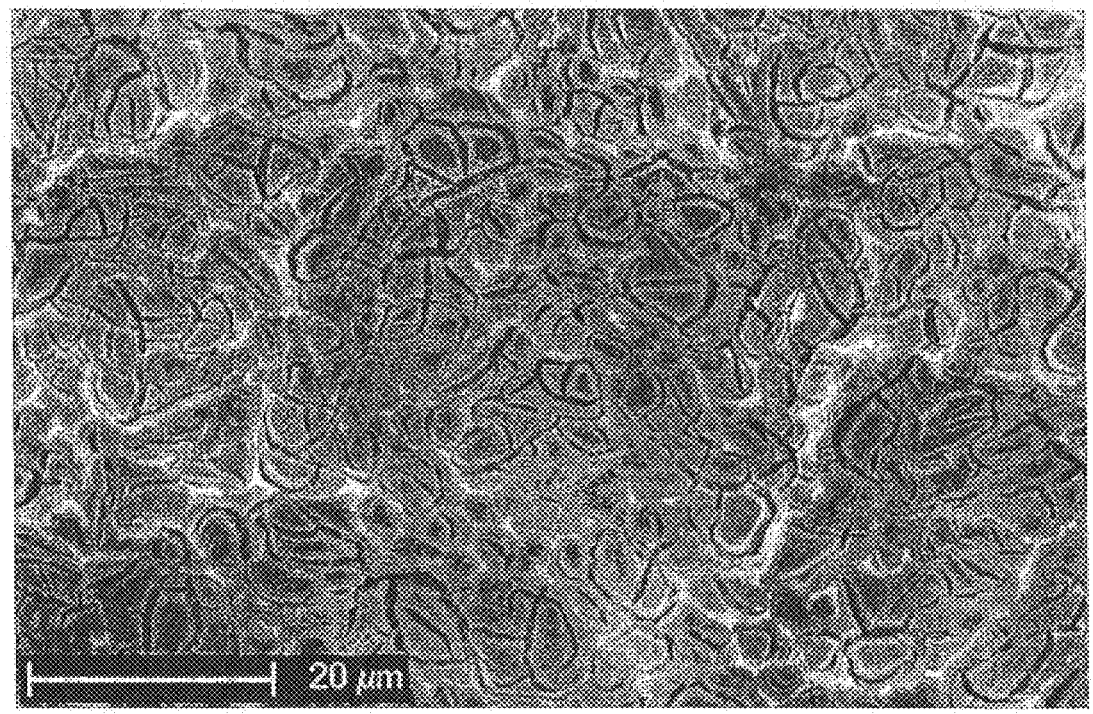
FIG. 13a is a SEM micrograph of $(Ir,Sn,Nb)O_2$ film of composition x=0.125.
Figure 13B:
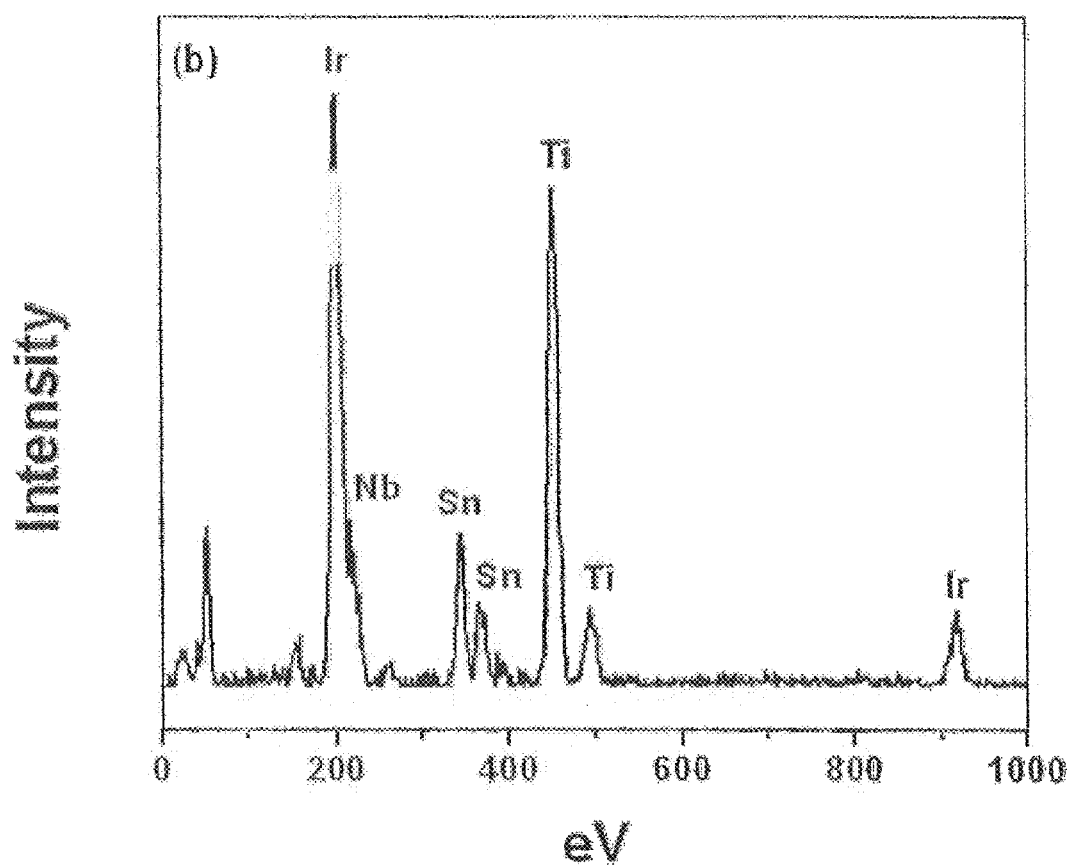
FIG. 13b is an EDAX spectra showing $(Ir,Sn,Nb)O_2$ film of composition x=0.125.
Figure 13C:
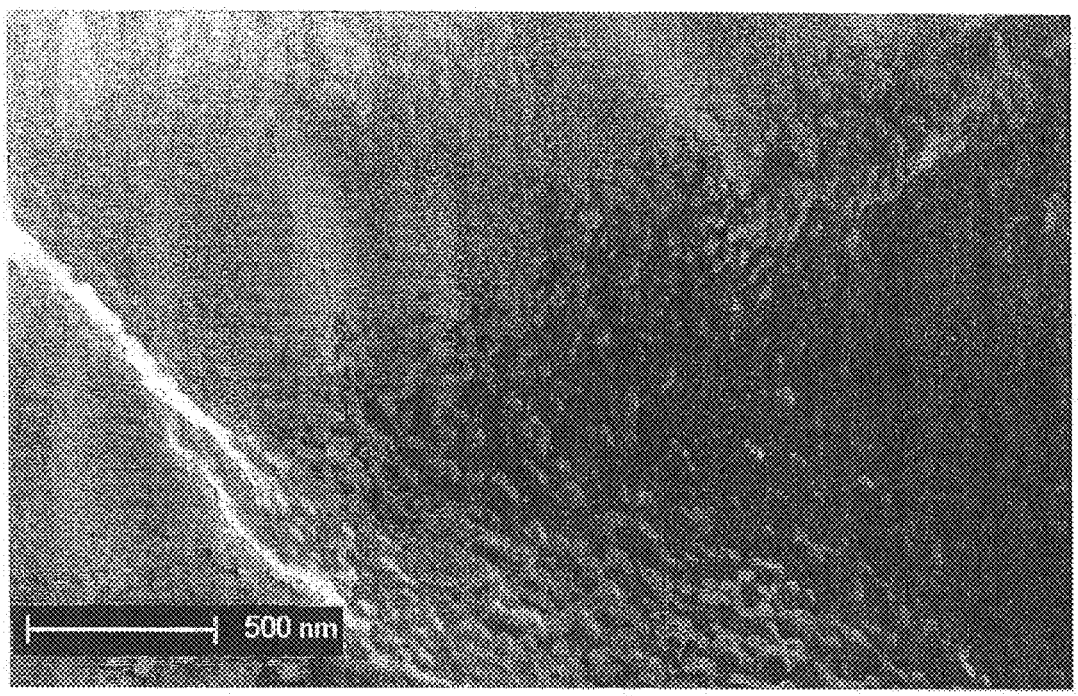
FIG. 13c is a high magnification SEM image showing the presence of fine particles in the nanometer range (~10-15 nm)
Figure 14A:
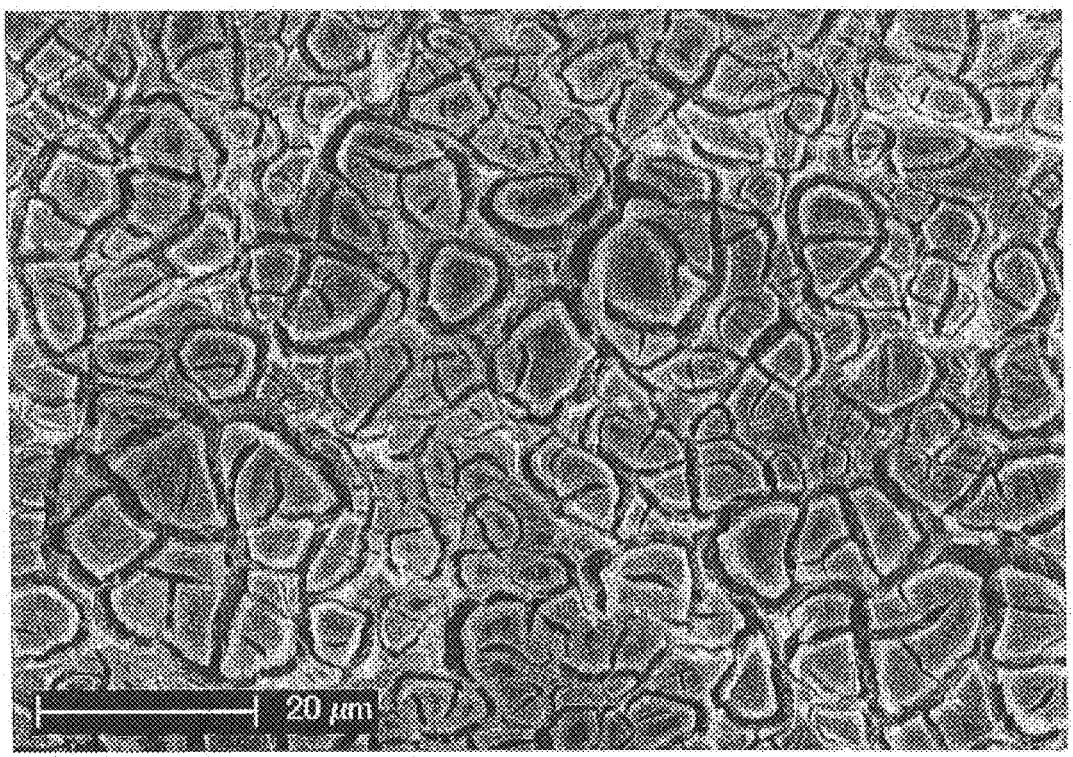
FIG. 14a is a SEM micrograph of $(Ir,Sn,Nb)O_2$ film of composition x=0.40.
Figure 14B:
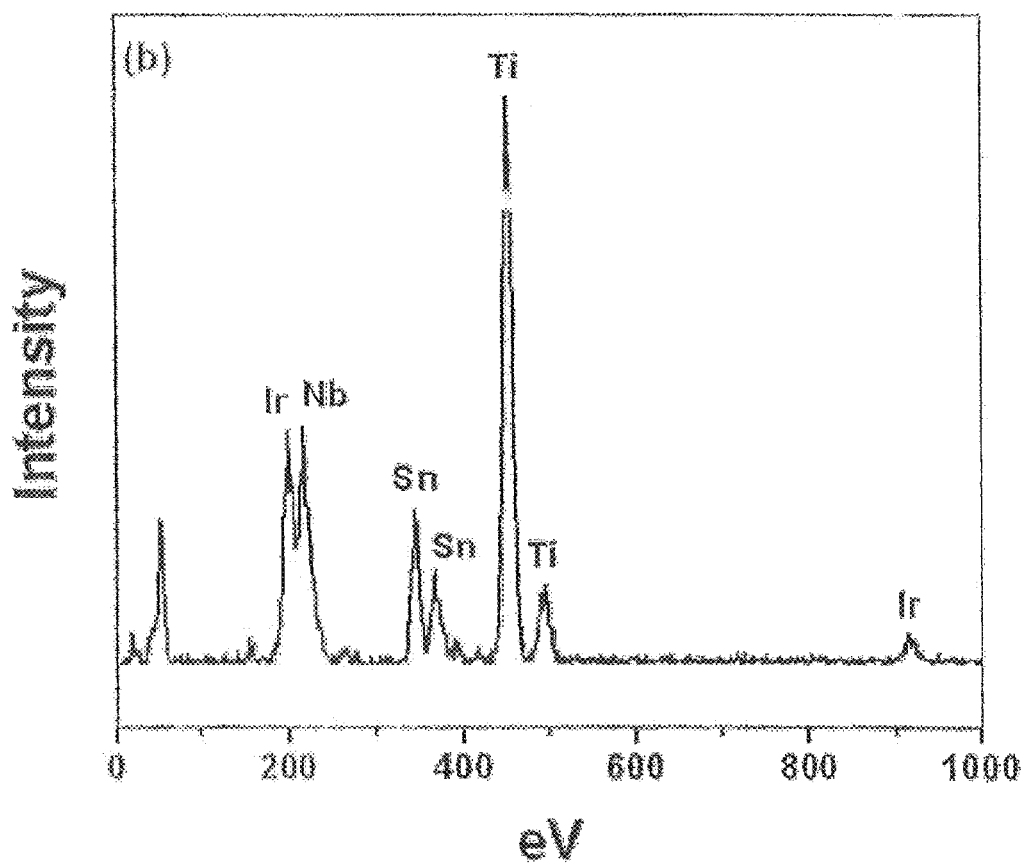
FIG. 14b is an EDAX spectra of $(Ir,Sn,Nb)O_2$ film of composition x=0.40.

The presence of elemental Ir, Sn and Nb in the $(Ir,Sn,Nb)O_2$ film of different compositions had been confirmed using energy dispersive X-ray spectroscopy analysis (EDX) attached to the SEM. The SEM image along with EDX of the $(Ir,Sn,Nb)O_2$ film of composition $x=0.125$ $[(Ir_{0.75}Sn_{0.125}Nb_{0.125})O_2]$ and $x=0.40$ $[(Ir_{0.2}Sn_{0.4}Nb_{0.4})O_2]$, shown in FIGS. 13 and 14, respectively, indicated the presence of characteristic "mud crack" morphology of $(Ir,Sn,Nb)O_2$ film coated on the Ti foil. However, the morphology of the coated $(Ir,Sn,Nb)O_2$ electrocatalyst, synthesized by thermal decompositions of the spin-coated homogeneous mixtures of the metal precursors on Ti foil, was affected by the composition. The coatings obtained with higher $IrO_2$ concentration (FIG. 13) showed less cracks compared to the lower IrO2 concentration (FIG. 14). The high magnification SEM image of $x=0.125$ (FIG. 13c) showed the presence of fine particles in the nanometer range (~10-15 nm) which was comparable with the calculated crystallite size from the XRD pattern (FIG. 12). Quantitative elemental composition analysis of the $(Ir,Sn,Nb)O_2$ films obtained by EDX, presented in FIG. 8 and tabulated in Table 1, showed that the measured compositions are close to the nominal composition.

Figure 15:
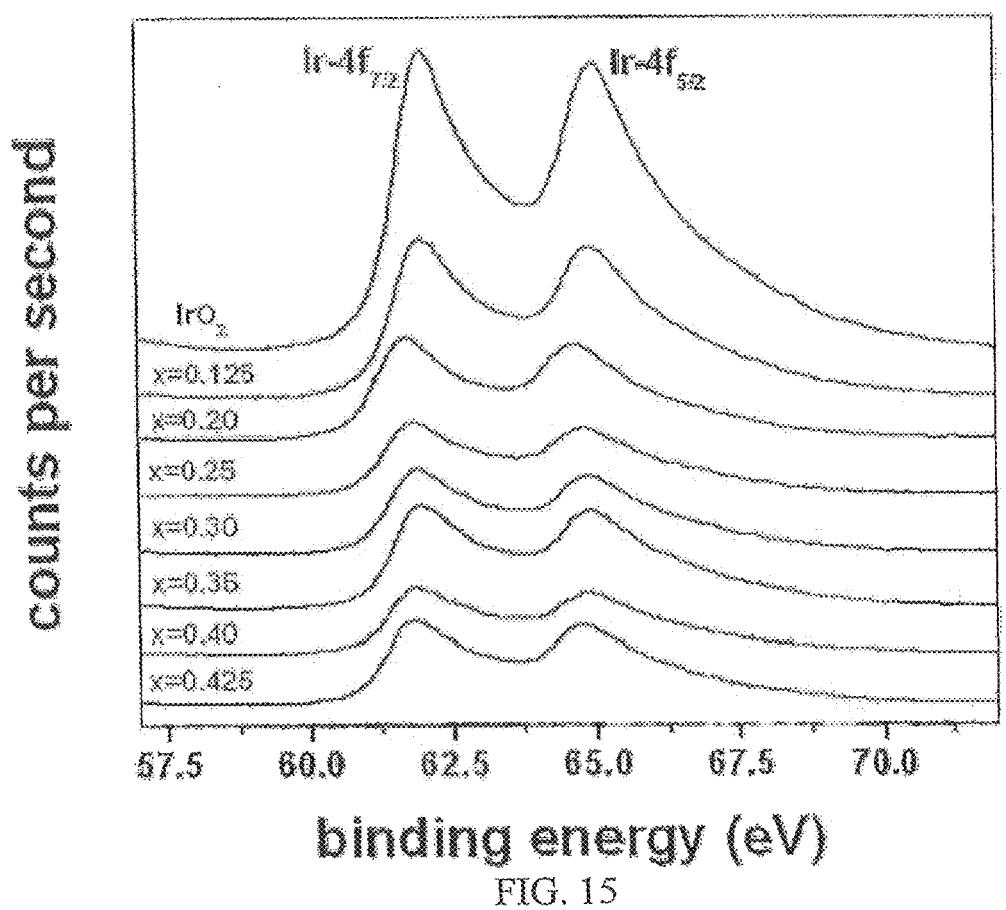
FIG. 15 is a XPS spectra of Ir $4f_{7/2}$ and $4f_{5/2}$ doublet of pure $IrO_2$ and $(Ir,Sn,Nb)O_2$ thin film of different compositions.
Figure 16:
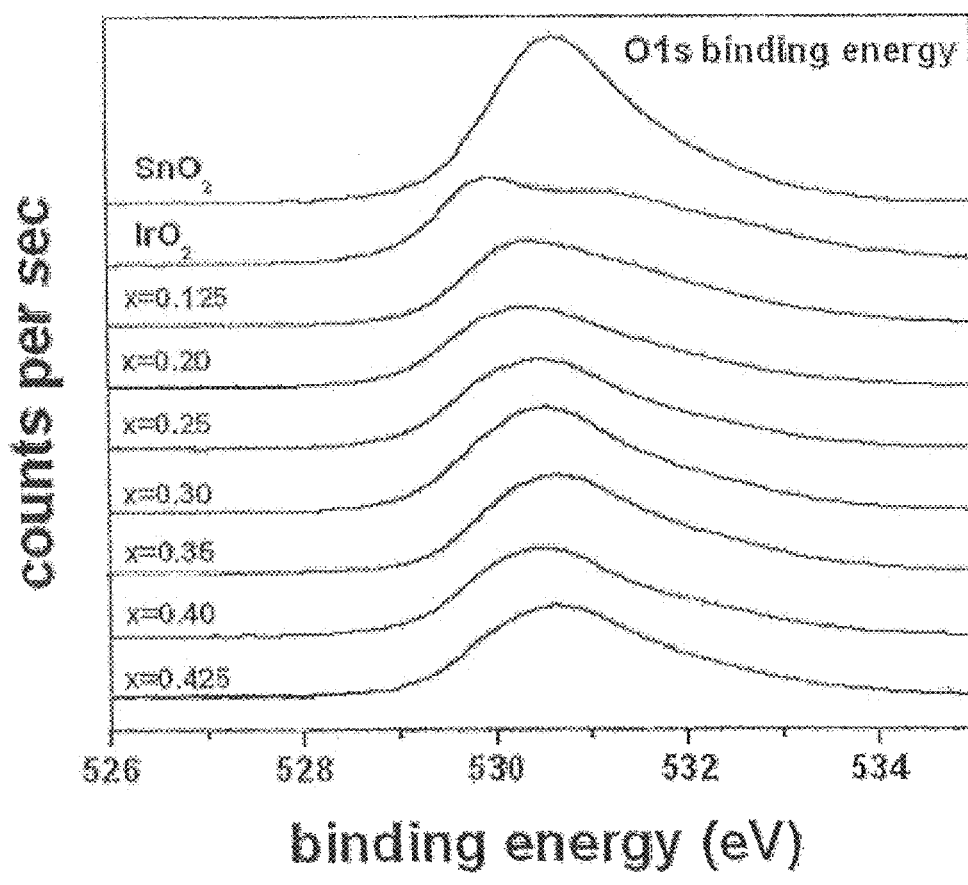
FIG. 16 is a XPS spectra of O1s of pure $IrO_2$, $SnO_2$ and $(Ir,Sn,Nb)O_2$ thin film of different compositions.
Figure 17:
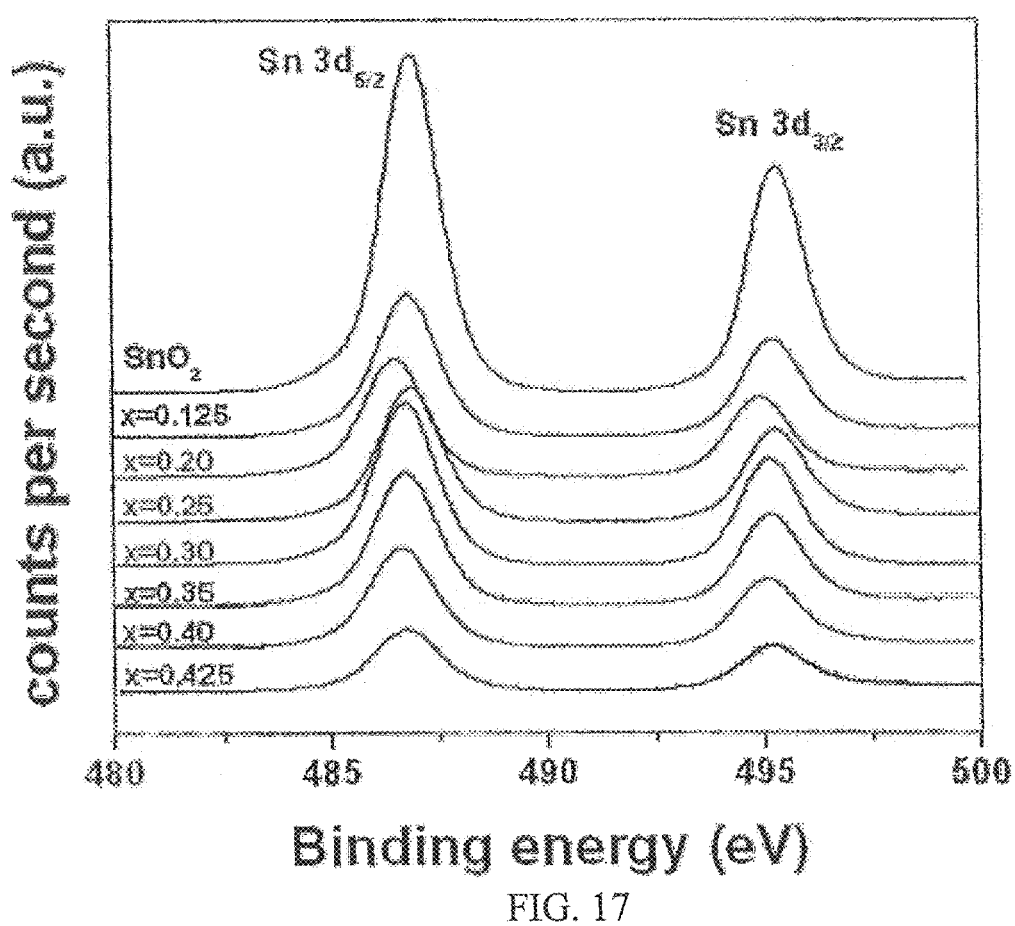
FIG. 17 is a XPS spectra of Sn $3d_{5/2}$ and Sn $3d_{3/2}$ doublet of pure $SnO_2$ and $(Ir,Sn,Nb)O_2$ thin film of different compositions.
Figure 18:
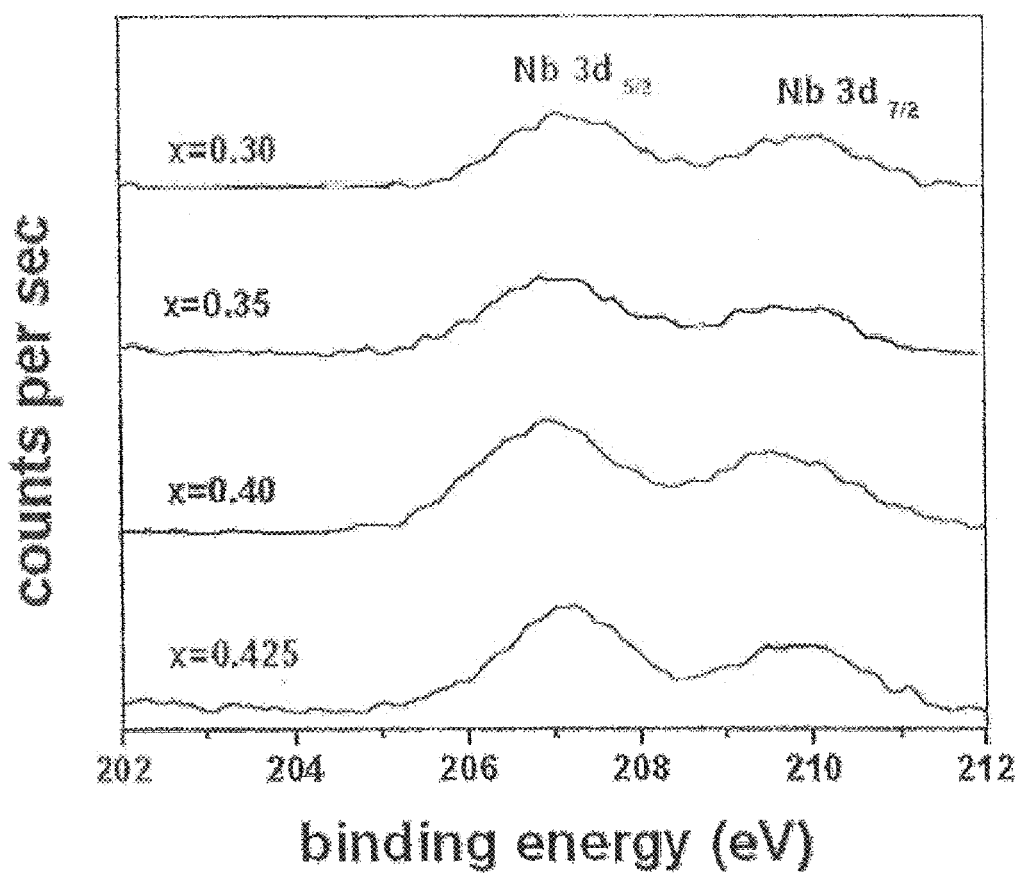
FIG. 18 is a XPS spectra of Nb $3d_{5/2}$ and Nb $3d_{7/2}$ doublet of $(Ir,Sn,Nb)O_2$ thin film of different compositions.

In order determine the valence state of Ir, Sn, Nb and O in the $IrO_2$ and $SnO_2$ as well as ternary $(Ir,Sn,Nb)O_2$ systems, XPS studies had been performed on the thin film. The XPS spectra of Ir and O1s peak of pure $IrO_2$ and $(Ir,Sn,Nb)O_2$ thin film of different compositions are shown in FIGS. 15 and 16, respectively. The XPS spectra of Ir corresponding to pure $IrO_2$ and $(Ir,Nb,Sn)O_2$ (FIG. 15) showed the presence of Ir $4f_{5/2}$ and Ir $4f_{7/2}$ doublet. The binding energy of Ir $4f_{5/2}$ and Ir $4f_{7/2}$ of pure $IrO_2$ and $(Ir,Nb,Sn)O_2$ is ~65.0 eV and ~62.0 eV, respectively, (FIG. 15) and O1s peak centered at ~530 eV (FIG. 16) which was consistent with the values of bulk $IrO_2$. The XPS spectra of Sn corresponding to pure $SnO_2$ and $(Ir,Sn,Nb)O_2$ thin films of different compositions is shown in FIG. 17. The XPS spectra of Sn showed the peak separation of $Sn3d_{5/2}$ and $Sn3d_{3/2}$ for pure $SnO_2$ as well as $(Ir,Sn,Nb)O_2$ with a binding energy of ~487 eV and ~495 eV, respectively, and the O1 s line centered at ~531 eV (FIG. 16) which was consistent with the values of stoichiometric $SnO_2$. Furthermore, the XPS spectra of Nb in $(Ir,Sn,Nb)O_2$ thin film of compositions $x=0.30$ to $x=0.425$, shown in FIG. 18, showed the peak separation of Nb $3d_{5/2}$ and Nb $3d_{3/2}$ with a binding energy of ~207 eV and ~210 eV, respectively which was corresponding to $NbO_x$.

Figure 19:
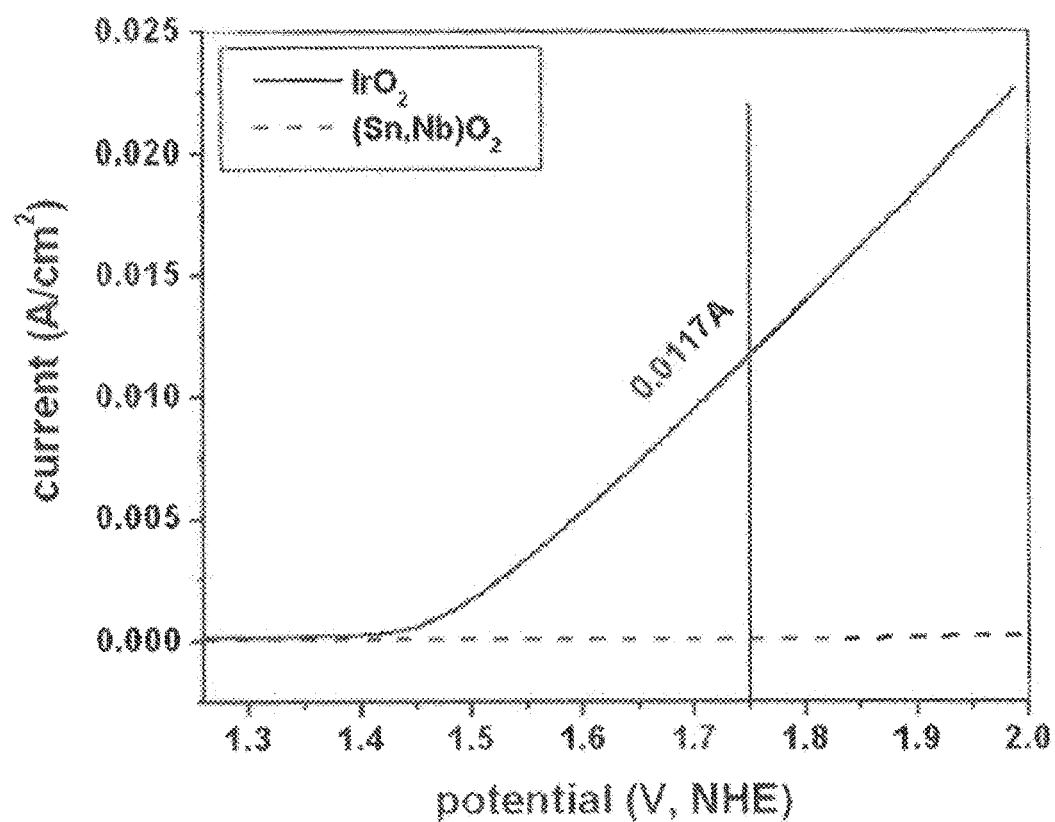
FIG. 19 is a polarization curve of pure $IrO_2$ and $(Sn,Nb)O_2$ film conducted in the presence of 1 M $H_2SO_4$ solution at 40° C. with a scan rate of 1 mV/sec.
Figure 20:
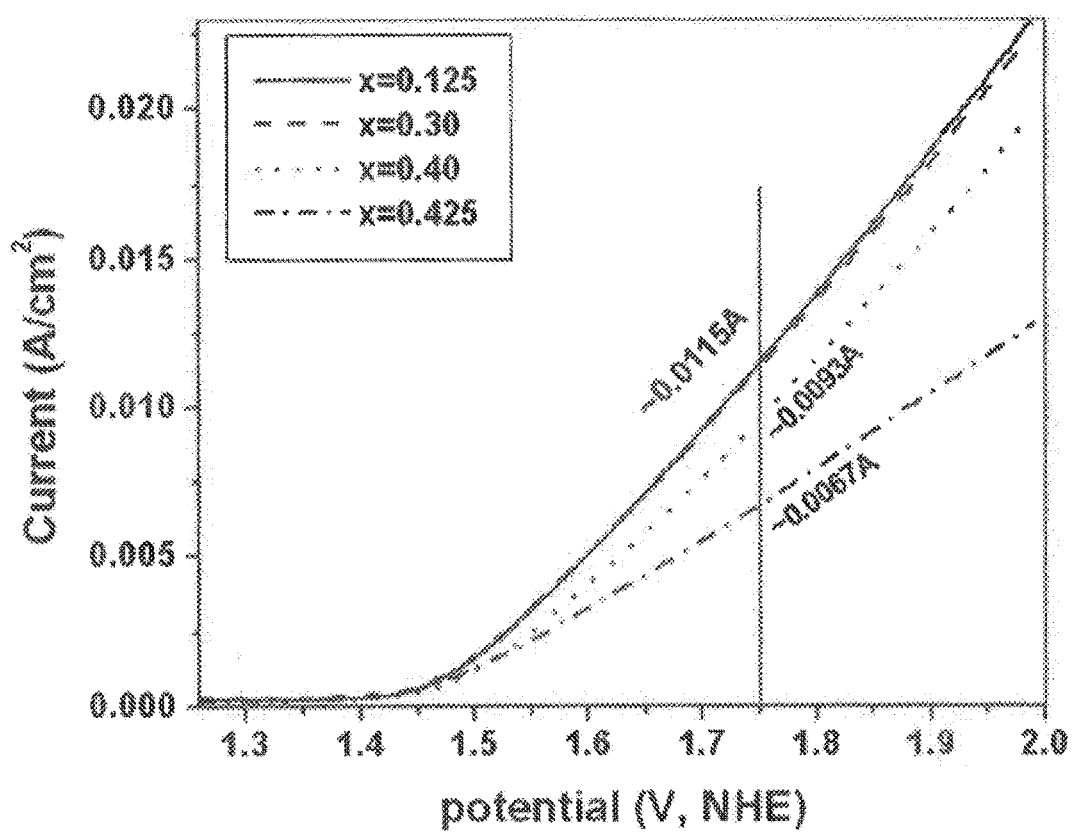
FIG. 20 is a polarization curve of $(Ir,Sn,Nb)O_2$ film of different compositions conducted in the presence of 1 M $H_2SO_4$ solution at 40° C. with a scan rate of 1 mV/sec.
Figure 21:
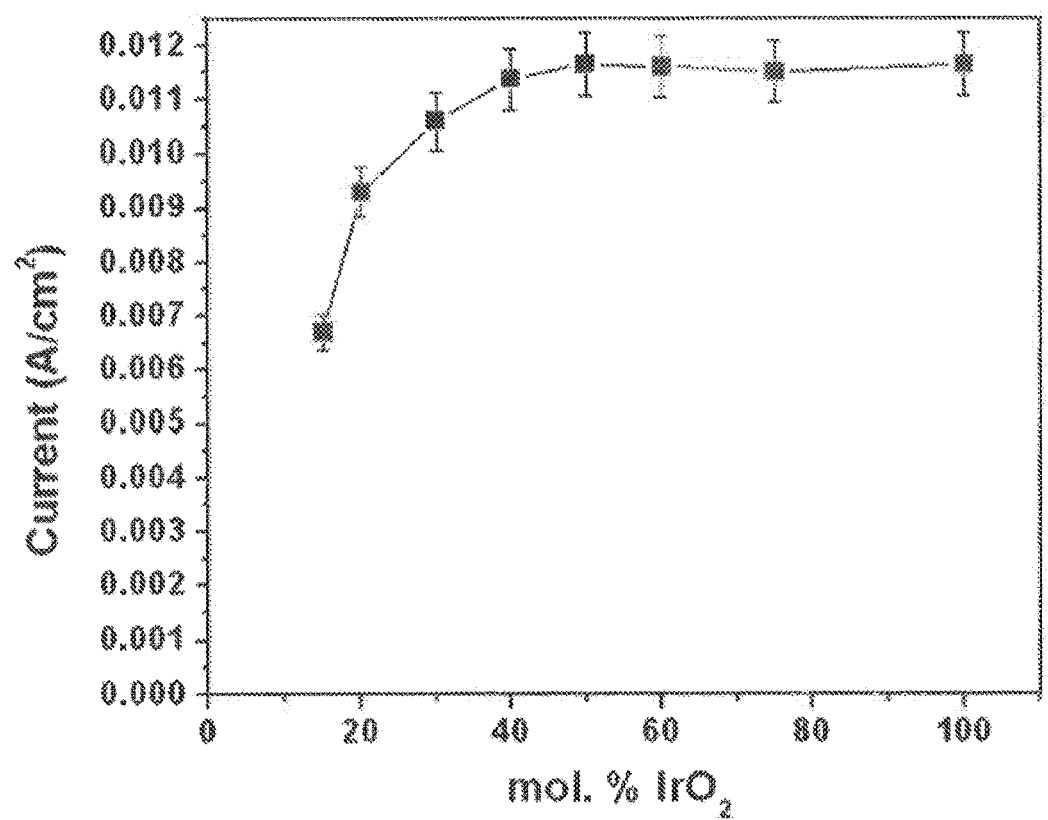
FIG. 21 is a plot showing variation of current density at ~1.75V (vs. NHE) with compositions of $(Ir,Sn,Nb)O_2$ anode electrocatalyst.

The electrochemical activity of thin film nanocrystalline $IrO_2$, $(Sn,Nb)O_2$ and $(Ir,Sn,Nb)O_2$ of different compositions had been studied as suitable oxygen reduction anode electrocatalysts for PEM-based water electrolysis. The polarization curve of pure $IrO_2$ and $(Sn,Nb)O_2$ film, conducted in the presence of 1M $H_2SO_4$ solution at 40° C. with a scan rate of 1 mV/sec, is shown in FIG. 19. The polarization curve of $IrO_2$, shown in FIG. 19, clearly indicated that water splitting (oxygen evolution reaction) reaction occurring at a potential of −1.43V vs. NHE. The current density at −1.75V (vs. NHE) was −0.0117 A/cm$^2$ with a total loading ~0.3 mg/cm$^2$ of $IrO_2$. On the other hand, $(Sn,Nb)O_2$ showed no catalytic activity for water electrolysis as expected indicating its potential use as a catalyst support. The polarization curve of ternary $(Ir,Sn,Nb)O_2$ films of different compositions, plotted in FIG. 20, also showed that water splitting (oxygen evolution reaction) occurred at the potential of −1.43V (vs. NHE) irrespective of the composition which was identical to that of pure $IrO_2$. The current density at −1.75V (vs. NHE) of $(Ir,Sn,Nb)O_2$ of different compositions with a total loading −0.3 mg/cm$^2$ identical to that of pure $IrO_2$ was plotted in FIG. 21. As shown in FIG. 21, the current density of $(Ir,Sn,Nb)O_2$ up to $x=0.30$ (40 mol. % $IrO_2$) was −0.0115±0.0002 A/cm$^2$ which was similar to that of pure $IrO_2$. The above results suggested that the capital cost i.e. the noble metal $IrO_2$ loading could be reduced by ~60 mol. % with the addition of $(Sn,Nb)O_2$ while still maintaining similar electrochemical activity as that of pure $IrO_2$. The electrochemical activity decreased with reduction in $IrO_2$ below 40 mol. % ($x=0.3$) which may be due to the lattice being predominantly dominated by $(Sn,Nb)O_2$ below 40 mol. % of $IrO_2$ and as a result, the $IrO_2$ concentration at the surface was likely depleted with respect to $(Sn,Nb)O_2$.

Figure 22:
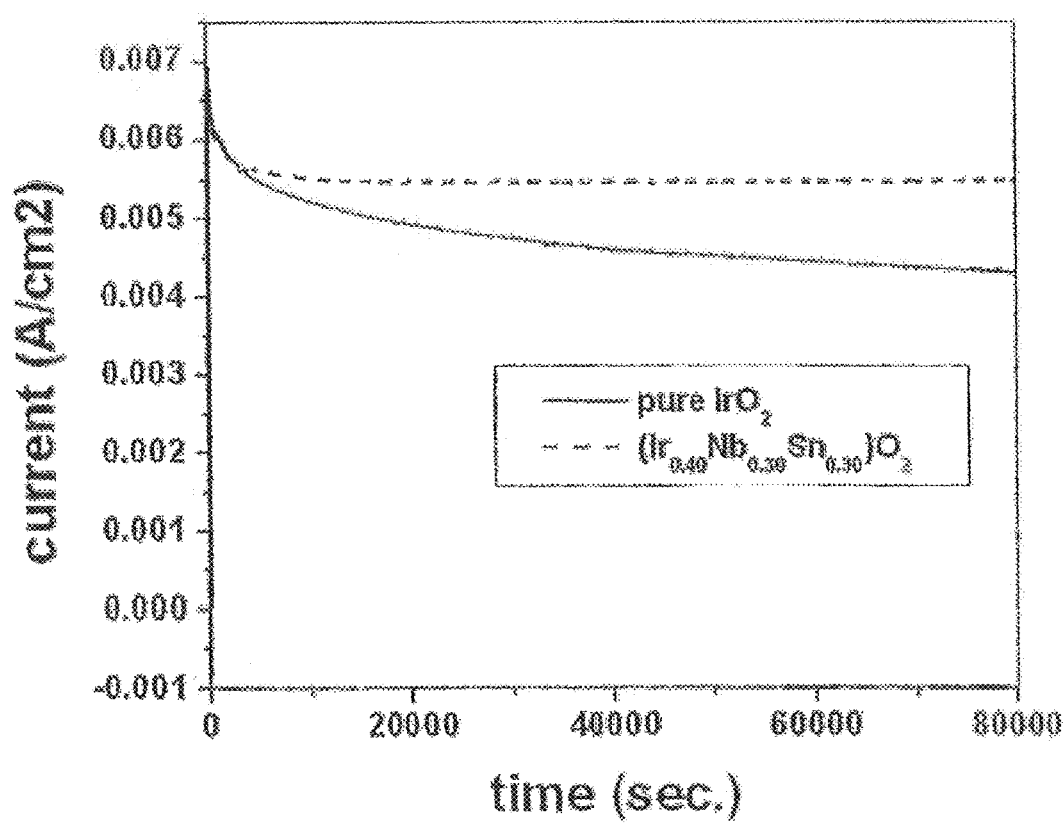
FIG. 22 is a plot showing variation of current vs. time in the chronoamperometry test of pure $IrO_2$ and $(Ir_{0.4}Sn_{0.3}Nb_{0.3})O_2$ performed in a 1M $H_2SO_4$ solution under ~1.65V/cm² at 40° C.
Figure 23:
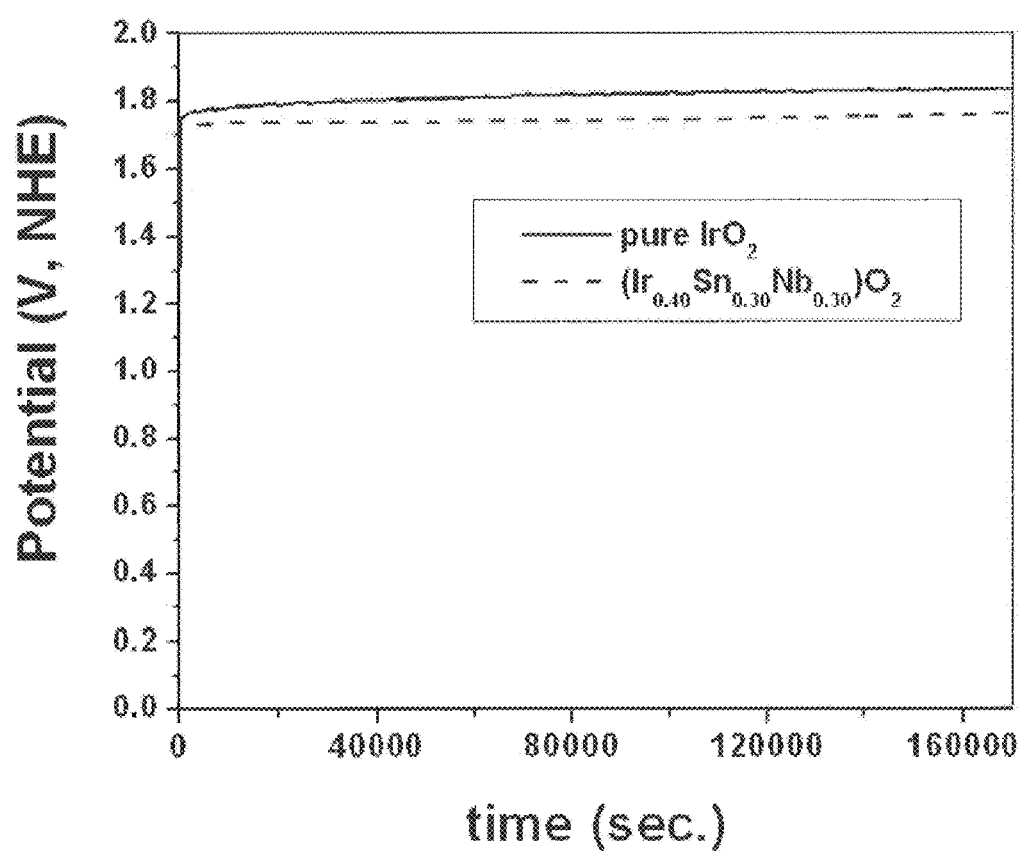
FIG. 23 is a plot showing variation of potential vs. time in the accelerated life test of pure $IrO_2$ and $(Ir_{0.4}Sn_{0.3}Nb_{0.3})O_2$ performed in a 1 M $H_2SO_4$ solution under 0.011 A/cm² at 40° C.

In order to assess the structural stability of anode electrocatalyst $(Ir,Sn,Nb)O_2$ in 1M $H_2SO_4$, chronoamperometry (CA) was conducted for 22 h at 40° C. at a constant voltage of ~1.65V and chronopotentiometry (CP) test was conducted for 44 h at 40° C. at a constant voltage of ~1.65V for select samples. The CA curves, obtained at a constant voltage of ~1.65V/cm$^2$, of $(Ir,Sn,Nb)O_2$ with a composition of $(Ir_{0.4}Sn_{0.3}Nb_{0.3})O_2$ along with pure $IrO_2$, are shown in FIG. 22. The CA curve showed a marked decay of current (13% of the initial value) for both electrodes in the initial period of 30 min during oxygen reduction processes which may be due to significant dissolution of irregular coatings located at the edge of the mud cracks or may be due to diffusion controlled reactions. A steady state of current −0.006 A/cm$^2$ had been achieved after 1 h of initial period for $(Ir_{0.4}Sn_{0.3}Nb_{0.3})O_2$, whereas pure $IrO_2$ showed a continuous drop in current at a constant rate may which may be due to the continuous loss of active $IrO_2$ catalyst from the surface. The CP curves, obtained at a constant current of ~0.011 A/cm$^2$, of $(Ir,Sn,Nb)O_2$ with a composition of $(Ir_{0.4}Sn_{0.3}Nb_{0.3})O_2$ along with pure $IrO_2$, are shown in FIG. 23. The CP results also showed a higher rate of increase of potential in the case of $IrO_2$ in comparison to $(Ir_{0.4}Sn_{0.3}Nb_{0.3})O_2$ which also confirmed that the dissolution rate of $IrO_2$ was higher in case of pure $IrO_2$ electrode in comparison to $(Ir_{0.4}Sn_{0.3}Nb_{0.3})O_2$. The ICP results, conducted in the $H_2SO_4$ electrolyte solution collected after 44 h of CP measurement, showed the presence of 0.44 ppm of Sn, 0.28 ppm of Nb and 0.14 ppm of Ir for $(Ir_{0.4}Sn_{0.3}Nb_{0.3})O_2$ whereas pure $IrO_2$ shows 0.35 ppm of Ir which suggested that the presence of $(Sn,Nb)O_2$ improved the corrosion rate of $IrO_2$. The improved corrosion of $(Ir,Nb,Sn)O_2$ electrode compared to that of pure $IrO_2$ electrodes was primarily attributed to the formation of a solid solution of $IrO_2$—$SnO_2$—$NbO_2$. Since both $SnO_2$ and $NbO_2$ were very stable chemically, the homogenous mixing of $IrO_2$ with $SnO_2$ and $NbO_2$ by forming a solid solution increased the overall chemical stability and decreased the rate of $IrO_2$ dissolution. This led to a significant increase in the electrode service life in the operating conditions of PEM-based water electrolysis. Therefore, identified were promising $(Sn,Nb)O_2$ supports or diluents for $IrO_2$ anode electrocatalyst with the ability to significantly reduce the noble metal oxide loading without compromising the electro-catalytic performance and chemical stability.

The above results clearly suggested that $(Ir,Sn,Nb)O_2$ with a composition up to 40 mol. % of $IrO_2$ ($x=0.3$) showed similar electrochemical activity in comparison to pure $IrO_2$ as an anode for PEM-based water electrolysis. The activity of the $(Ir,Sn,Nb)O_2$ electrocatalyst was expected to depend on the electronic structure as well as electronic conductivity, and the long term stability of the electrode was expected to depend on the cohesive energy. The effect of compositions on the electronic conductivity, and structural stability of the (Ir,Sn,Nb)$O_2$ as well as a shift of the d-band center in Ir with decrease of Ir-concentration in the material may be understood from the theoretical considerations. The computational component was an attempt to systematically investigate the electronic properties of the different solid solutions between $IrO_2$, $SnO_2$ and $NbO_2$ oxides described earlier. The following compositions of the solid solutions had been chosen to model the actual compounds considered: pure $IrO_2$, $(Sn_{0.5}Nb_{0.5})O_2$ and $(Ir_{0.75}Sn_{0.125}Nb_{0.125})O_2$, $(Ir_{0.50}Sn_{0.25}Nb_{0.25})O_2$ and $(Ir_{0.25}Sn_{0.375}Nb_{0.375})O_2$. The total energy, electronic and optimized crystal structures, total and projected densities of electronic stated together with the cohesive energies for the different compositions of (Ir,Sn,Nb)$O_2$ had been calculated using the first principle approach within the density functional theory. An effect of introduction of tin and niobium dioxides into $IrO_2$ on the electronic conductivity and structural stability of the compounds as well as a position of Ir d-band center with decrease of Ir-concentration in the material was considered. Pure $IrO_2$ corresponded to 0 mole % of tin and niobium oxides and thus represented a starting point for the example employing a full range of Sn and Nb concentrations. Table 3 summarizes the structural parameters calculated and experimentally obtained. The calculated structural parameters were in a good agreement with other experimental data. Calculated equilibrium molar volume, shown in FIG. 12, demonstrated the same dependence on Ir concentration as obtained experimentally. Slight overestimations of calculated lattice parameters and molar volumes were expected for GGA approximation utilized.

Figure 24:
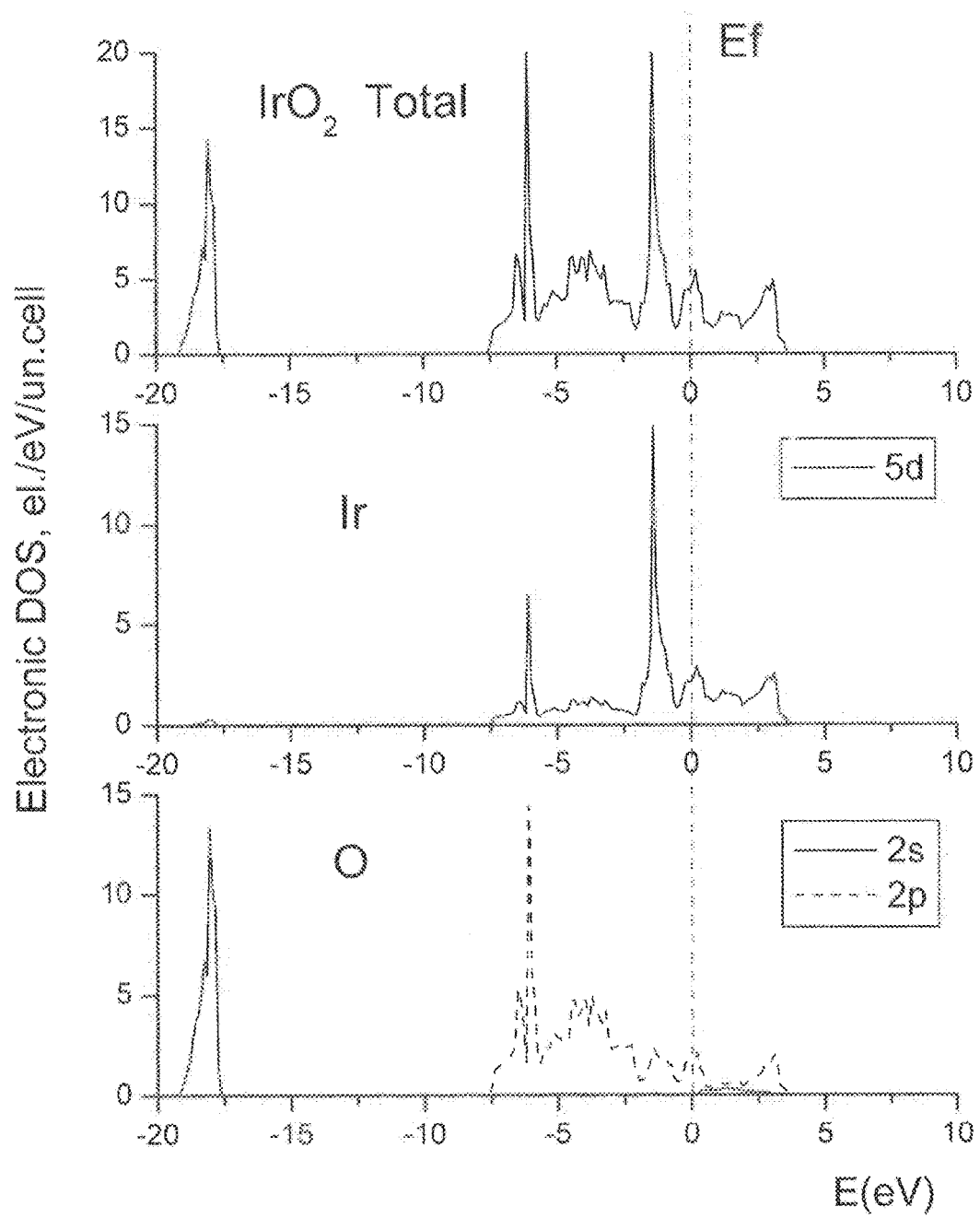
FIG. 24 is a plot showing total and partial DOS for $IrO_2$.
Figure 25:
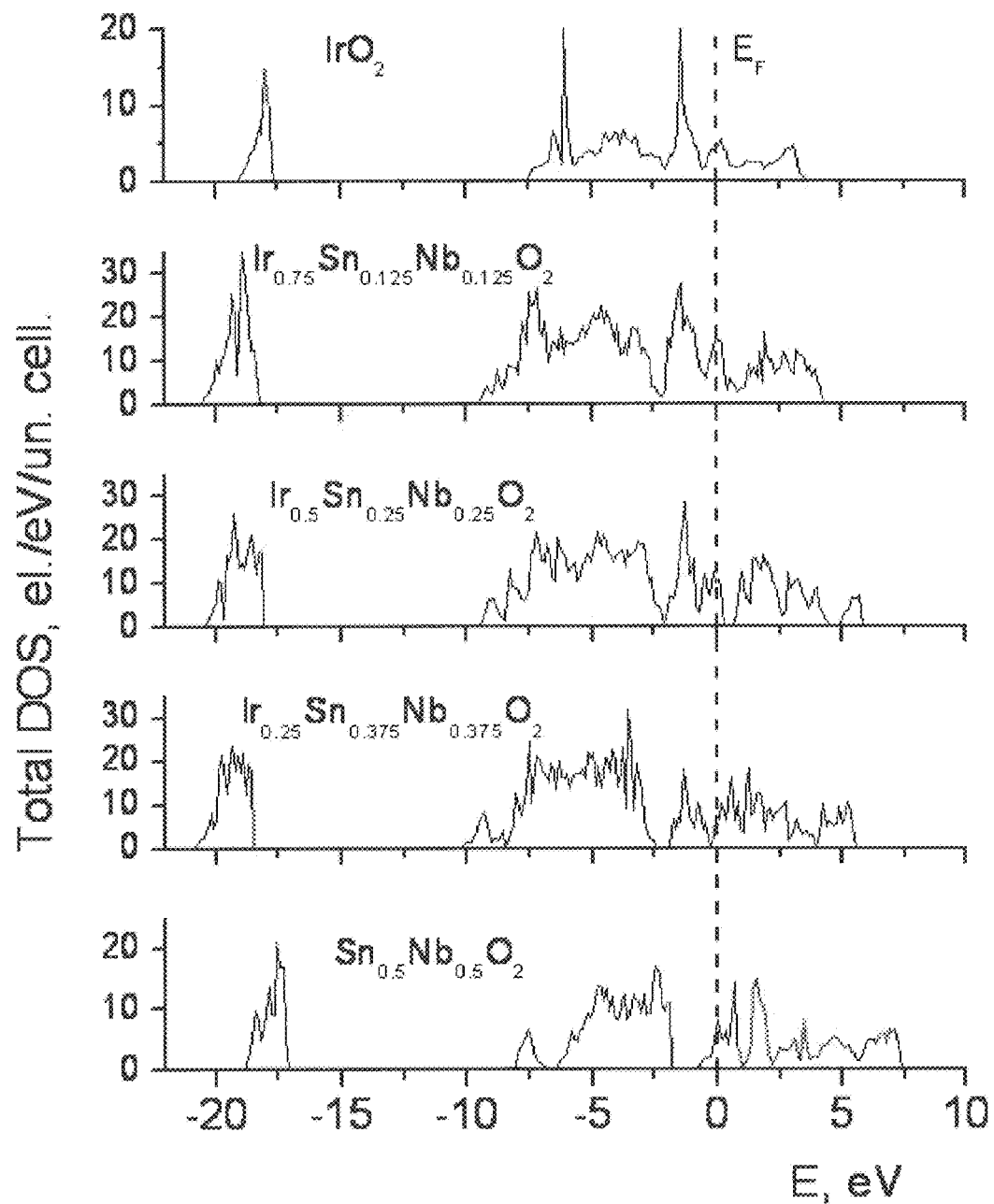
FIG. 25 is a plot showing total DOS for $(Ir_{1-2x}Sn_xNb_x)O_2$ with x=0.0, 0.125, 0.25, 0.375, 0.5.
Figure 26:
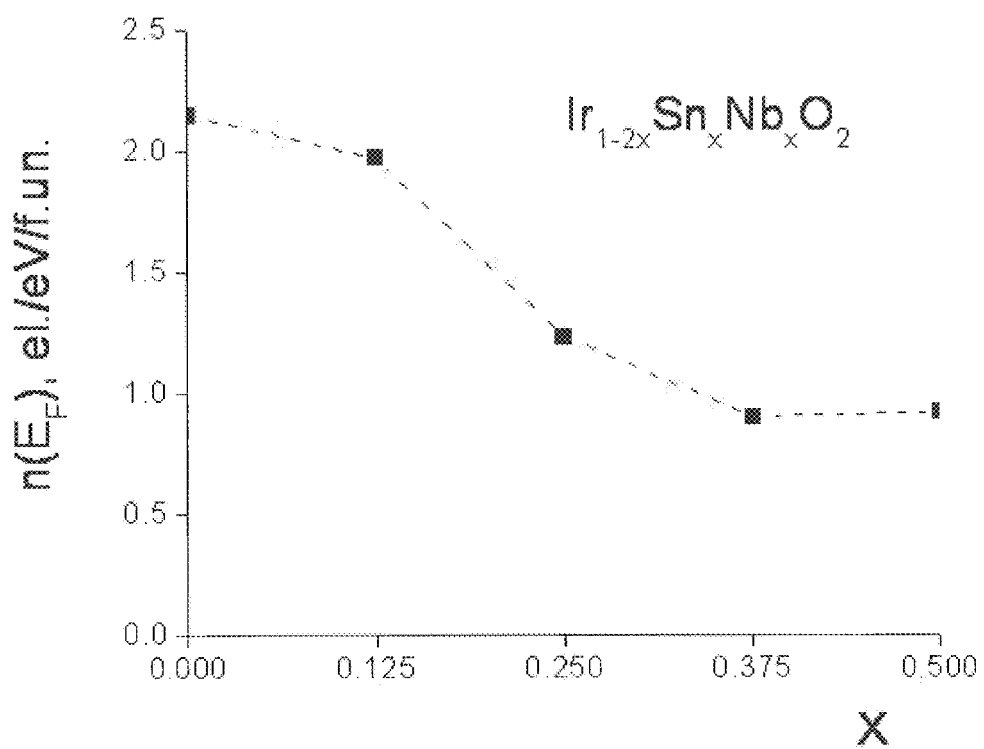
FIG. 26 is a plot showing DOS at Fermi level for different compositions of $(Ir_{1-2x}Sn_xNb_x)O_2$.

The total and projected densities of electronic states calculated for pure $IrO_2$ are shown in FIG. 24. The main energy band structure of $IrO_2$ consisted of two bands. The low energy band between −19.2 and −17.5 eV was composed of the 2s states of oxygen and the wide valence band around Fermi level consisted of hybridized O 2p-Ir 5d states with two prominent peaks corresponding to these O 2p and Ir 5d states and providing a metallic type of electronic conductivity characteristic of $IrO_2$. Introduction of Sn and Nb into $IrO_2$ matrix was supposed to change the electronic properties of the compound thus, the electronic structure of bulk as well as the electronic structure of the most stable surface had been calculated for ternary compositions of $(Ir_{1-2x}Sn_xNb_x)O_2$ with x=0, 0.125, 0.25, 0.375, and 0.5. Total electronic densities of states for all these compositions are shown in FIG. 25. All the compounds demonstrated metallic behavior although to different extents. Since in general, metallic conductivity was proportional to the density of states at Fermi level n(EF), it provided an opportunity to qualitatively evaluate the correlation between residual amount of Ir in the ternary compounds and the electronic conductivity of the materials. FIG. 26 shows the dependence of $n(E_F)$ vs. composition of (Ir—Sn—Nb)$O_2$. For comparison, the values of $n(E_F)$ were normalized to electrons per one $(Ir_{1-2x}Sn_xNb_x)O_2$ formula unit. The graph showed that the conductivity decreased with decrease of Ir-content up to 0.25 atoms per formula unit (x=0.375) and then the conductivity value was maintained almost the same as zero content of Ir. Poor electronic conductivity was customarily expected to impair the overall catalytic activity of the material, however reduction in the conductivity with decrease of $IrO_2$ concentration up to 50 mol. % most likely was not sufficient to significantly deteriorate the catalytic properties of the material as confirmed by the experimental results shown in FIGS. 20 and 21.

There is the existence of a simple descriptor for determining the catalytic activity of the surface. This descriptor had been defined as a gravity center of d-band of the noble metal $\varepsilon_d$ usually located in the vicinity of the Fermi level. An optimal position of the d-band center provided an optimal interaction between the catalytic surface and the various species participating in the catalytic reactions predominantly occurring at the surface. Since, such an interaction should be considered 'just right' implying resulting in a moderate effect allowing reagents and products to adsorb at the surface and leave also most efficiently. Thus an adjustment of the d-band center position with respect to the Fermi level may play a critical role in designing novel catalyst materials.

The electronic structure of the stable surfaces for the above mentioned Ir-based oxides had been calculated and the positions of corresponding Ir d-band centers had been obtained as a first moment of $n_d(E)$:

$$\varepsilon_d = \int n_d(E) E dE / \int n_d(E) dE.$$

Figure 27:
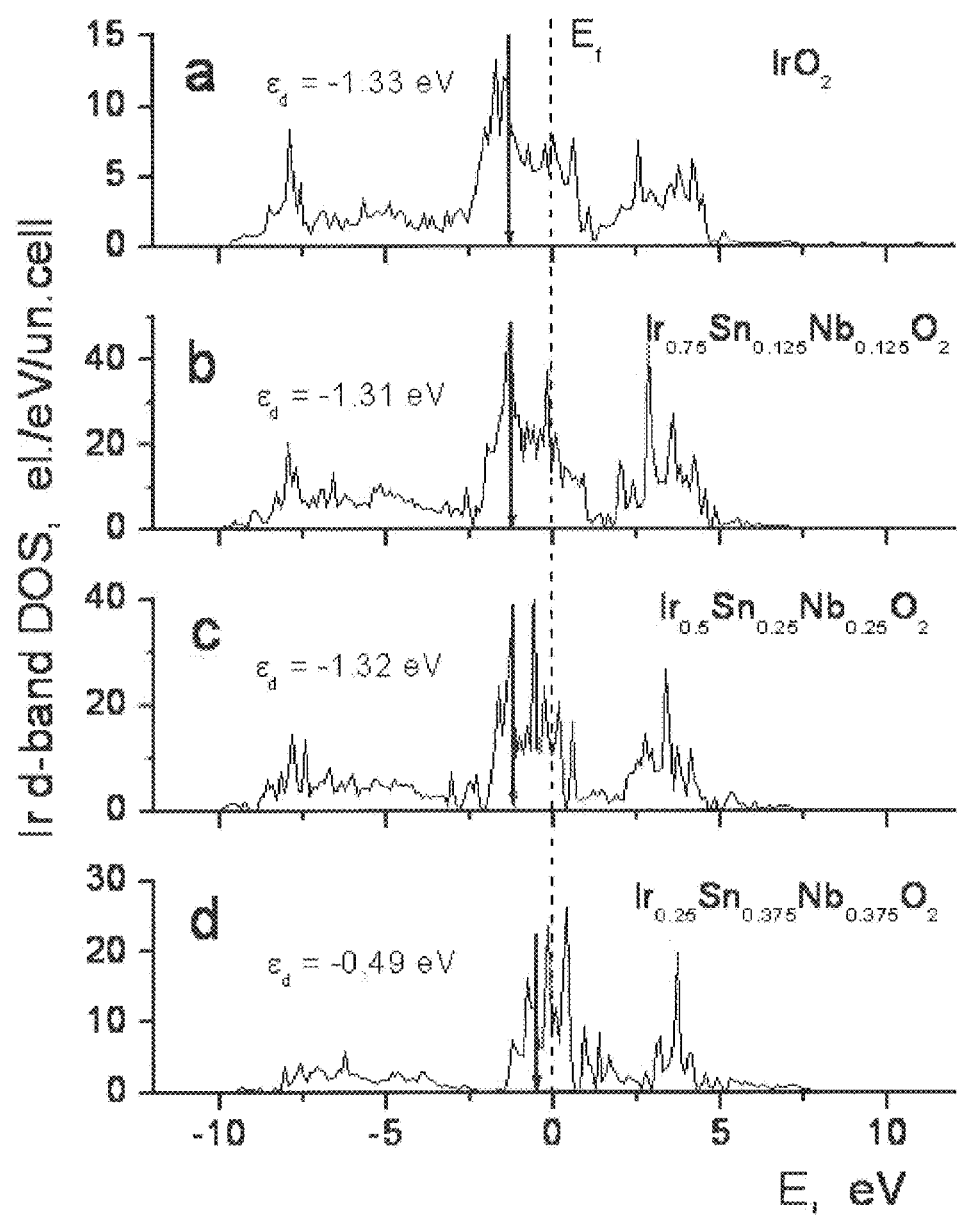
FIG. 27 is a plot showing Ir d-band partial DOS for different Ir-concentrations (arrows denote positions of d-band centers $\varepsilon_d$)

FIG. 27 shows partial Ir d-band densities of states together with corresponding centers of these zones marked with vertical arrows on the graphs. The d-centers for Ir compositions from 100 at % up to 50 at % of $IrO_2$ located virtually at the same position with respect to the Fermi level (−1.31-- 1.33 eV). However, further decrease of Ir-content caused a noticeable shift of Ir d-band center upward and for 25 mol. % of $IrO_2$ $\varepsilon_d$ reached its position at −0.49 eV indicating that in general, an overall chemisorptions reaction of different species reacting at the surface was noticeably stronger at this composition rather than at higher Ir content. Assuming that pure $IrO_2$ demonstrated an optimal catalytic activity corresponding to $\varepsilon_d$=−1.33 eV a significant drop in the activity observed experimentally for $IrO_2$ content below 40 mol. % (see FIG. 14) could be most likely explained by a positive shift of the Ir d-band center deviating the catalytic activity from its optimal value. Such a behavior of the d-band center could be attributed to complex hybridization of electronic Ir d-states and corresponding d- and s, e-states of Nb, Sn and O during formation of the solid solution ternary oxide.

The cohesive energy $E_{coh}$ was calculated for the materials considered and collected in Table 2. Decrease of Ir concentration in the compound led to an increase in the $E_{coh}$ values (more negative values) and thus, resulted in an overall improved structural and chemical stability of the oxide. Such an improvement may be due to presence of much stronger Nb—O bonds in comparison with Ir—O ones (calculated $E_{coh}$ for pure $NbO_2$ is −18.251 eV/f·un. vs. −15.859 eV/f·un. for $IrO_2$). An increase in the cohesive energy of the iridium oxide doped with tin and niobium indicated an even better structural and chemical stability of the new material in comparison to the original pure $IrO_2$.

Conclusions

Nanostructured solid solution of $IrO_2$, $SnO_2$ and $NbO_2$, denoted as (Ir,Sn,Nb)$O_2$, coated as a thin film on Ti foil had been considered as a promising oxygen reduction anode electrocatalyst for PEM-based water electrolysis. A homogeneous mixture of $IrCl_4$, $SnCl_2 \cdot 2H_2O$ and $NbCl_5$ ethanol solution in a wide range of compositions was coated on pretreated Ti foil. The (Ir,Sn,Nb)$O_2$ solid solution in a wide range of compositions corresponding to $(Ir_{1-2x}Sn_xNb_x)O_2$ with x=0, 0.125, 0.20, 0.25, 0.30, 0.35, 0.40, 0.425 and 0.50 had been synthesized by thermal decomposition of metal precursors coated on Ti foil at 723K for 6 h in air. The molar volume of $(Ir_{1-2x}Sn_xNb_x)O_2$, calculated from least square refinement techniques, had been identified to increase with increasing amount of Sn and Nb due to the higher ionic radii of $Nb^{+4}$ (68 pm) and $Sn^{+4}$ (69 pm) compared to $Ir^{+4}$ (62.5 pm). It had also been identified that the crystallite size of $(Ir_{1-2x}Sn_xNb_x)O_2$ decreased significantly with increase of $(Sn,Nb)O_2$ content above x=0.30. The electrochemical performance of $(Ir_{1-2x}Sn_xNb_x)O_2$ as a promising oxygen reduction electrocatalyst had been carried out in the presence of 1N $H_2SO_4$ as a fuel at 40° C. The electrochemical activity, measured as a current at 1.75V (vs. NHE), of $(Ir,Sn,Nb)O_2$ showed similar performance up to 40 mol. % $IrO_2$ (x=30) whereas $(Ir_{0.20}Sn_{0.40}Nb_{0.40})O_2$ shows only 20% lower activity in comparison to pure $IrO_2$. Therefore, a significant reduction of noble metal oxide loading could be achieved in the presence of $(Sn,Nb)O_2$ support, and as a result a significant reduction in capital cost of PEM-based water electrolyzers without resulting in major alterations, compromises or reduction in the electrochemical performance. The $(Sn0.5Nb0.5)O_2$ support also improved the corrosion stability of the $IrO_2$ electro-catalyst in oxygen reduction processes. The excellent electrochemical activity exhibited by the solid solutions as well as the anticipated long term structural stability of $(Ir,Sn,Nb)O_2$ during water electrolysis had been shown using first-principles calculations of the total energies, electronic structures and cohesive energies of the model systems.

TABLE 1

Composition of homogeneous mixture of $IrCl_4$, $SnCl_2 \cdot 2H_2O$ and $NbCl_5$ used to generate (Ir, Nb, Sn)$O_2$ film on Ti foil after thermal treatment at 723 K and the nominal compositions of (Ir, Sn, Nb)$O_2$ in at. %. The elemental compositions of (Ir, Sn, Nb)$O_2$ film obtained by EDX analysis is also tabulated.

| Composition studied | Nominal oxide composition at at. % | Composition by EDX analysis |
| --- | --- | --- |
| $IrCl_4$ | $IrO_2$ | |
| $SnCl_2 \cdot 2H_2O$ | $SnO_2$ | |
| 0.50 mole $SnCl_2 \cdot 2H_2O$ + 0.50 mole $NbCl_5$ | 50 at. % $SnO_2$-50 at. % $NbO_2$ $(Sn_{0.5}Nb_{0.5})O_2$ | 48 at. % Sn-52 at. % Nb |
| 0.75 mole $SnCl_4$ + 0.125 mole $SnCl_2 \cdot H_2O$ + 0.125 mole $NbCl_5$ | 75 at. % $IrO_2$-12.5 at. % $SnO_2$-12.5 at. % $NbO_2$ | 76 at. % Ir-11 at. % Sn-13 at. % Nb |
| 0.60 mole $IrCl_4$ + 0.20 mole $SnCl_2 \cdot H_2O$ + 0.20 mole $NbCl_5$ | 60 at. % $IrO_2$-20 at. % $SnO_2$-20 at. % $NbO_2$ | 55 at. % Ir-22 at. % Sn-23 at. % Nb |
| 0.50 mole $IrCl_4$ + 0.25 mole $SnCl_2 \cdot H_2O$ + 0.25 mole $NbCl_5$ | 50 at. % $IrO_2$-25 at. % $SnO_2$-25 at. % $NbO_2$ | 44 at. % Ir-26 at. % Sn-30 at. % Nb |
| 0.40 mole $IrCl_4$ + 0.30 mole $SnCl_2 \cdot H2O$ + 0.30 mole $NbCl_5$ | 40 at. % $IrO_2$-30 at. % $SnO_2$-30 at. % $NbO_2$ | 36 at. % Ir-29 at. % Sn-35 at. % Nb |
| 0.30 mole $IrCl_4$ + 0.35 mole $SnCl_2 \cdot H2O$ + 0.35 mole $NbCl_5$ | 30 at. % $IrO_2$-35 at. % $SnO_2$-35 at. % $NbO_2$ | 26 at. % Ir-34 at. % Sn-40 at. % Nb |
| 0.20 mole $IrCl_4$ + 0.40 mole $SnCl_2 \cdot H_2O$ + 0.40 mole $NbCl_5$ | 20 at. % $IrO_2$-40 at. % $SnO_2$-40 at. % $NbO_2$ | 23 at. % Ir-34 at. % Sn-43 at. % Nb |
| 0.15 mole $IrCl_4$ + 0.45 mole $SnCl_2 \cdot H_2O$ + 0.45 mole $NbCl_5$ | 15 at. % $IrO_2$-45 at. % $SnO_2$-45 at. % $NbO_2$ | 17 at. % Ir-40 at. % Sn-43 at. % Nb |

TABLE 2

Lattice parameter, molar volumes and crystallite size of $IrO_2$, $SnO_2$, $(Sn, Nb)O_2$ and $(Ir, Sn, Nb)O_2$ of different compositions.

| Composition | a = b (nm) | c (nm) | $V_m$ (cm$^3$/mol) | CS (nm) |
| --- | --- | --- | --- | --- |
| $IrO_2$ | 0.4537 | 0.3169 | 19.64 | 14 |
| $SnO_2$ | 0.4736 | 0.3188 | 21.53 | 10 |
| $(Sn_{0.5}Nb_{0.5})O_2$ | 0.4751 | 0.3149 | 21.40 | 8 |
| $(Ir_{0.75}Sn_{0.125}Nb_{0.125})O_2$ | 0.4565 | 0.3414 | 19.74 | 8.5 |
| $(Ir_{0.6}Sn_{0.2}Nb_{0.2})O_2$ | 0.4578 | 0.3416 | 19.83 | 8.4 |
| $(Ir_{0.5}Sn_{0.25}Nb_{0.25})O_2$ | 0.4589 | 0.3139 | 19.90 | 9 |
| $(Ir_{0.4}Sn_{0.3}Nb_{0.3})O_2$ | 0.4599 | 0.3132 | 19.96 | 9 |
| $(Ir_{0.3}Sn_{0.35}Nb_{0.35})O_2$ | 0.4608 | 0.3131 | 20.02 | 3.7 |
| $(Ir_{0.20}Sn_{0.40}Nb_{0.40})O_2$ | | | | 3.3 |
| $(Ir_{0.15}Sn_{0.425}Nb_{0.425})O_2$ | | | | 3 |

TABLE 3

Calculated and experimental (in parenthesis) lattice parameters, cohesive energy and density of electronic states at Fermi level

| Composition | a = b (A) | c (A) | $V_m$ (cm$^3$/mol) | Ecoh (eV/f.u.) | n(Ef) eI./eV/f.u. |
| --- | --- | --- | --- | --- | --- |
| $IrO_2$ | 4.511 (4.537) | 3.235 (3.169) | 19.82 (19.64) | −15.859 | 2.15 |
| $SnO_2$ | 4.772 (4.736) | 3.216 (3.188) | 22.13 (21.53) | −15.237 | 0 |
| $(Ir_{0.75}Sn_{0.125}Nb_{0.125})O_2$ | 4.633 (4.565) | 3.182 (3.414) | 20.57 (19.74) | −16.964 | 1.97 |
| $(Ir_{0.50}Sn_{0.25}Nb_{0.25})O_2$ | 4.722 (4.589) | 3.147 (3.139) | 21.13 (19.90) | −17.315 | 1.23 |
| $(Ir_{0.25}Sn_{0.375}Nb_{0.375})O_2$ | 4.746 (4.608) | 3.203 (0.3131) | 21.72 (20.02) | −17.560 | 0.90 |
| $(Sn_{0.5}Nb_{0.5})O_2$ | 4.782 (4.751) | 3.206 (3.149) | 22.07 (21.40) | −16.594 | 0.92 |

Example 3

The electronic structures of $CaNb_2O_6$, $SnTa_2O_6$, $Ca_2Nb_2O_7$, and $Ca_2Ta_2O_7$ compounds were doped with small amounts of elements from 3A, 3B, 5B, 6A groups of the Periodic Table as well as F from group VII.

Theoretical Approaches and Details of the Methodology

For calculating the total energies, electronic structure and density of electronic states the Vienna Ab-initio Simulation Package (VASP) was used within the projector-augmented wave (PAW) method and the generalized gradient approximation (GGA) for the exchange-correlation energy functional in a form suggested by Perdew and Wang. This program calculated the electronic structure and via the Hellmann-Feynman theorem, the inter-atomic forces were determined from first-principles. Standard PAW potentials were employed for the elemental constituents of all pure and doped compounds in the study.

For all the materials considered the plane wave cutoff energy of 520 eV had been chosen to maintain high accuracy of the total energy calculations. The lattice parameters and internal positions of atoms were fully optimized during the double relaxation procedure employed, and consequently, the minima of the total energies with respect to the lattice parameters and internal ionic positions had been determined. This geometry optimization was obtained by minimizing the Hellman-Feynman forces via a conjugate gradient method, so that the net forces applied on every ion in the lattice are close to zero. The total electronic energies were converged within 10-5 eV/un·cell resulting in the residual force components on each atom to be lower than 0.01 eV/Å/atom, thus allowing for the accurate determination of the internal structural parameters. Since the doped structures contained a small amount of additional elements, it was expected that the equilibrium volume of the basic unit cell was not substantially altered. Hence, only internal atomic positions had been optimized during the calculations keeping the volumes of the unit cells identical to that of the corresponding undoped parent materials.

The Monkhorst-Pack scheme was used to sample the Brillouin Zone (BZ) and generated the k-point grid for the solids and the different isolated atoms used. A choice of the appropriate number of k-points in the irreducible part of the BZ was based on convergence of the total energy to be 0.1 meV/atom. For pure and doped forms of $CaTa_2O_6$, $CaNb_2O_6$, as well as for $Ca_2Ta_2O_7$ and $Ca_2Nb_2O_7$, the following numbers of k-points in the irreducible parts of BZ were used: 84, 84, 39, and 39 points, respectively. For the total energy calculations of isolated atoms of all elements comprising the materials considered, a cubic box with edges of $10\times10\times10$ Å$^3$ was chosen to eliminate possible interaction between atoms caused by the periodic boundary conditions. Test calculations with the box size of $15\times15\times15$ Å$^3$ for an isolated oxygen atom had shown a difference in total energies within 0.2 meV/atom with respect to the box size of $10\times10\times10$ Å$^3$, which was small enough not to contribute a significant error in the calculations of the cohesive energy. Thus, $10\times10\times10$ Å$^3$ box size had been used for all the other elements. $CaNb_2O_6$ and $CaTa_2O_6$ adopted orthorhombic crystal structures with Pbcn and Pnma space groups respectively, and 36 atoms in the conventional unit cell (Z=4) [29, 30]. $Ca_2Nb_2O_7$ and $Ca_2Ta_2O_7$ exhibited the same pyrochlore type of structure with Fd-3m space group and Z=8 (88 at/unit cell). It was important that all the structures were considered to be optimized during the total energy calculations and hence, this spatial atomic distribution could be considered to be a very reasonable initial configuration for conducting further numerical optimization studies.

Results

The electronic structures of orthorhombic $CaNb_2O_6$ and $CaTa_2O_6$ were very close due to the isoelectronic similarity of Nb and Ta. It was also for this reason that $Sn_2Nb_2O_7$ and $Sn_2Ta_2O_7$ with the pyrochlore structure exhibited similar characteristics. Table 4 shows the structural parameters of the oxides obtained experimentally and from calculations. The results of the calculations obtained from the structural optimization were in very good agreement with experimental measurements and were characterized by an error of less than 1.0% for orthorhombic structures and ~1.2% for pyrochlore compounds. This margin of error is common for calculations utilizing the GGA approximation for the exchange-correlation potential.

Figure 28A:
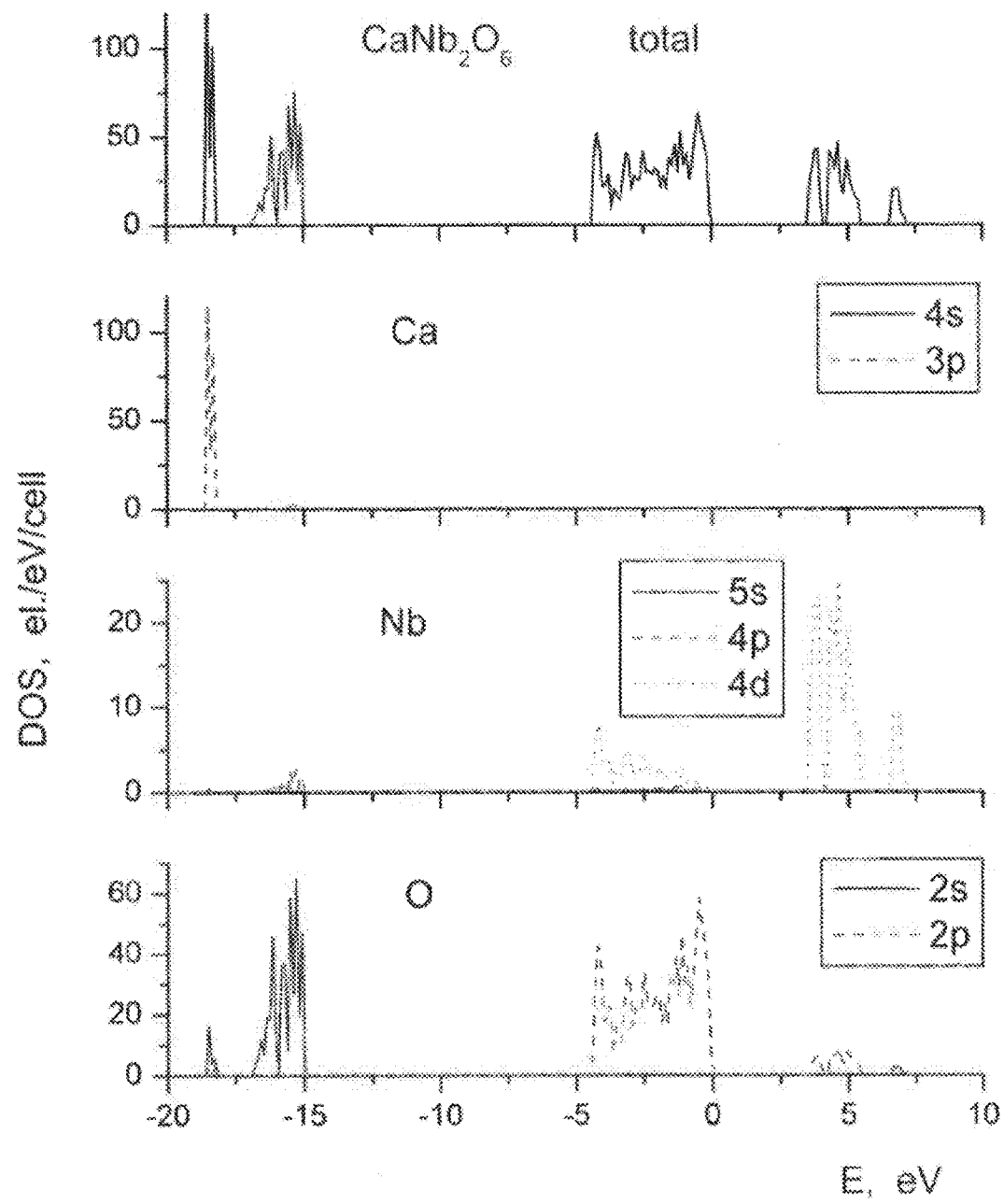
FIG. 28a is a plot showing electronic density of states for pure $CaNb_2O_6$.
Figure 28B:
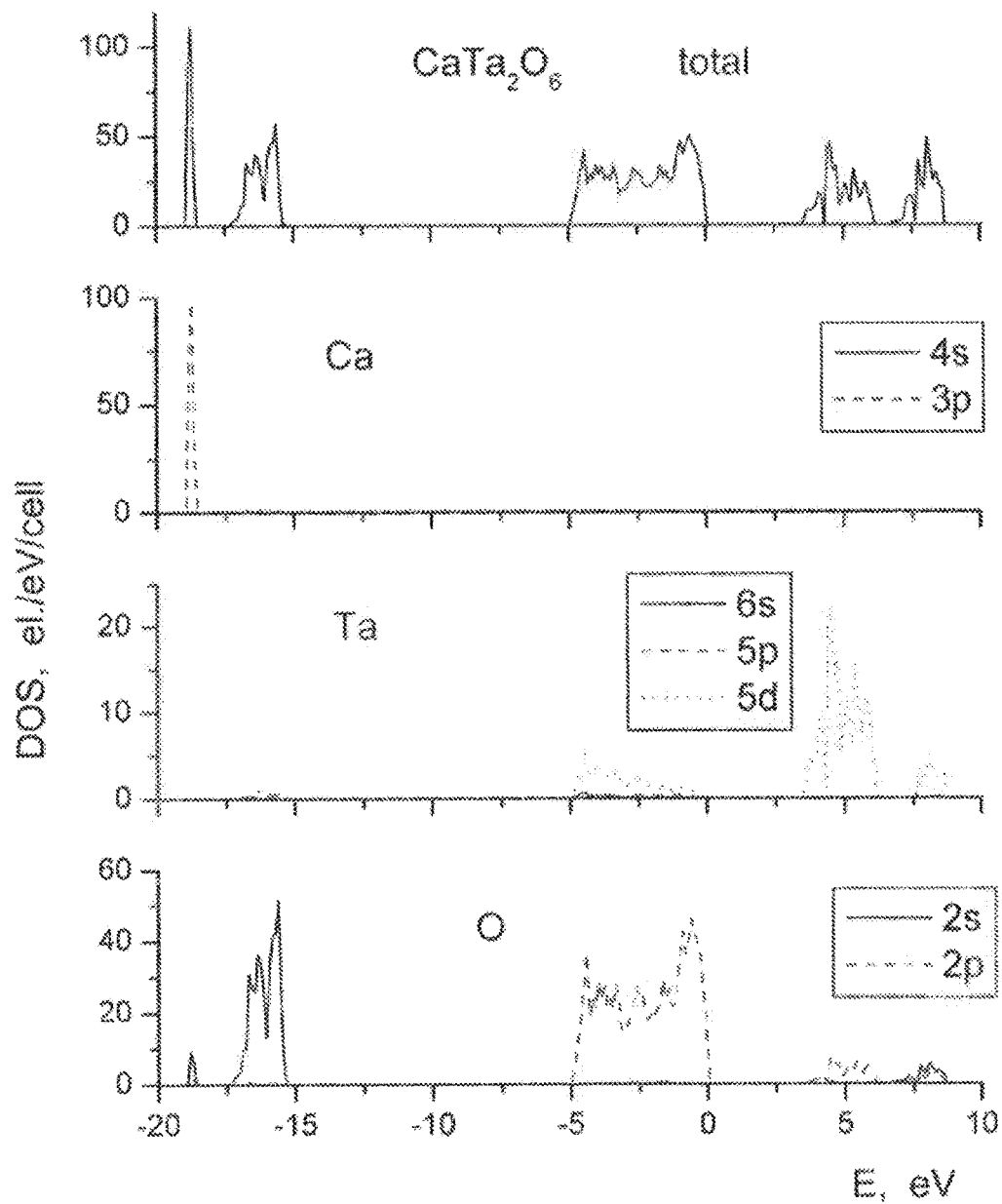
FIG. 28b is a plot showing electronic density of states for pure $CaTa_2O_6$.
Figure 29A:
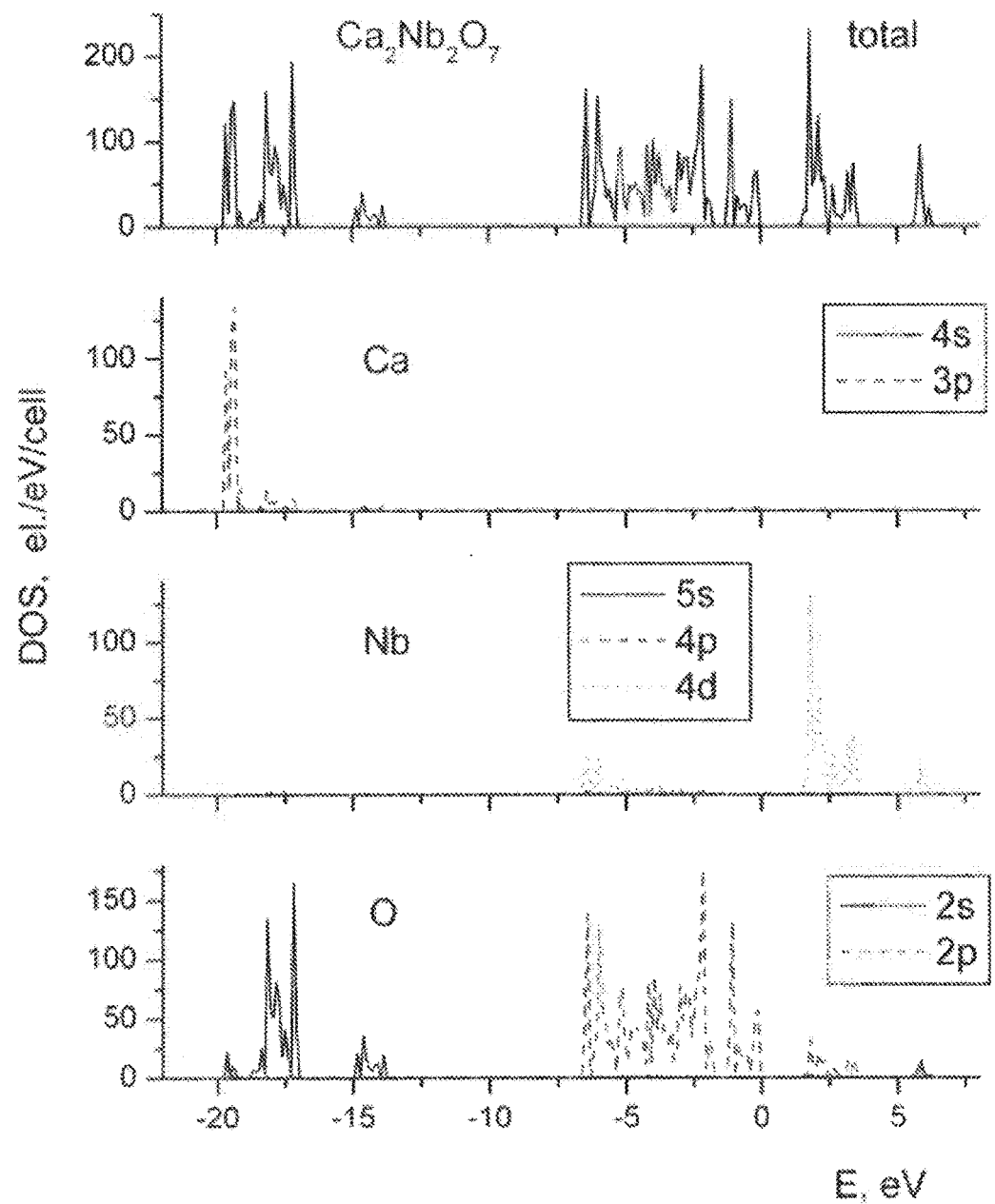
FIG. 29a is a plot showing electronic density of states for pure $Ca_2Nb_2O_7$.
Figure 29B:
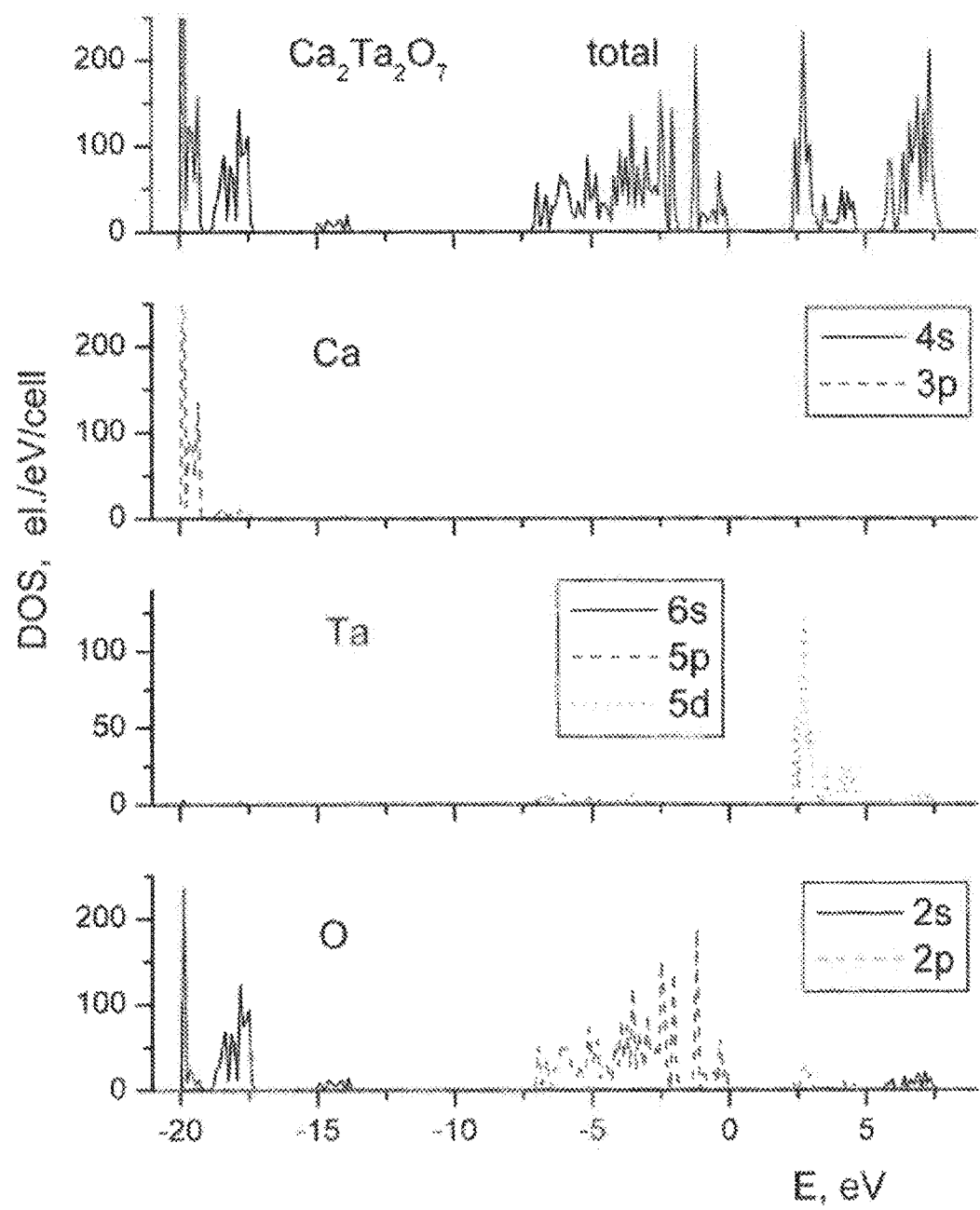
FIG. 29b is a plot showing electronic density of states for pure $Ca_2Ta_2O_7$.

FIGS. 28 and 29 show the total (DOS) and partial (PDOS) density of electronic states for all the four parent materials. The energy scale has been shifted in such a way that the zero corresponds to the Fermi energy. The occupied bands of all the materials consisted of Ca3p, O2s, O2p, and, to some extent, Nb or Ta d-orbitals. The valence band consisted primarily of O2p states with small admixture of transition metal d-orbitals. The conduction bands of the materials were composed of Nb4d or Ta5d orbitals hybridized with another part of O2p states. All of the materials demonstrated a forbidden energy gap between the valence and conduction bands. Values of the band gaps (BG) calculated within the DFT methodology were usually underestimated, so that the absolute calculated values of BGs were not be taken into quantitative consideration. Electronic structure calculations for these oxides reported in the literature demonstrated the same features as discussed above thus validating data obtained in the example.

Since all the four oxides are semiconductors, their electronic conductivity was still inadequate for use as electrode materials for electrolysis.

One atom of each dopant had been placed into the elementary cell (pyrochlore structure doped with fluorine was the only exception, where two oxygen atoms out of 56 in the unit cell were replaced by fluorine atoms). Such a selection eliminated any uncertainty in the atomic configurations occurring due to the presence of multiple (two or more) doping atoms in the unit cell. For example, the 36 atom elementary unit cell of the orthorhombic $Ca(Nb/Ta)_2O_6$ contained 4 Ca, 8 Nb or Ta, and 24 O ions, so that those elements substituted for Ca in the unit cell replaced one Ca atom out of the four available. Similarly, only one atom from the 6B-group was substituted for one atom of Nb or Ta out of the existing 8 sites and one atom of F replaced one out of 24 oxygen atoms available in the unit cell. In the case of the pyrochlore structure the 88 atomic elementary unit cell contained 16 Ca atoms, 16 Nb or Ta atoms and 56 O. Again, only one atom of each dopant substituted for the corresponding atomic site of Ca, Nb, or Ta out of the 16 available for each site, but as mentioned above, two F atoms replaced two oxygen atoms out of 56 available to maintain a reasonable F-concentration in the materials. The valence electronic configurations of Ca, Nb, Ta, and O atoms were $4s^23p^6$, $4p^65s_14d^4$, $6s^25d^3$, and $2s^22p^4$, respectively. The electronic configurations for Sc, Y are $4s^23d^1$, $4s^24p^65s^24d^1$, respectively; for B, Al, Ga, In are $2s^22p^1$, $3s^23p^1$, $3d^{10}4s^24p^1$, $4d^{10}5s^25p^1$, respectively; for As, Sb, Bi are $4s^24p^3$, $5s^25p^3$, $6s^26p^3$, respectively; for Cr, Mo, W are $3d^54s^1$, $4d^55s^1$, $5d^46s^2$, respectively; for F—$2s^22p^5$.

Since, the niobates and tantalates considered have similar electronic structure (compare FIGS. 28 and 29) the results focused on calcium niobates doped with the different elements mentioned above. Most of the conclusions derived on doped calcium niobates can also be applied to the corresponding iso-electronic calcium tantalates, and hence the results obtained for calcium tantalates are shown mainly for illustration purposes.

Ca(Nb/Ta)2O6 with Dopants

Due to the isoelectronic nature of elements belonging to the same group of the Periodic Table, the electronic structure changes resulted from doping of such elements qualitatively were very similar, so that it discussed in detail only one or two representative dopants from each group and mention briefly the results for other members of the particular periodic group.

3A and 3B Group Elements

Figure 30A:
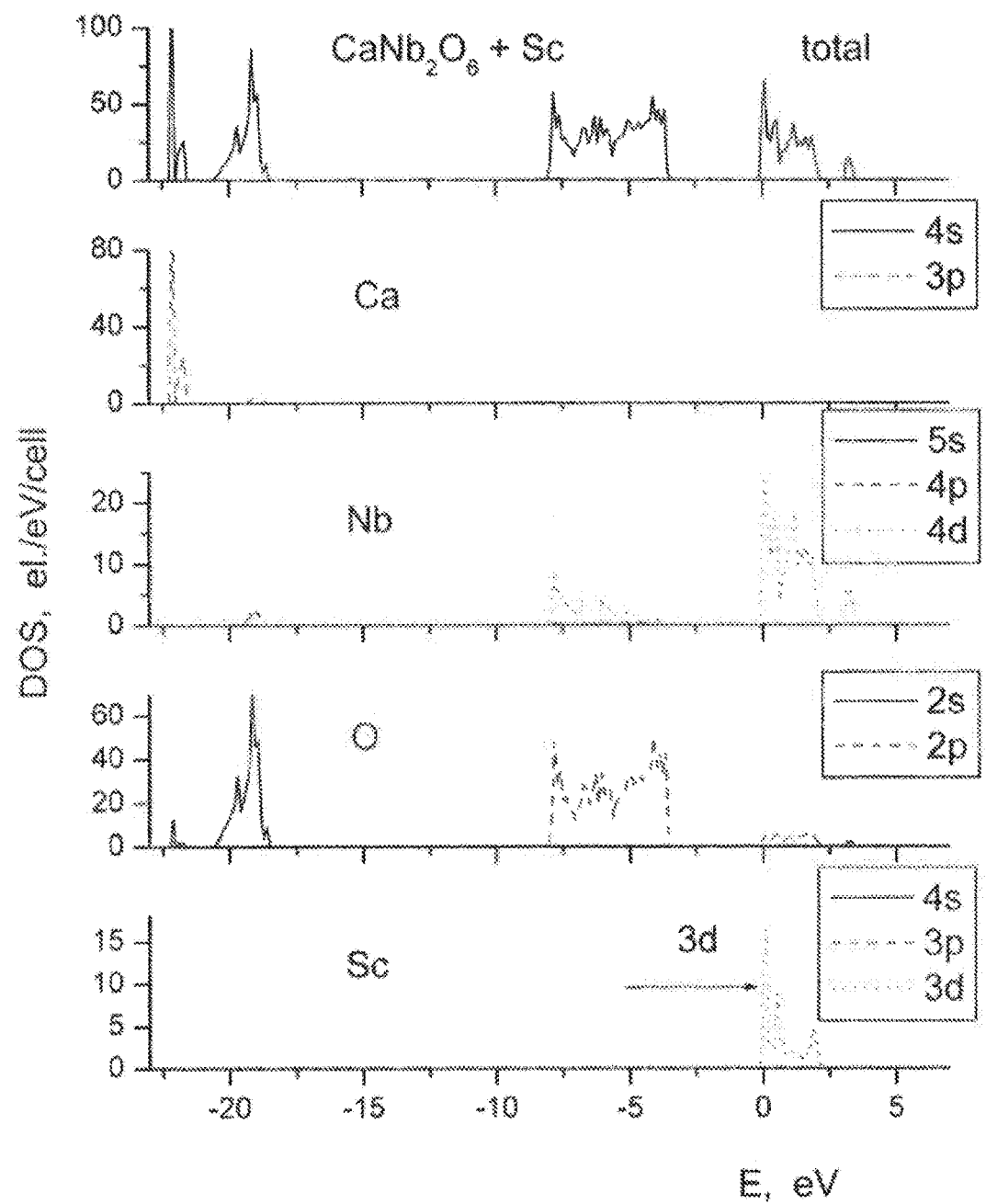
FIG. 30a is a plot showing electronic density of states for $CaNb_2O_6$ doped with Sc.

As it was mentioned above, Sc and Y were chosen from 3A group and B, Al, Ga, In from 3B. All the elements had valence +3, so that they served as donors of additional free electrons when replaced for divalent $Ca^{2+}$. The total and partial electronic densities of states calculated for $Ca_{0.75}Sc_{0.25}Nb_2O_6$ are shown on FIG. 30a. Almost identical results were obtained for Y-doping due to the same outer electronic configuration. The doped system demonstrated very similar electronic structure as undoped $CaNb_2O_6$ oxide (compare FIG. 28a and FIG. 30a). The only prominent difference was that in the doped system the Fermi level shifted toward conduction band making this material metallically conductive. It occurred due to strong hybridization of Sc 3d (or Y 4d) and Nb 4d zones forming the conduction band occupied with additional electrons being brought into the system by the donor serving Sc- or Y-doping. The band gap value between valence and conduction bands was not changed during doping and remains ~3.4 eV. Sc- and Y-doping of $CaTa_2O_6$ demonstrate the same results as for $CaNb_2O_6$ discussed above.

Figure 30B:
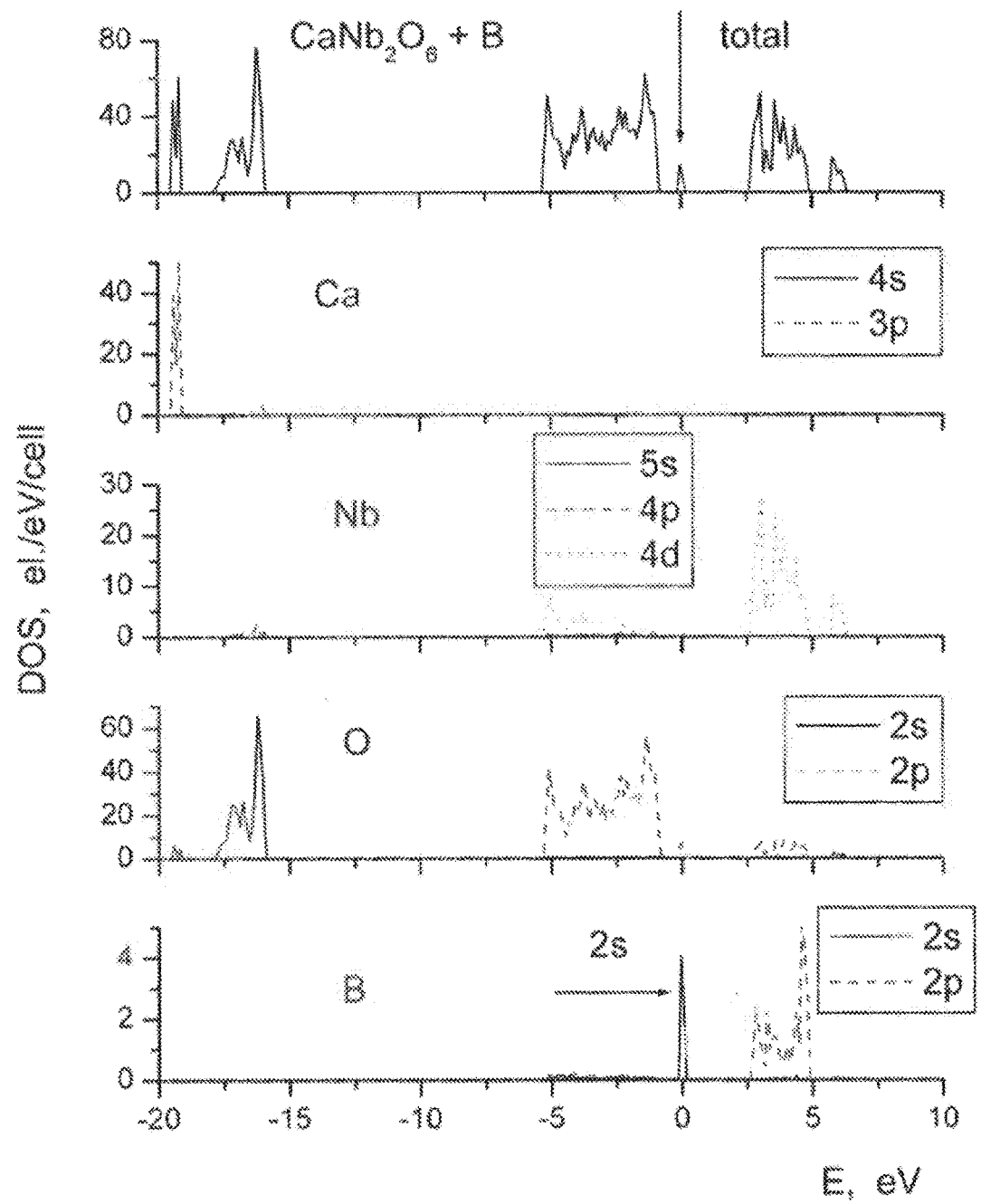
FIG. 30b is a plot showing electronic density of states for $CaNb_2O_6$ doped with B.
Figure 30C:
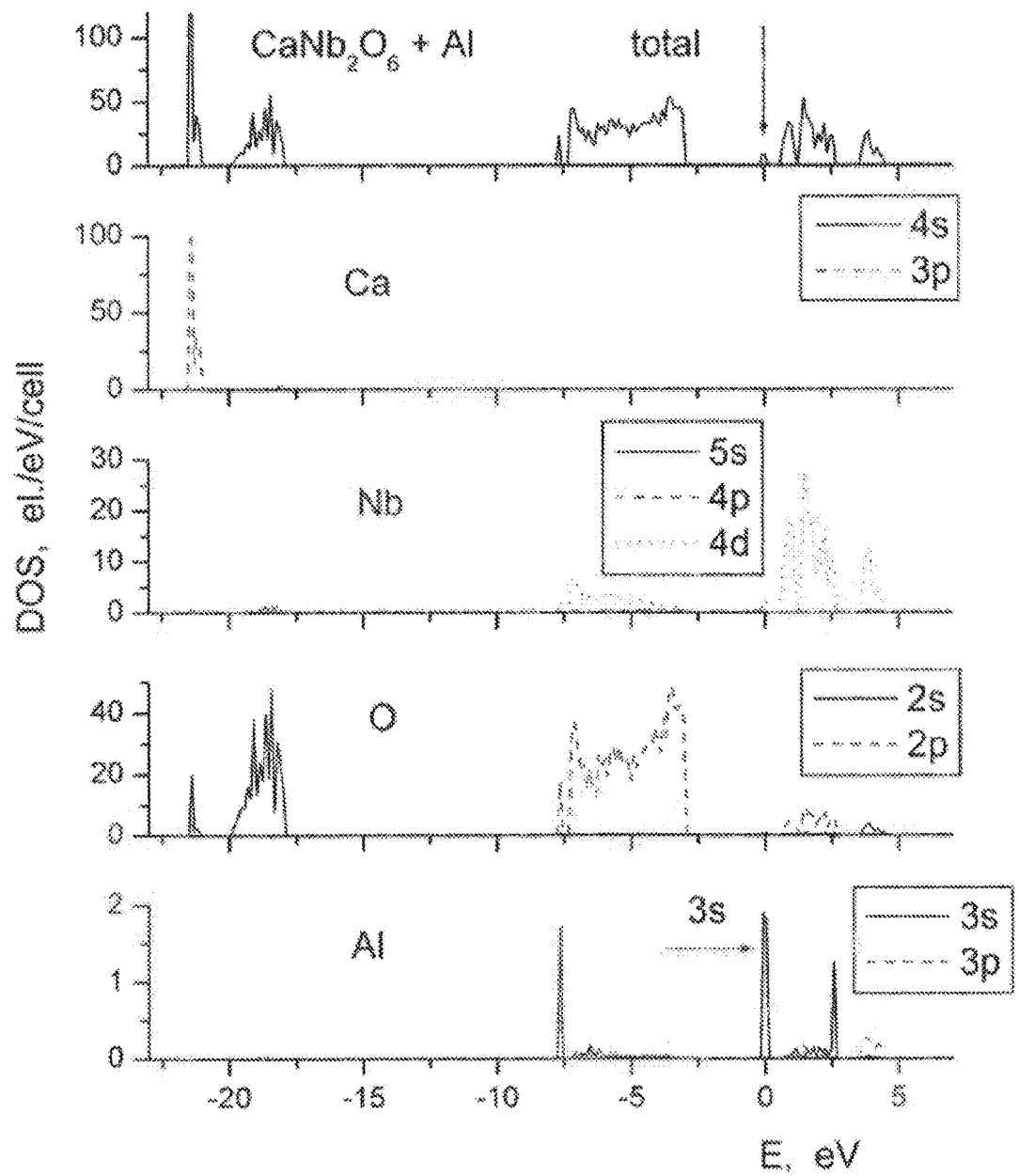
FIG. 30c is a plot showing electronic density of states for $CaNb_2O_6$ doped with Al.

As for doping with 3B-elements, the results were different from those seen for 3A-dopants. The total and partial DOS for $CaNb_2O_6$ doped with B and Al are shown on FIGS. 30, b and c. In contrast to doping of 3A-elements, incorporation of 3B-elements introduced a new non-hybridized completely localized impurity zone which was their own valence s-states located in the energy gap between valence and conduction bands (see partial density of states of B and Al in the bottom graphs in FIG. 30 b,c and denoted by arrows). This impurity s-zone was separated from the main conduction band by an energy gap of 2.42 eV for B and 0.44 eV for Al doping, which was the value of the activation energy, Ea for the electronic conductivity determined by electron transitions from these localized s-states to the conduction band. Similar situations were observed for Ga and In-doped $CaNb_2O_6$ and $CaTa_2O_6$. The corresponding activation energy values $E_a$ together with resulting types of conductivity were collected in Table 5(a) for all the materials considered.

5B and 6A Group Elements and F

Figure 31A:
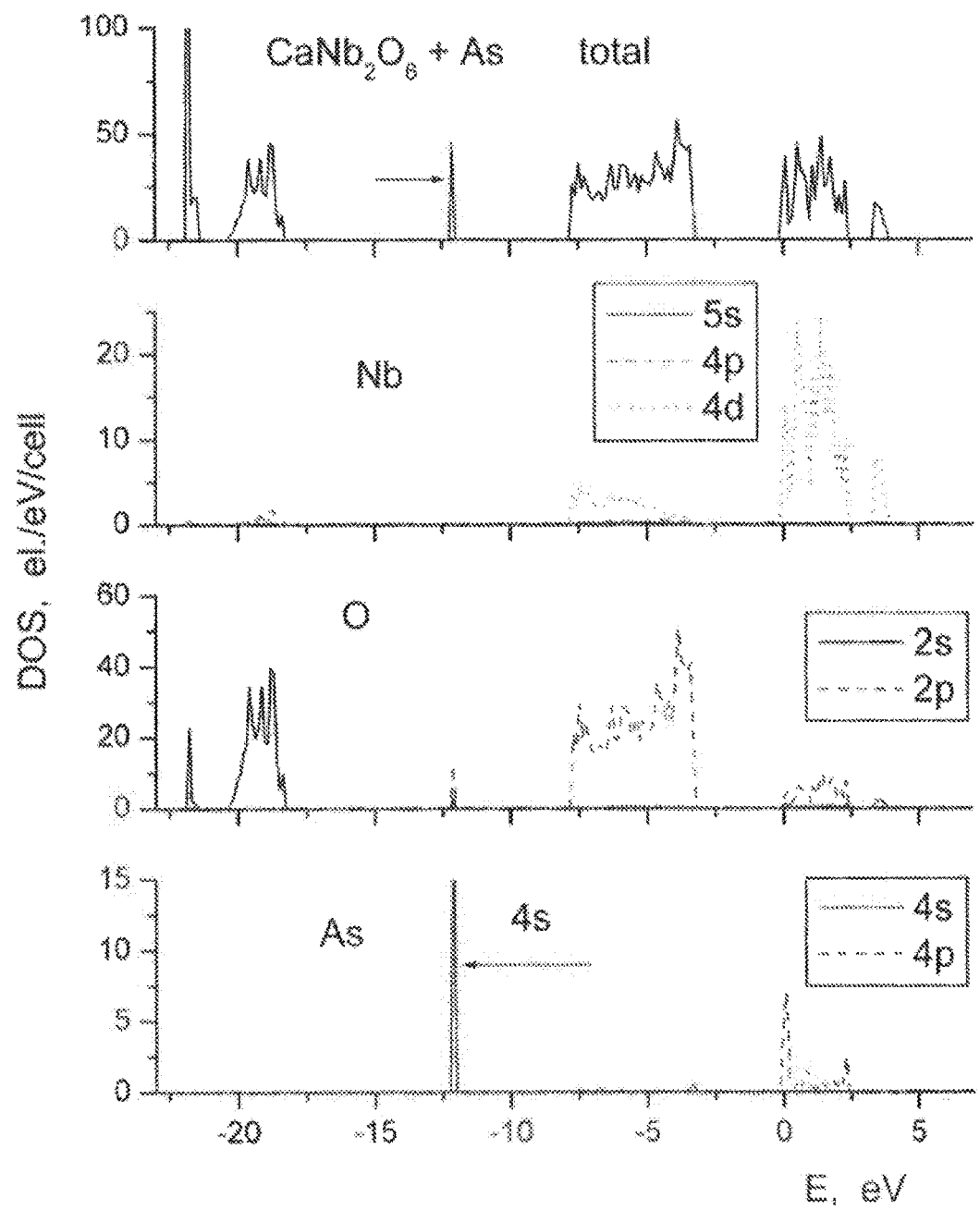
Figure 31B:
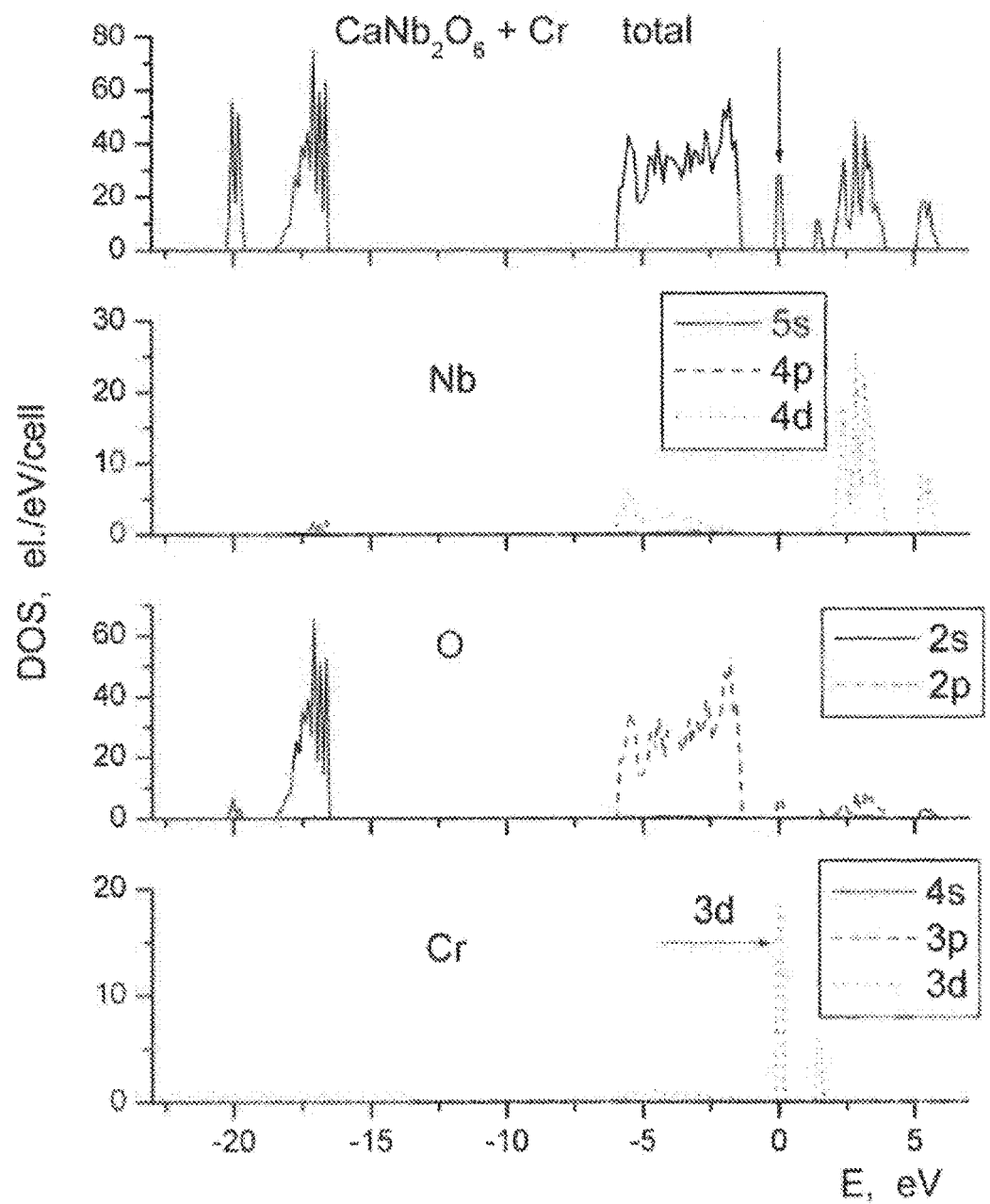
FIG. 31b is a plot showing electronic density of states for $CaNb_2O_6$ doped with Cr.
Figure 31C:
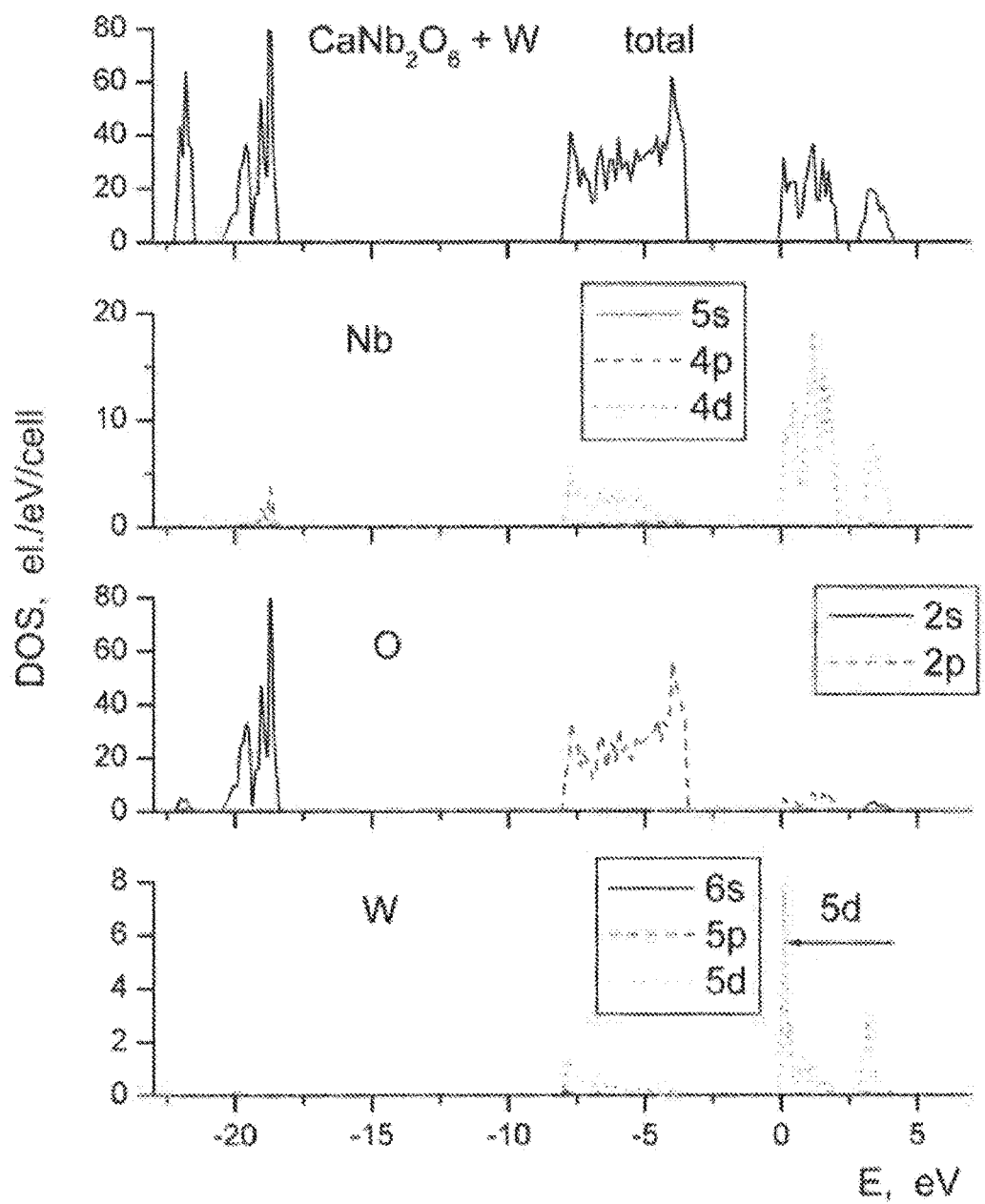
FIG. 31c is a plot showing electronic density of states for $CaNb_2O_6$ doped with W.

The total and partial DOS calculated for $Ca_{0.75}As_{0.25}Nb_2O_6$, $Ca[Nb_{0.875}Cr_{0.125}]_2O_6$ and $Ca[Nb_{0.875}W_{0.125}]_2O_6$ are shown on FIG. 31 a-c. In contrast to pure $CaNb_2O_6$, the electronic structures of the doped oxides displayed several features related to the substituted dopants. The main differences between pure $CaNb_2O_6$ and the structure doped with As, Sb, or Bi (Sb and Bi doped compounds not shown due to their similarity) were the appearance of the s-states of the dopants indicated by arrows hybridized with O2p states located at the bottom of the valence band and separated from the upper portion of the valence band by an energy gap of 3-4.5 eV (see FIG. 31a).

Also, similar to 3A dopants due to additional free electrons brought into the system, the Fermi level of the doped structures also was shifted towards the conduction band resulting in metallic conductivity of the material. The band gap between the valence and conduction bands was about 3.2 eV and did not change significantly with respect to that of the undoped oxide (3.4 eV), so that small amounts of 5B-group elements did not noticeably affect the width of the forbidden zone. A similar picture was observed for $CaTa_2O_6$ doped with the same 5B elements demonstrating that the values of the energy gap between the valence and conduction bands for the three dopants were 3.10 eV, 3.15 eV and 3.40 eV for As, Sb and Bi respectively, which correlated well with the calculated band gap for the pure $CaTa_2O_6$ of ~3.4 eV.

Incorporation of 6A transition metal, such as Cr, Mo, and W demonstrated similar features in the electronic structure as those resulting due to 3B-doping (see FIGS. 31 b,c). Cr, Mo and W as dopants introduced new states which were their own valence d-states located in the energy gap between valence and conduction bands and marked with arrows in FIG. 31 b,c. In case of $Ca[Nb_{0.875}Cr_{0.125}]_2O_6$ the partially occupied Cr3d-states were completely localized and separated from the main conduction band by an energy gap of about 1.76 eV. A similar situation was observed for Mo-doped $CaNb_2O_6$. There was also a partially occupied middle portion of Mo4d states separated from the upper conduction band by a small energy gap of ~0.22 eV that facilitated electron transition to the conduction band and, thus improved the overall electronic conductivity of the material. In the case of the W-doped material these corresponding W5d-states overlapped with the Nb5d conduction band thus resulting in the activation energy for the conductivity equal to zero (FIG. 31 c). In the case of $CaTa_2O_6$ doped with Cr, Mo, and W, the three doped oxides remained semiconductors and there was no overlap between W5d-states and the Ta5d conduction band (see Table 5(b) for the activated conductivity values).

Figure 32:
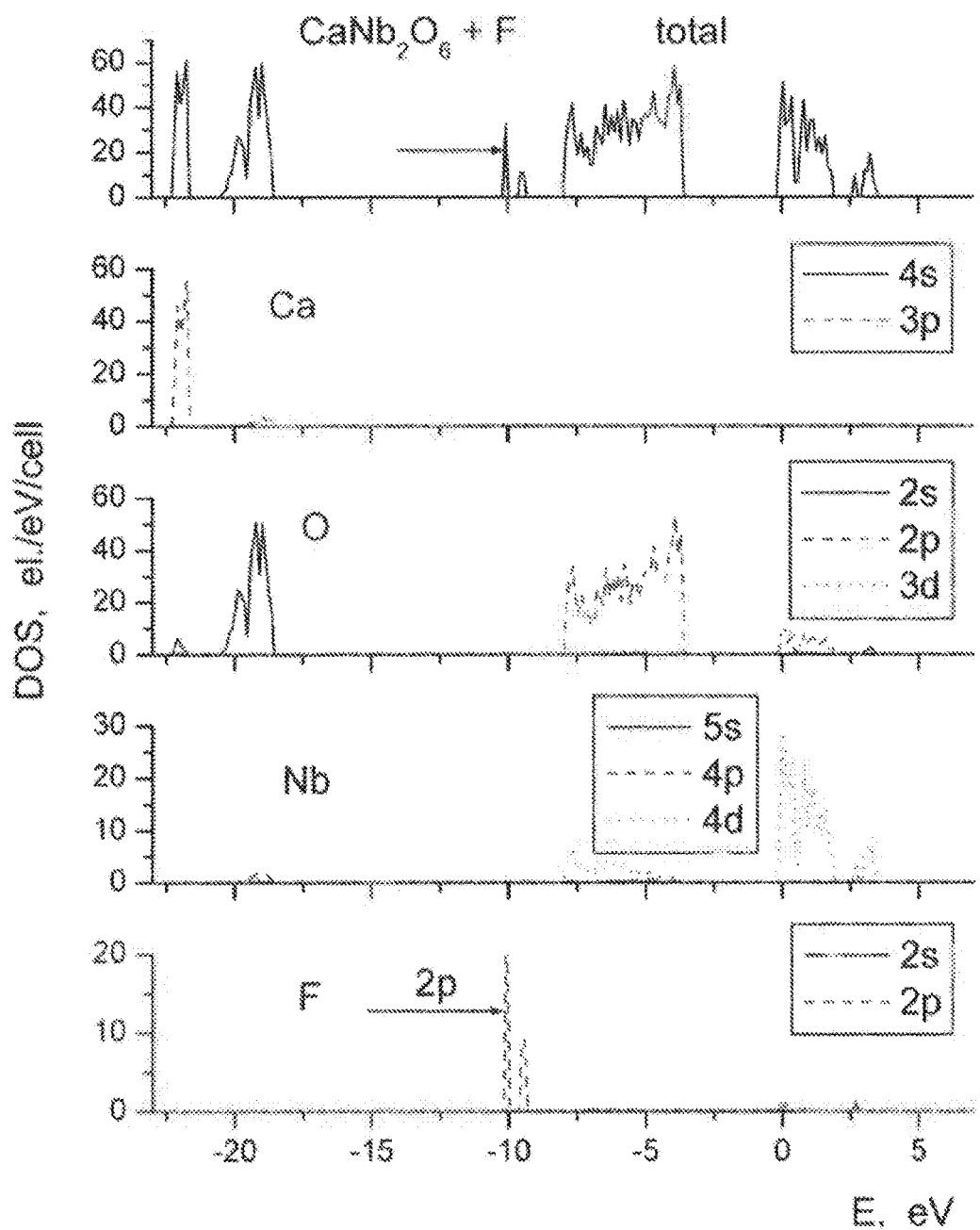
FIG. 32 is a plot showing electronic density of states for $CaNb_2O_6$ doped with F.

FIG. 32 shows DOS calculated for F-doped $CaNb_2O_6$. F introduced its own local p-zone located ~2 eV below the main valence zone formed by 2p-states of oxygen. Total density of states in the vicinity of the Fermi level was similar to what was seen in the case of the structure doped with group 3A (Sc) and group 5B (As) elements. No impurity states appeared within the band gap so that the Fermi level shifted towards the conduction band resulting in metallic conductivity of the material. The same result was observed for F-doped $CaTa_2O_6$ as well as for fluorine doped tin oxide ($SnO_2$:F).

Pyrochlore $Ca_2(Nb/Ta)_2O_7$ with Dopants

The pyrochlore niobates and tantalates doped with the dopants considered herein demonstrated very similar behavior in terms of band structure in the vicinity of the Fermi level and activated conductivity as for corresponding doped orthorhombic structure of Ca(Nb/Ta)2O6.

Figure 33A:
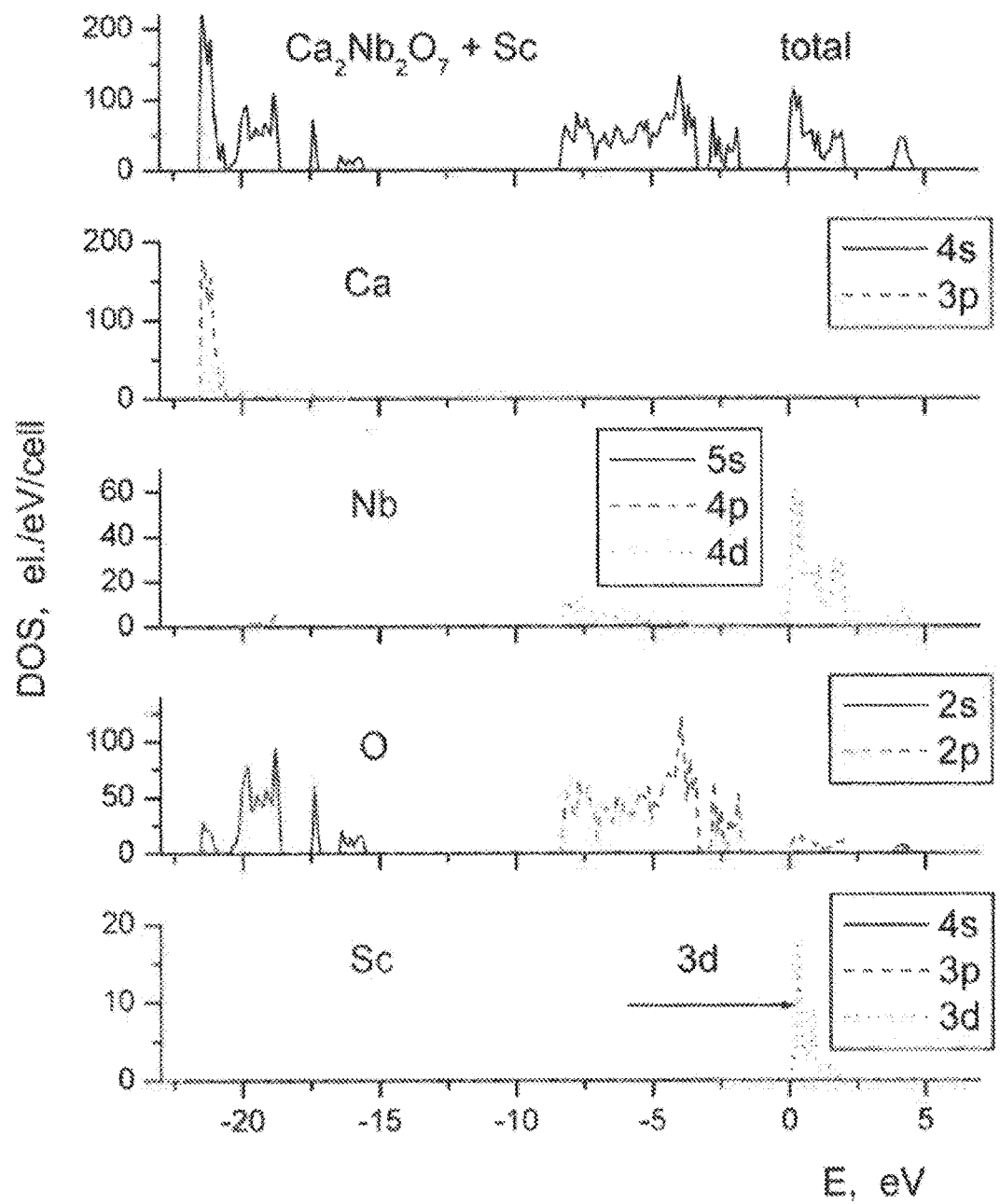
FIG. 33a is a plot showing electronic density of states for $Ca_2Nb_2O_7$ doped with Sc.
Figure 33B:
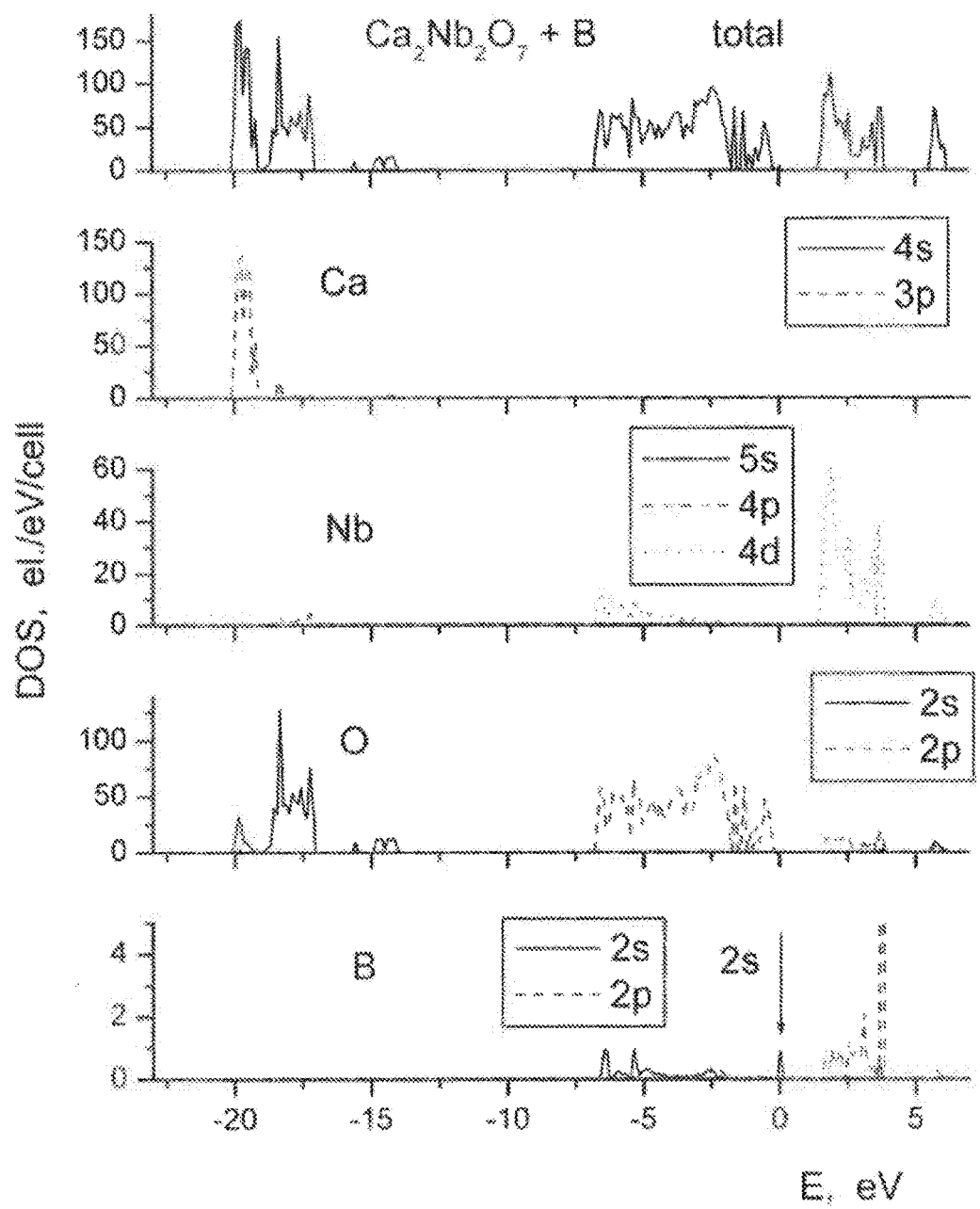
FIG. 33b is a plot showing electronic density of states for $Ca_2Nb_2O_7$ doped with B.
Figure 33C:
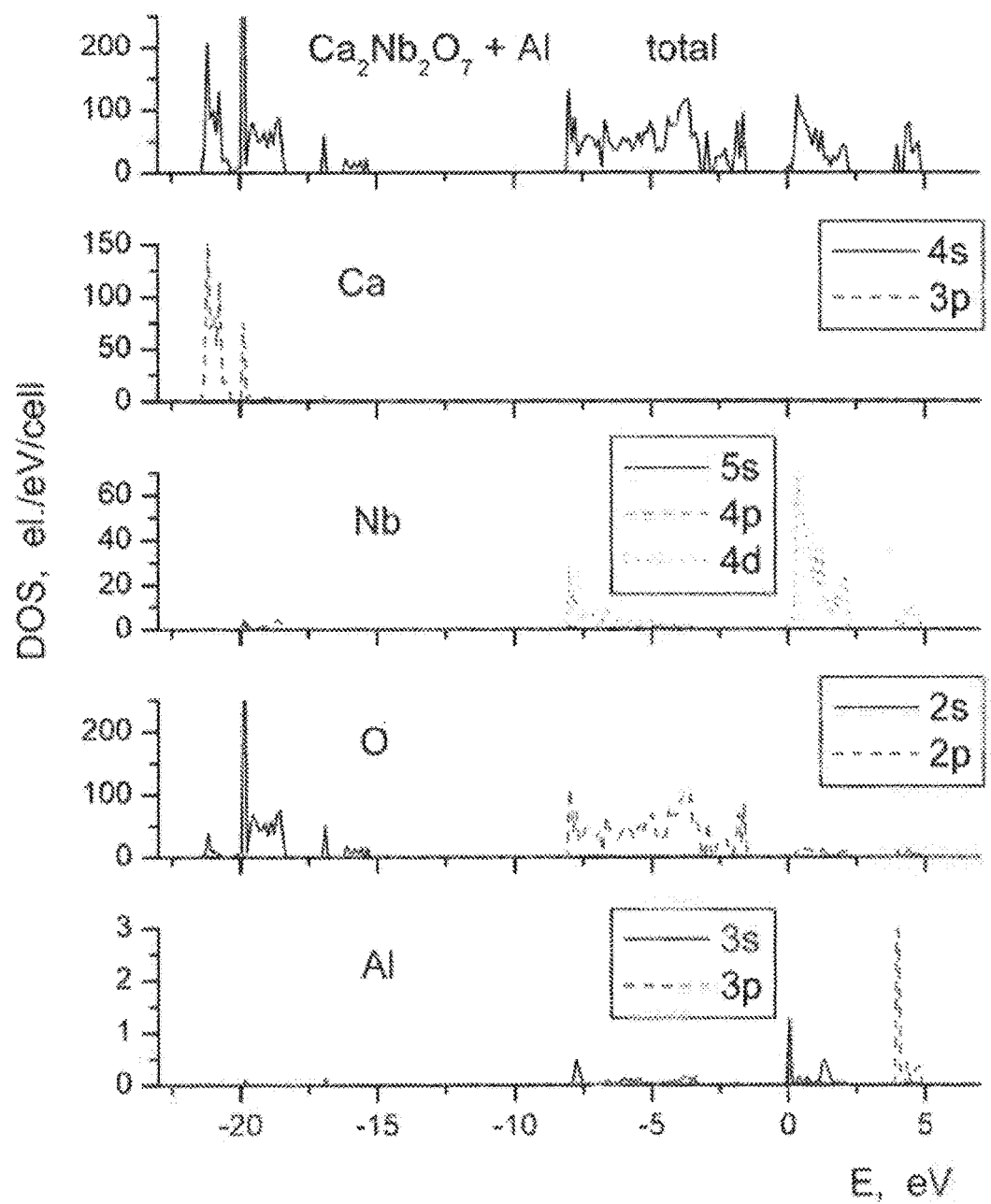
FIG. 33c is a plot showing electronic density of states for $Ca_2Nb_2O_7$ doped with Al.
Figure 34:
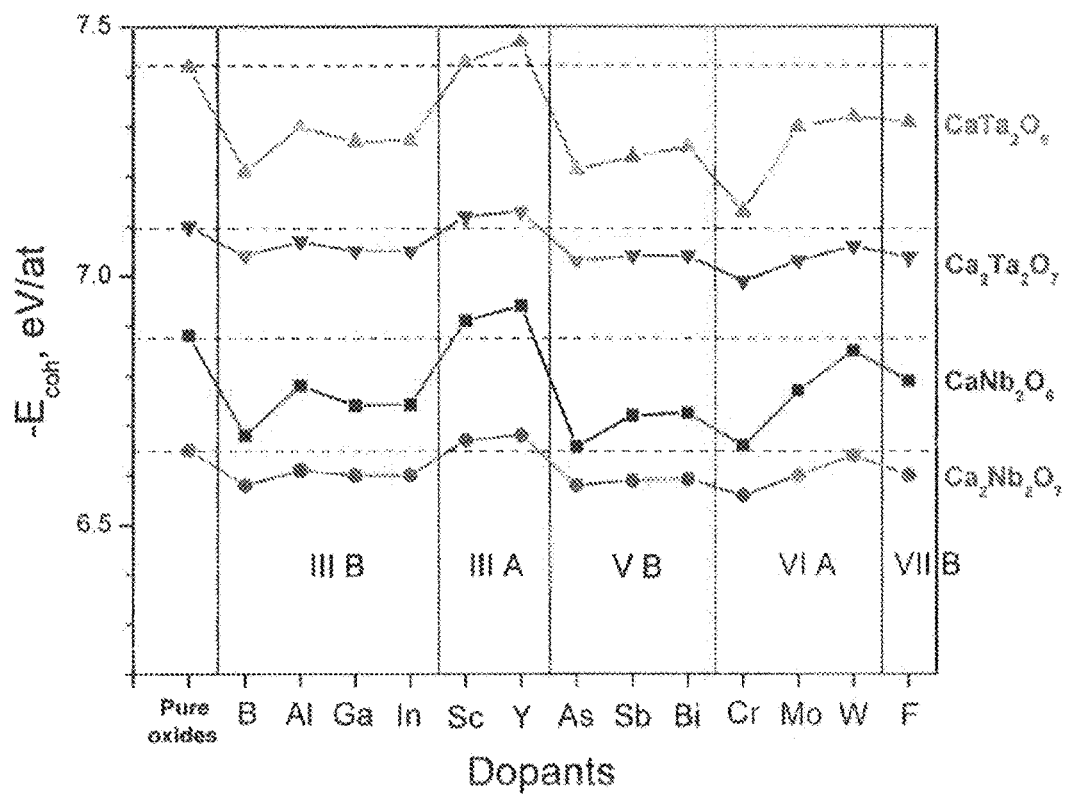
Figure 35A:
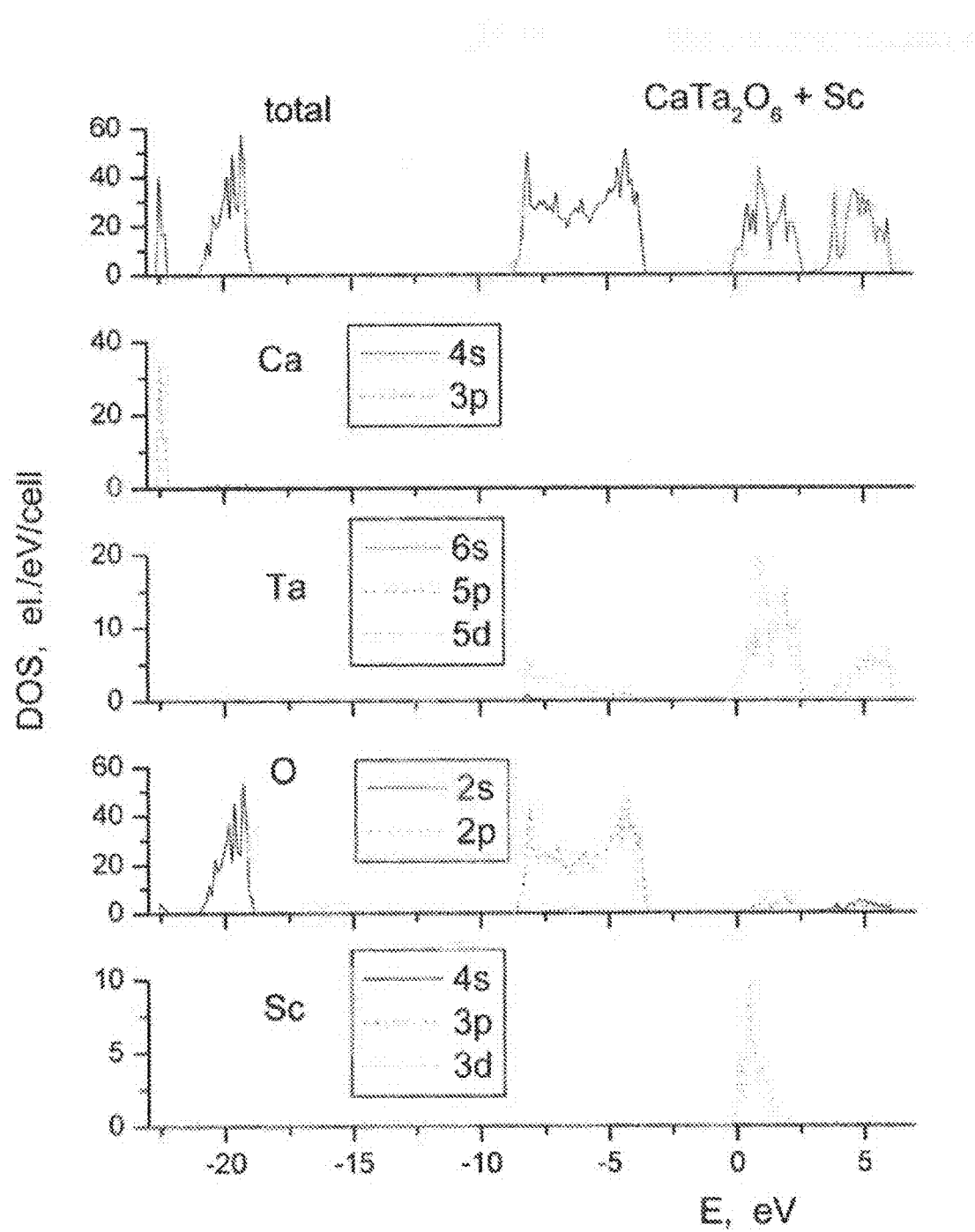
FIG. 35a is a plot showing electronic density of states for $CaTa_2O_6$ doped with Sc.
Figure 35B:
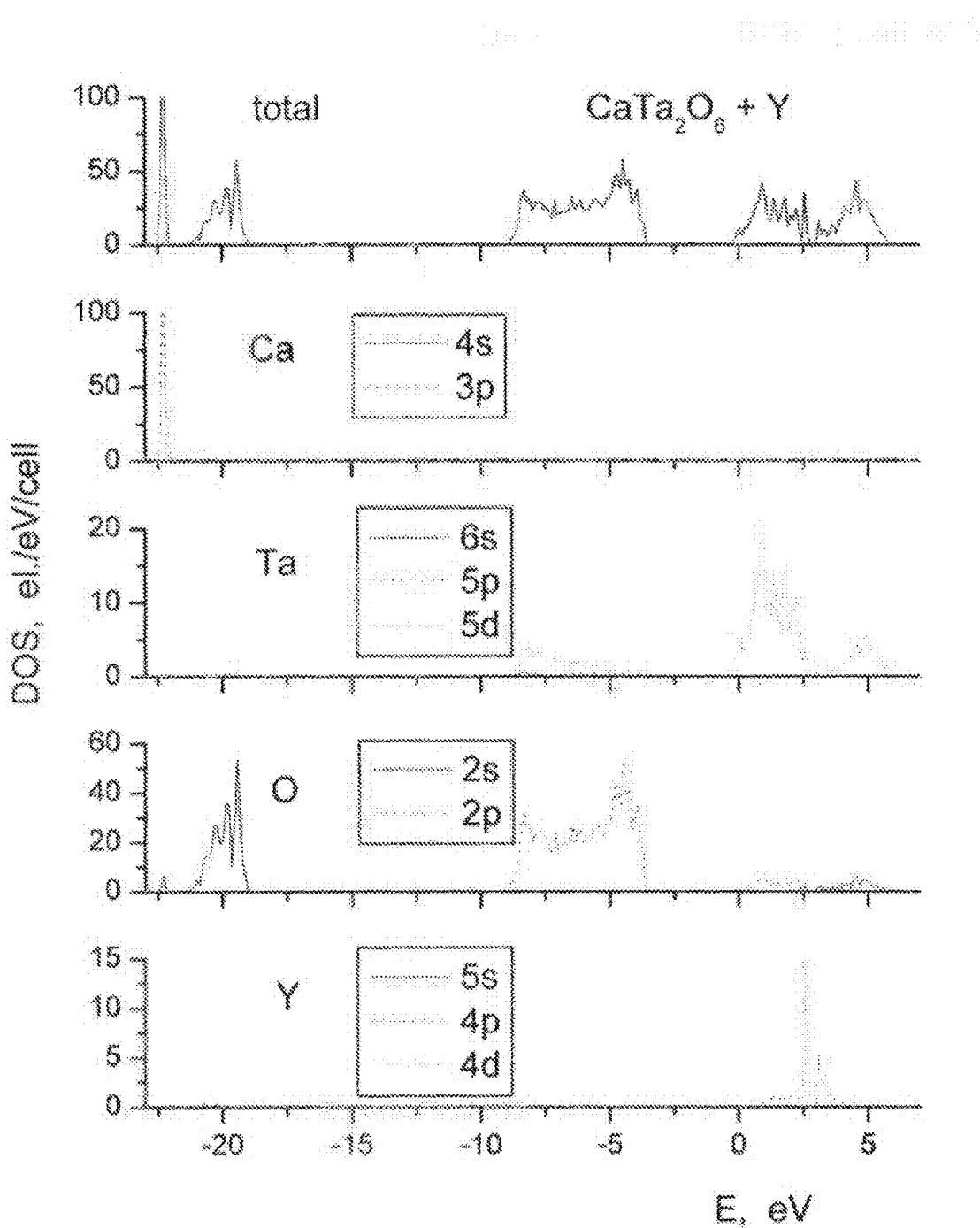
FIG. 35b is a plot showing electronic density of states for $CaTa_2O_6$ doped with Y.

FIG. 33 a-c demonstrated the electronic density of states calculated for the pyrochlore structures of calcium niobates doped with Sc, B, and Al, respectively. The pyrochlore niobate doped with Sc (as well as with Y) did not demonstrate significant changes in electronic structure with respect to the pure undoped structure (compare FIG. 29 a and FIG. 33 a). The only distinction noticeably evident is the Fermi level located at the bottom of the conduction band, since an additional valence electron had been contributed into the whole system by the impurity atom. Thus the d-states of the dopants were located at the same energy level as the Nb4d resulting in the states being hybridized with each other.

Thus, similar to Ca(Nb/Ta)$_2$O$_6$ doping with Sc and Y of pyrochlore niobates and tantalates rendered these compounds also metallic.

As for the pyrochlore niobates doped with 3B (B, Al, Ga, In) elements, there was an impurity zone that appeared within the forbidden energy gap of the pure oxide arising from the partially occupied s-states of the doping elements (FIG. 33 b). The band gap between these local states and the upper part of the conduction band varied depending on the dopant. For B and Ga the gap was 1.1 and 0.33 eV, respectively, although for Al and In these valence s-bands overlapped with conduction Nb4d-zone eliminating the gap completely (see FIG. 33 c). However, pyrochlore tantalate doped with Al and In remained semiconductor although with very small band gap of ~0.1 eV. Doping the structure with all group 3B elements rendered the tantalite semiconducting as summarized in Table 5(a).

The pyrochlore niobates and tantalates doped with 6A, 5B elements as well as F demonstrated almost identical behavior in terms of electronic conductivity as corresponded doped CaNb$_2$O$_6$ and CaTa$_2$O$_6$. The only exception was As-doped Ca$_2$Ta$_2$O$_7$ demonstrated semiconductor behavior with $E_a$—0.2 eV in contrast to all other oxides doped with 6A elements showing metallic behavior. Also, both W-doped Ca$_2$Nb$_2$O$_7$ and Ca$_2$Ta$_2$O$_7$ were semiconductors in contrast to W-doped CaNb$_2$O$_6$ when W5d-states overlapped with Nb4d-states rendering metallic conductivity of the material.

Thus, based on the results obtained on the electronic structure demonstrated due to introduction of the small amount of different elements from 3A, 3B, 5B, 6A, and 7B periodic groups it was concluded that the dopants improved the electronic conductivity of the calcium niobates and tantalates, although to different extents. According to the energy values collected in Tables 5(a) and 5(b) it can be seen that the presence of 3A-, 5B-, and 7B-dopants helped improve the electronic conductivity better than those containing 3B and 6A-elements as dopants. The compounds doped with Sc, Y, As, Sb, Bi, and F demonstrated a metal-type conductivity, while those doped with B, Al, Ga, In, Cr, Mo, and W were characterized by the semiconductor type of conductivity (except W-doped CaNb$_2$O$_6$ and Al- and In-doped Ca$_2$Nb$_2$O$_7$, resulting most likely due to above mentioned band gap underestimation typical for DFT methodology).

Structural and Chemical Stability

Cohesive energy $E_{coh}$ can be considered as a measure of an overall structural and chemical stability of the material. A higher $E_{coh}$ would therefore imply that more energy is required to break the primary chemical bonds of the compound during chemical reaction or mechanical loading. The present study is dedicated to the identification of the most electrochemically stable materials that can likely withstand the water electrolysis conditions when exposed to acidic or other aggressive environments. Mechanical strength is thus not one of the main requirements for identification of a promising catalyst support material. Hence, chemical stability in contrast to the ability of the material to sustain high mechanical loading will be the main quantity characterized by the cohesive energy in the present study. Since, Nb and Ta are iso-electronic, we assume that all the four compounds will likely exhibit similar chemistries, but different chemical reactivity when exposed to acidic or other aggressive environments. The value of the cohesive energy $E_{coh}$, thus could serve as a qualitative criterion for comparing and selecting materials that would likely exhibit the most resistance to decomposition when exposed to chemically reactive environments of aggressive acids and bases.

Since the current work relates to predicted use of promising systems for water electrolysis supports, it is germane to discuss the accuracy of the calculations. In regards to the accuracy of the calculated cohesive energies within the Density Functional theory utilized in the present study in general, an error of less than 10% is considered to be normal and depends on various parameters involved in the computational model, which might seem to be unacceptably large for fulfilling the objectives for each system investigated in the present study. However, the relative differences in cohesive energies calculated for the different compounds within the same computational approach are expected to be accurate, and sufficient for the qualitative comparison of the electrochemical stability between the materials considered. This qualitative comparison is deemed sufficient to determine the usefulness of the system for exploring as supports for electrocatalysis and water electrolysis.

Calculated cohesive energies for the pure and all the doped oxide structures considered in the present study are collected in Tables 2(a) and 2(b) and shown in FIG. 7 for illustrative purposes. One can see that all the structurally analogous tantalate compounds have higher absolute values of cohesive energy than their corresponding niobium analogs and thus, are more stable. It occurs due to the stronger Ta—O interactions in comparison with the Nb—O bonds in the (Ta/Nb)—O$_6$ octahedra. A comparison of the compounds in terms of the cohesive energy values calculated per atom (not per formula unit) is conceivably incorrect particularly due to the different amounts of atoms per formula unit (9 atoms for Ca(Nb/Ta)$_2$O$_6$ and 11 atoms for Ca$_2$(Nb/Ta)$_2$O$_7$) in the case of the materials considered in this study. However, it may help provide some qualitative explanations for the high mechanical and chemical stability of the materials considered. Hence, we have resorted to comparing the chemical stability of the various pure and doped systems using the cohesive energy calculated per atom. Based on the calculated values of cohesive energy per atom shown in Table 2(a) and FIG. 7, the structural stability of the materials increases as follows: Ca$_2$Nb$_2$O$_7$ (−6.65 eV/atom)<CaNb$_2$O$_6$ (−6.88 eV/atom)<Ca$_2$Ta$_2$O$_7$ (−7.10 eV/atom)<CaTa$_2$O$_6$. (−7.42 eV/atom). Also, it can be clearly seen that basically introduction of all dopants make these compounds less stable, although to different extents. The only exception is the doping of 3A group elements which renders all the four parent oxides even more stable. This directly relates with the Sc—O and Y—O bonds which are stronger than the Ca—O bonds in the corresponding parent compounds. All other dopant elements decrease the structural and chemical stability, although all the doped compounds are more stable than pure SnO$_2$ or SnO$_2$ doped with fluorine used as catalyst support material for water electrolysis (calculated $E_{coh}$ for pure SnO$_2$ is −5.08 eV/at and for SnO$_2$ doped with ~6.2 wt % of F is −4.74 eV/at [24].

Thus, based on the previous discussion it allows us to conclude that in terms of general stability, the orthorhombic CaTa$_2$O$_6$ with a cohesive energy of −7.42 eV/atom can be marked as the most stable compound among the entire four parent oxides considered in the present study. However, CaTa$_2$O$_6$ doped with Sc and Y render the oxide even more stable with $E_{coh}$=−7.43 and −7.47 eV/at. respectively. It is also noteworthy to mention that among all the calcium tantalates considered in the study the least stable is Ca$_2$Ta$_2$O$_7$ doped by Cr with $E_{coh}$=−6.99 eV/at. However, it demonstrates a higher stability in comparison to the most stable niobate CaNb$_2$O$_6$ doped with Y indicating a $E_{coh}$=−6.94 eV/at. Hence, it could be construed that the tantalate based compounds are more resistant to decomposition and cleavage of the primary bonds when exposed to harsh mechanical or chemical environments such as those likely experienced by these systems when used in highly corrosive acidic environments such as those encountered in electrochemical systems comprising water electrolysis and the oxygen reduction reactions (ORR) in proton exchange membrane based fuel cells.

As for the electronic conductivity, due to an increased charge carrier density in the presence of additional dopants all the four doped niobates and tantalates are expected to demonstrate better conductivity in comparison to the pure undoped parent oxides. Doping the oxides with 3B and 6A elements result in lowering the activated conductivity $E_a$ in comparison to undoped materials, although the compounds remain semiconductors. Moreover, all four niobates and tantalates doped with 3A, 5B [with the exception of As doped $Ca_2Ta_2O_7$] and 7B elements demonstrate metallic type of conductivity with zero activation energy. Among them, as we mentioned above, $CaTa_2O_6$ doped with Sc and Y (3A group) demonstrate the highest values of cohesive energy, metallic conductivity, and excellent structural and chemical stability. Thus these systems could be considered as the most appropriate candidates for the catalyst support in PEM based electrolysis.

For illustrative purposes the calculated DOS for Sc and Y-doped $CaTa_2O_6$ are shown in FIG. 8. Also, Table 3 includes a list of weight percentages of Sc and Y used as dopants for all the four parent oxides considered in the present study.

Conclusions

An attempt to identify new electrochemically stable catalyst supports for electrolysis of water using ab-initio Density Functional Theory approach has been undertaken in the present study. Calcium niobates $Ca_2Nb_2O_7$, $CaNb_2O_6$ and calcium tantalates $Ca_2Ta_2O_7$, $CaTa_2O_6$, have been chosen to systematically investigate the influence of small amounts of dopants selected from group 3A, 3B, 5B, 6A and 7B of the Periodic Table on the electronic conductivity and structural stability of the compounds. The study showed that small amounts of 3A, 5B and 7B-group elements noticeably improve the conductivity than the elements from group 3B and group 6A—of the Periodic Table. Also, a comparison of the cohesive energies calculated for the pure and doped oxides displayed $CaTa_2O_6$ and Y doped $CaTa_2O_6$ to be the most stable compound among all materials considered in the study.

The study thus allows us to hypothesize based on electronic conductivity and cohesive energy considerations that the $CaTa_2O_6$ doped with Sc and Y is the most appropriate candidate for use as a catalyst support in water electrolysis.

However, this conclusion needs to be verified with further experimental validations. Unfortunately, to the best of our current knowledge, there are no published experimental reports on any measurements of electronic conductivity of calcium niobates or tantalates doped with the dopants considered in the present study. Experimental validation of the calculated predictions reported in this work are currently planned to be conducted in our laboratory which will be reported in subsequent publications.

TABLE 4

Experimental and calculated structural parameters for the undoped compounds. Calculated parameters are shown in parenthesis.

|  |  | $CaNb_2O_6$ from [29] | $CaTa_2O_6$ from [30] | $Ca_2Nb_2O_7$ from [31] | $Ca_2Ta_2O_7$ from [31] |
|---|---|---|---|---|---|
|  | a (Å) | 14.926 (15.069) | 11.068 (11.144) | 10.444 (10.315) | 10.463 (10.339) |
|  | b (Å) | 5.752 (5.811) | 7.505 (7.557) | — | — |
|  | c (Å) | 5.204 (5.246) | 5.378 (5.394) | — | — |
|  | $V_0$ (Å³) | 446.8 (459.4) | 446.7 (454.2) | 1139.2 (1097.5) | 1145.4 (1105.2) |
|  | Z | 4 | 4 | 8 | 8 |
|  | Space group | Pbcn; #60 Orthorhombic | Pnma; #62 Orthorhombic | Fd-3m #227 Pyrochlr cubic | Fd-3m #227 Pyrochlr cubic |
| Ca | x | 0 | 0.042 | 0.5 | 0.5 |
|  | y | 0.2244 | 0.25 | 0.5 | 0.5 |
|  | z | 0.75 | 0.540 | 0.5 | 0.5 |
| Nb or Ta | x | 0.1653 | 0.1412 | 0 | 0 |
|  | y | 0.3166 | −0.0056 | 0 | 0 |
|  | z | 0.2987 | 0.0376 | 0 | 0 |
| $O_1$ | x | 0.0893 | −0.024 | 0.3214 | 0.3214 |
|  | y | 0.0997 | 0.035 | 0.125 | 0.125 |
|  | z | 0.4040 | 0.225 | 0.125 | 0.125 |
| $O_2$ | x | 0.1003 | 0.213 | 0.375 | 0.375 |
|  | y | 0.4280 | 0.049 | 0.375 | 0.375 |
|  | z | 0.0056 | 0.383 | 0.375 | 0.375 |
| $O_3$ | x | 0.2576 | 0.146 | — | — |
|  | y | 0.1351 | 0.25 |  |  |
|  | z | 0.1266 | −0.033 |  |  |
| $O_4$ | x |  | 0.122 | — | — |
|  | y |  | −0.25 |  |  |
|  | z |  | 0.162 |  |  |

TABLE 5 (a)

Cohesive energy (eV/f. un. and eV/atom), band gap (BG), band gap values between electronic states located at Fermi level and the main conduction band and type of conductivity calculated for undoped oxides and doped with 3A and 3B group elements. Experimental BG for pure oxides is taken from: [32] for $CaNb_2O_6$, [19] for $Ca_2Nb_2O_7$ and $Ca_2Ta_2O_7$, [20] for $CaTa_2O_6$.

| Periodic group |  |  | 3A | | 3B | | |
|---|---|---|---|---|---|---|---|
|  |  | pure | Sc | Y | B | Al | Ga | In |
| $CaNb_2O_6$ | $-E_{coh}$(f. un.) | 61.92 | 62.164 | 62.49 | 60.146 | 61.01 | 60.65 | 60.68 |
|  | (eV/at) | 6.88 | 6.91 | 6.94 | 6.68 | 6.78 | 6.74 | 6.742 |
|  | BG(eV) | 3.413 | 0 | 0 | 2.42 | 0.44 | 1.1 | 0.44 |
|  | Conductivity | 3.87exp | met | met | semi | semi | semi | semi |
| $Ca_2Nb_2O_7$ | $-E_{coh}$(f. un.) | 73.105 | 73.34 | 73.49 | 72.36 | 72.74 | 72.57 | 72.58 |
|  | (eV/at) | 6.65 | 6.67 | 6.68 | 6.58 | 6.61 | 6.60 | 6.60 |

TABLE 5 (a)-continued

Cohesive energy (eV/f. un. and eV/atom), band gap (BG), band gap values between electronic states located at Fermi level and the main conduction band and type of conductivity calculated for undoped oxides and doped with 3A and 3B group elements. Experimental BG for pure oxides is taken from: [32] for $CaNb_2O_6$, [19] for $Ca_2Nb_2O_7$ and $Ca_2Ta_2O_7$, [20] for $CaTa_2O_6$.

| Periodic group | | pure | 3A | | 3B | | | |
|---|---|---|---|---|---|---|---|---|
| | | | Sc | Y | B | Al | Ga | In |
| $CaTa_2O_6$ | BG(eV) | 1.28 | 0 | 0 | 1.1 | 0 | 0.33 | 0 |
| | Conductivity | 2.95exp | met | met | semi | met | semi | met |
| | $-E_{coh}$(f. un.) | 66.77 | 66.89 | 67.26 | 64.89 | 65.724 | 65.41 | 65.46 |
| | (eV/at) | 7.42 | 7.43 | 7.47 | 7.21 | 7.30 | 7.27 | 7.273 |
| $Ca_2Ta_2O_7$ | BG(eV) | 3.414 | 0 | 0 | 2.75 | 0.33 | 1.43 | 0.33 |
| | Conductivity | 4.0 exp | met | met | semi | semi | semi | semi |
| | $-E_{coh}$(f. un.) | 78.146 | 78.30 | 78.43 | 77.41 | 77.76 | 77.60 | 77.60 |
| | (eV/at) | 7.10 | 7.12 | 7.13 | 7.04 | 7.07 | 7.05 | 7.05 |
| | BG(eV) | 2.133 | 0 | 0 | 1.9 | 0.11 | 0.77 | >0.1 |
| | Conductivity | 3.58exp | met | met | semi | semi | semi | semi |

TABLE 5 (b)

Cohesive energy (eV/f. un. and eV/atom), band gap (BG), band gap values between electronic states located at Fermi level and the main conduction band and type of conductivity calculated for oxides doped with 5B, 6A and 7B group elements.

| Periodic group | | 5B | | | 6A | | | 7B |
|---|---|---|---|---|---|---|---|---|
| | | As | Sb | Bi | Cr | Mo | W | F |
| $CaNb_2O_6$ | $-E_{coh}$(f. un.) | 60.17 | 60.45 | 60.53 | 59.94 | 60.95 | 61.61 | 61.08 |
| | (eV/at) | 6.658 | 6.72 | 6.725 | 6.66 | 6.77 | 6.85 | 6.79 |
| | BG(eV) | 0 | 0 | 0 | 1.76 | 0.22 | 0 | 0 |
| | Conductivity | met | met | met | semi | semi | met | met |
| $Ca_2Nb_2O_7$ | $-E_{coh}$(f. un.) | 72.38 | 72.51 | 72.53 | 72.19 | 72.64 | 73.0 | 72.59 |
| | (eV/at) | 6.58 | 6.59 | 6.593 | 6.56 | 6.60 | 6.64 | 6.60 |
| | BG(eV) | 0 | 0 | 0 | 1.32 | 0.33 | 0.15 | 0 |
| | Conductivity | met | met | met | semi | semi | semi | met |
| $CaTa_2O_6$ | $-E_{coh}$(f. un.) | 64.93 | 65.195 | 65.32 | 64.16 | 65.67 | 65.88 | 65.83 |
| | (eV/at) | 7.214 | 7.24 | 7.26 | 7.13 | 7.30 | 7.32 | 7.31 |
| | BG(eV) | 0 | 0 | 0 | 1.21 | 0.77 | 0.22 | 0 |
| | Conductivity | met | met | met | semi | semi | semi | met |
| $Ca_2Ta_2O_7$ | $-E_{coh}$(f. un.) | 77.38 | 77.45 | 77.46 | 76.94 | 77.35 | 77.70 | 77.41 |
| | (eV/at) | 7.03 | 7.04 | 7.04 | 6.99 | 7.03 | 7.06 | 7.037 |
| | BG(eV) | 0.2 | 0 | 0 | 2.2 | 1.1 | 0.53 | 0 |
| | Conductivity | semi | met | met | semi | semi | semi | met |

TABLE 6

Concentrations of Sc and Y in all cases considered in present study (wt %)

| | Sc (wt %) | Y (wt %) |
|---|---|---|
| $CaNb_2O_6$ | 3.48 | 6.66 |
| $Ca_2Nb_2O_7$ | 1.48 | 2.90 |
| $CaTa_2O_6$ | 2.25 | 4.36 |
| $Ca_2Ta_2O_7$ | 1.01 | 1.99 |

Example 4

Preparation of the Electrodes

Iridium tetrachloride [$IrCl_4$, 99.5%, Alfa Aesar], tin (II) chloride dihydrate [$SnCl_2 \cdot 2H_2O$, 98%, Alfa Aesar] and ammonium fluoride [$NH_4F$, 98%, Alfa Aesar] were used as the sources for Ir, Sn and F, respectively. Stock solution corresponding to $IrCl_4$ and $SnCl_2 \cdot 2H_2O$ of the desired compositions was dissolved in absolute ethanol inside an atmosphere controlled glove box (MBraun Unilab Work station (1200/780) to prevent any undesired side reaction. $NH_4F$ was dissolved in ethanol-DI water mixture (5:1 volume ratio). The stock solutions $IrCl_4$, $SnCl_2 \cdot 2H_2O$ and $NH_4F$ of desired compositions were then mixed together to synthesize $(Sn,Ir)O_2$:F electro-catalyst. The resulting solution was spin coated on pretreated titanium substrates of ~1 cm² areas (Speciality coating Systems Inc, Model P6712) with rotating speed of 500 rpm for 10 sec. Prior to coating, the Ti substrate was sand blasted and then etched in boiling HCl (30%) for 30 min in order to ensure maximum adhesion of the coating. The HCl treated Ti foil was washed with purified water generated by the Milli-Q system (18 Mohm·cm deionized water, Milli-Q Academic, Millipore) and dried at 130° C. before coating. The thin film precursors deposited on the pretreated titanium substrate were dried at 60° C. for 2 h. Following this treatment, they were thermally treated at 673K for 4 h in air to decompose the precursors and, as a result $(Sn,Ir)O_2$:F film of different compositions were generated on the Ti foils. The loading of the active $(Sn,Ir)O_2$:F deposited on the Ti foil was ~0.3 mg/cm² irrespective of the different compositions.

Materials Characterization

X-Ray Diffraction Analysis

To perform qualitative phase analysis, the $(Sn,Ir)O_2$:F thin film electrode of different compositions coated on the Ti foil were characterized by X-ray diffraction (XRD) using Philips XPERT PRO system employing CuK$_\alpha$ ($\lambda$=0.15406 nm) radiation with operating voltage and current at 45 kV and 40 mA, respectively.

Microstructure Analysis

To investigate the microstructure of the thin film electrodes, scanning electron microscopy (SEM) and transmission electron microscopy (TEM) were conducted. Quantitative elemental analysis and distribution of elements (x-ray mapping) was investigated using the energy dispersive X-ray spectroscopy (EDX) analyzer integrated into the SEM machine. Philips XL-30FEG equipped with an EDX detector system comprised of an ultrathin beryllium window and Si(Li) detector operating at 20 kV was employed for the secondary electron (SE) image, elemental and x-ray mapping analyses. JEOL 4000EX operating at 400 kV was employed for conducting TEM analysis to evaluate the particle size and the structure of the thin film particles. The particles were obtained by mechanically abrading the powders from top of the several micron thick films synthesized by spin coating techniques.

X-Ray Photoelectron Spectroscopy (XPS)

X-ray photoelectron spectroscopy (XPS) was used to investigate the valence states of iridium, tin and oxygen ions. All the catalysts were analyzed by XPS using a Physical Electronics (PHI) model 32-096 X-ray source control and a 22-040 power supply interfaced to a model 04-548 X-ray source with an Omni Focus III spherical capacitance analyzer (SCA). The system was routinely operated within the pressure range of 10-8 to $10^{-9}$ Torr ($1.3 \times 10^{-6}$ to $1.3 \times 10^{-7}$ Pa). The system was calibrated in accordance with the manufacturer's procedures utilizing the photoemission lines $E_b$ of Cu 2p3/2-932.7 eV, $E_b$ of Au 4f7/2-84 eV and $E_b$ of Ag 3d5/2-368.3 for a magnesium anode. All the reported intensities were experimentally determined peak areas divided by the instrumental sensitivity factors. Charge correction was obtained by referencing the adventitious C 1s peak to 284.8 eV.

Electrochemical Characterization

The electrochemical activity of $IrO_2$ and $(Sn,Ir)O_2$:F of different compositions, used as an oxygen reduction anode for PEM based water electrolysis, was conducted in an electrochemical workstation (VersaSTAT 3, Princeton Applied Research) using a three electrode cell configuration. The electrochemical reactivity and electrochemical kinetics of the electro-catalyst had been determined from cyclic voltammetry, linear polarization measurement and electrochemical impedance spectroscopy (EIS) measurement. A solution containing 1N sulfuric acid ($H_2SO_4$) was used as the electrolyte while also serving as the source of the fuel. The $H_2SO_4$ solution was kept at a constant temperature of 40° C. using a Fisher Scientific 910 Isotemp Refrigerator Circulator. Thin films of $IrO_2$, $(Sn,Ir)O_2$ and $(Sn,Ir)O_2$:F of different F compositions coated on Ti foil were used as the working electrode with an exposed surface area ~1 cm$^2$ with a total loading of ~0.3 mg/cm$^2$ for each system. The polarization curve was recorded with a scanning rate of ~1 mV/sec using platinum as the counter electrode and $Hg/Hg_2SO_4$ as the reference electrode that had a potential of +0.65V with respect to the Normal hydrogen electrode (NHE). EIS had been used to determine the solution resistance, electrode resistance and the polarization resistance of the electro-catalyst using suitable circuit model such as $R_s(R_eQ_1)(R_{ct}Q_{dl})$, where $R_s$ was the solution resistance, $R_{ct}$ was the charge transfer resistance, $Q_1$ was the constant phase element and $Q_{dl}$ included both the double layer capacitance and pseudocapacitance. The ohmic resistance had been be used for ohmic loss (iR$_\Omega$) correction, whereas the polarization resistance had been used to understand the electrochemical activity of the electrocatalyst. The Tafel plot after iR$_\Omega$ correction given by the following equation $\eta$=b log i+ a (plot of overpotential, $\eta$, vs. log current, log i) and the corresponding Tafel slope (b), determined from polarization curve, had been used to determine the reaction kinetics. The electrochemical impedance spectroscopy had been carried out in the frequency range of 100 mHz-100 kHz using VersaSTAT 3, Princeton Applied Research. Impedance data was modeled using ZView software from Scribner Associates. In order to study the accelerated life test (durability) of the $(Sn,Ir)O_2$:F electrode as an anode for PEM based water electrolysis, chronopotentiometry (CP) (voltage vs. time) of selected samples had been performed for 24 h using 1N $H_2SO_4$ as the electrolyte in the same three electrode cell configuration at a temperature of 40° C. Elemental analysis of the electrolyte ($H_2SO_4$), collected after 24 h of CP testing, was performed by inductively coupled plasma optical emission spectroscopy (ICP-OES, iCAP 6500 duo Thermo Fisher) to determine the amount of iridium leached out in the solution from the electrode.

Computational Details

The thin film of $(Sn,Ir)O_2$ doped with F was considered to exhibit the rutile structure with a tetragonal unit cell and space group P42/mnm following experimental validation. The rutile structure of $(Ir—Sn)O_2$:F thin film electrode was confirmed experimentally from XRD analysis which had been presented in the results section. This unit cell was chosen as the basis for construction of the different super cells corresponding to the specific Ir, Sn and F concentrations of the oxide solid solution. To facilitate convenient calculations the basic composition was chosen as $SnO_2$ 75 at %-$IrO_2$ 25 at % instead of 80/20 ratio. Such 75/25 composition although slightly different from the 80/20 ratio allowed the selection of smaller representative super-cells for all the calculation of bulk and surface electronic structures employed.

Thus, $(Sn_{0.75}Ir_{0.25})O_2$ compound doped with different amounts of F was considered for theoretical evaluation of the electronic conductivity, structural and electrochemical stability and catalytic activity. In particular, for bulk calculations the super cell was chosen as the double rutile unit cell with four metals and eight oxygen atoms in the unit cell. Fluorine doping was simulated by replacing of corresponding number of oxygen atoms with fluorine according to the general formula unit as $(Sn_{0.75}Ir_{0.25})O_{2-x}F_x$, where x=0, 0.5, 1.0, 1.5 corresponding to 0, 5.6, 11.0, and 16.4 wt % of F, respectively.

For calculation of the surface electronic properties of the materials a two-dimensional slab repeated in [1,−1, 0] direction with 36 atom unit cell and a vacuum distance 12 Å between adjacent images of the slab was selected.

For calculating the total energies, electronic structure and density of electronic states the Vienna Ab-initio Simulation Package (VASP) was used within the projector-augmented wave (PAW) method and the generalized gradient approximation (GGA) for the exchange-correlation energy. This program calculated the electronic structure and via the Hellmann-Feynman theorem, the inter-atomic forces were determined from first-principles. Standard PAW potentials were employed for the elemental constituents and the Ir, Sn, O and F potentials thus contained nine, four, six and seven valence electrons, respectively.

For all the materials considered, the plane wave cutoff energy of 520 eV was chosen to maintain a high accuracy of the total energy calculations. The lattice parameters and internal positions of atoms were fully optimized employing the double relaxation procedure, and consequently, the minima of the total energies with respect to the lattice parameters and internal ionic positions were determined. This geometry optimization was obtained by minimizing the Hellman-Feynman forces via a conjugate gradient method, so that the net forces applied on every ion in the lattice were close to zero. The total electronic energies was converged within 10-5 eV/un·cell resulting in the residual force components on each atom to be lower than 0.01 eV/Å/atom, thus allowing for an accurate determination of the internal structural parameters for the oxide. The Monkhorst-Pack scheme was used to sample the Brillouin Zone (BZ) and generate the k point grid for the solids and the different isolated atoms used in the present study. A choice of the appropriate number of k-points in the irreducible part of the BZ was based on convergence of the total energy to 0.1 meV/atom.

For Ir—Sn—O—F compositions, the corresponding atomic distributions were ambiguous and could be represented by different spatial configurations. To eliminate this uncertainty several atomic configurations for each given composition was constructed and only those configurations corresponding to minimal total energies were selected for further numerical evaluations of these specific compositions of the binary oxides.

Results and Discussion

Experimental Analysis

Structural Analysis

Figure 36:
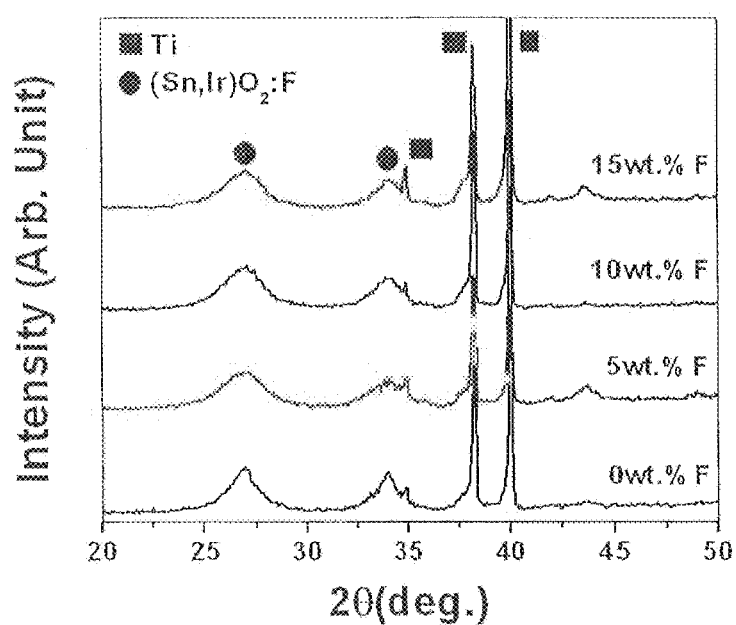
FIG. 36 is a XRD pattern of thin film $(Sn_{0.80}Ir_{0.20})O_2$:F of different compositions coated on Ti foil.

The XRD patterns in FIG. 36 show $SnO_2$—$IrO_2$ thin film composition corresponding to $SnO_2$-20 at. % $IrO_2$ (x=0) deposited on Ti foil. FIG. 36 shows all the peaks corresponding to single phase rutile type tetragonal structure suggesting the formation of a single phase homogeneous $SnO_2$ and $IrO_2$ solid solution, [(Sn,Ir)$O_2$] with no undesirable phase separation (e.g. $SnO_2$+$IrO_2$) and/or mixed phase formation critical for the catalytic activity. The molar volume of ~21.20±0.05 cm$^3$/mol of (Sn,Ir)$O_2$, calculated using the least square refinement technique was in agreement with the expected value determined by considering the change in molar volume of $SnO_2$ (21.66 cm$^3$/mol) and $IrO_2$ (19.22 cm$^3$/mol) solid solution following the Vegard's law further confirming the solid solution formation. The effective crystallite size of (Sn,Ir)$O_2$, calculated using the Scherrer formula from the integral breadth of the Lorentzian contribution determined from peak profile analysis using single line approximation method after eliminating the instrumental broadening and lattice strain contribution was ~5-7 nm confirming the nano-crystalline nature of (Sn,Ir)$O_2$ solid solution.

To improve the electrical conductivity of (Sn,Ir)$O_2$, fluorine was introduced into the structure to substitute for oxygen at nominal compositions of 5, 10 and 15 wt % F, respectively. The XRD patterns of the (Sn,Ir)$O_2$:F solid solution corresponding to the different compositions, shown in FIG. 36 confirmed retention of the tetragonal rutile structure similar to the parent (Sn,Ir)$O_2$. Furthermore, the calculated molar volume of (Sn,Ir)$O_2$:F (~21.20±0.05 cm$^3$/mol) was comparable to pure (Sn,Ir)$O_2$ which suggested that $F^-$ doping on the $O^{-2}$ sites had no significant effect on the molar volume of (Sn,Ir)$O_2$:F. This was due to the comparable ionic radius of $O^{-2}$ (125 pm) with $F^{-1}$ (120 pm). The calculated effective crystallite size of (Sn,Ir)$O_2$:F was in the ~4-7 nm range comparable with (Sn,Ir)$O_2$ suggesting that $F^-$ doping had no significant effect on the corresponding crystallite size refinement of (Sn,Ir)$O_2$.

Figure 37A:
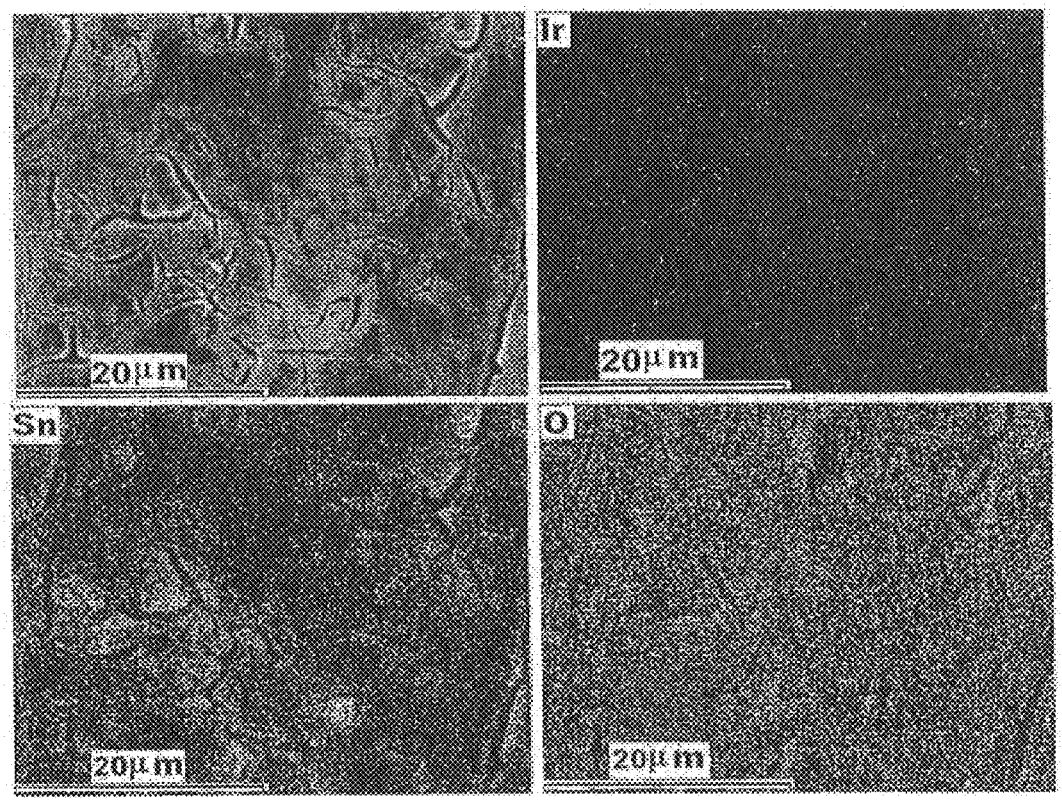
FIG. 37a is a SEM micrograph along with x-ray mapping of Ir, Sn and O.
Figure 37B:
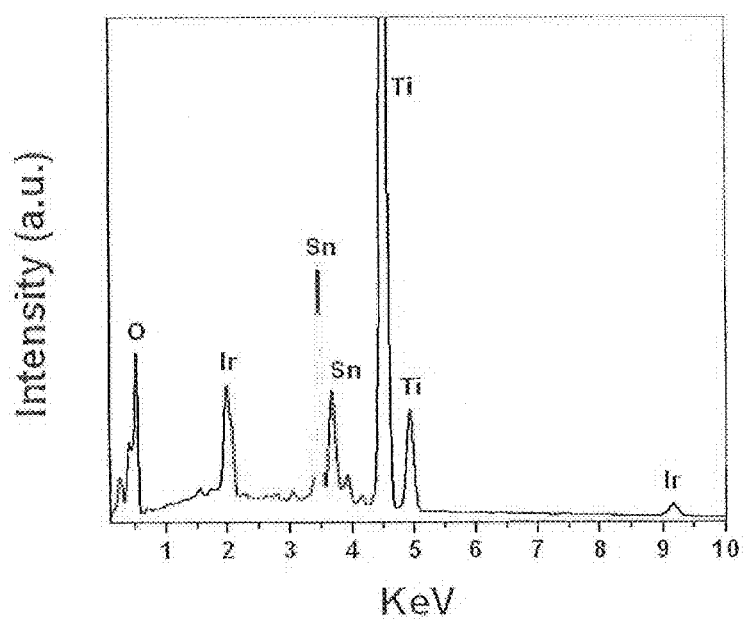
FIG. 37b is an EDAX of $(Sn_{0.8}Ir_{0.2})O_2$:10F film.
Figure 37C:
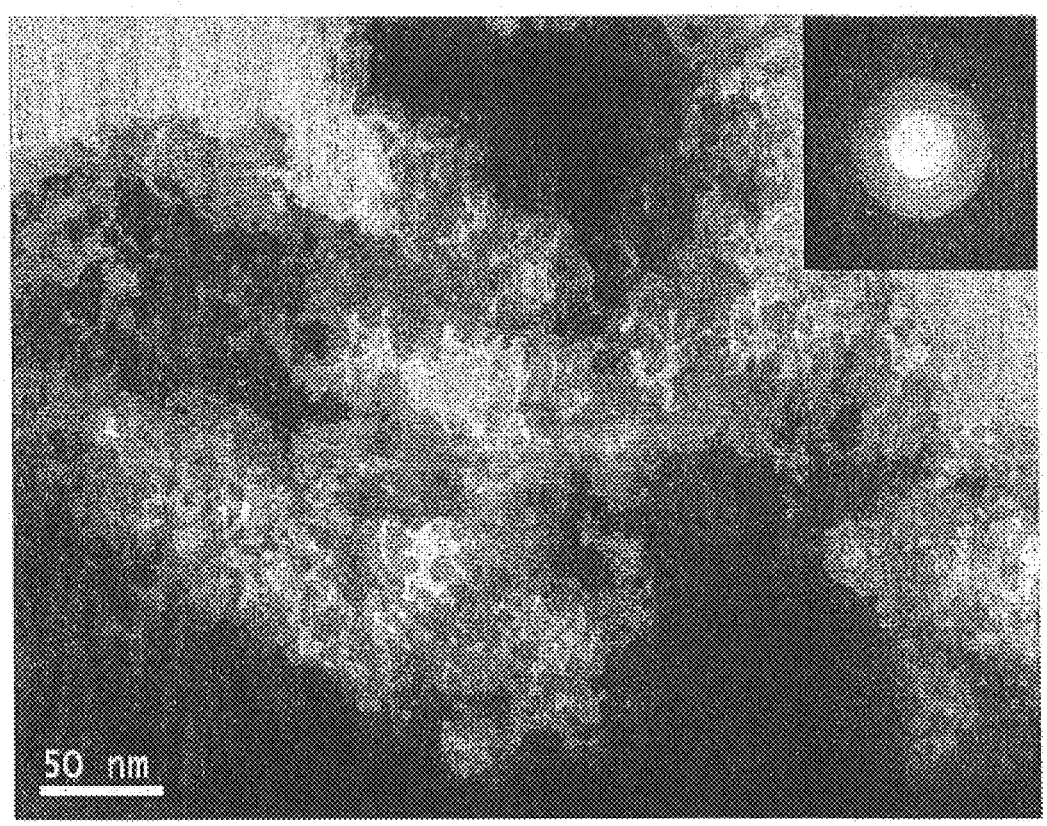
FIG. 37c is a bright field TEM image of $(Sn_{0.8}Ir_{0.2})O_2$:10F film showing the presence of fine particles in the nanometer range (~10-15 nm)

The presence of elemental Ir, Sn and O in the (Sn,Ir)$O_2$:F film of different compositions was confirmed using energy dispersive x-ray analysis (EDX) configured to the SEM, although as expected, the presence of F could not be detected. The SEM image along with elemental x-ray mapping (FIG. 37a) and EDX (FIG. 37b) of the (Sn,Ir)$O_2$:F film containing 10 wt % F indicated the presence of the characteristic "mud crack" morphology of the (Sn,Ir)$O_2$:F film coated on Ti foil (FIG. 37a), and also testified the presence of Ir, Sn and O (FIG. 37b) which were homogeneously distributed within the (Sn,Ir)$O_2$:F particles (see the elemental dot maps in FIG. 37a) without being segregated on any specific site or on any particular particle region. Quantitative elemental analysis of (Sn,Ir)$O_2$:F films obtained by EDX (FIG. 37b) further showed that the measured elemental composition of Sn and Ir were expectedly close to the nominal composition. The bright field TEM image of (Sn, Ir)$O_2$:F particles collected on the (Sn,Ir)$O_2$:10 wt % F film (FIG. 37c) confirmed the nanometer scale (~10-15 nm) of the nanostructured fine particles corresponding to the (Sn, Ir)$O_2$:F solid solution.

X-Ray Photoelectron Spectroscopy

Figure 38A:
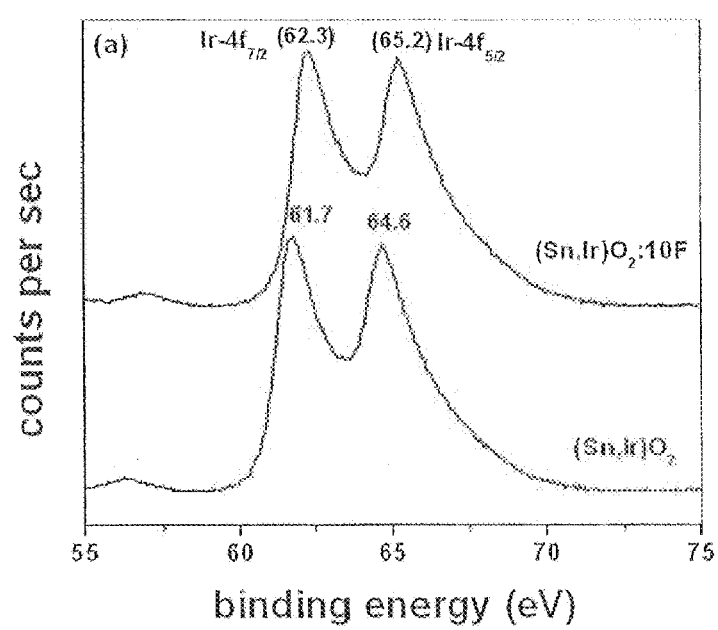
FIG. 38a is a XPS spectra of Ir $4f_{7/2}$ and $4f_{5/2}$ doublet.
Figure 38B:
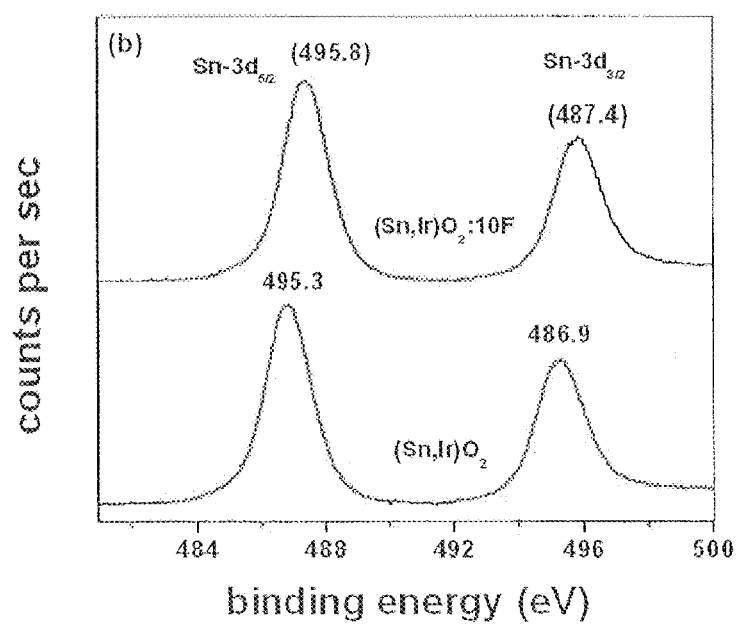
FIG. 38b is a XPS spectra of O1s.
Figure 38C:
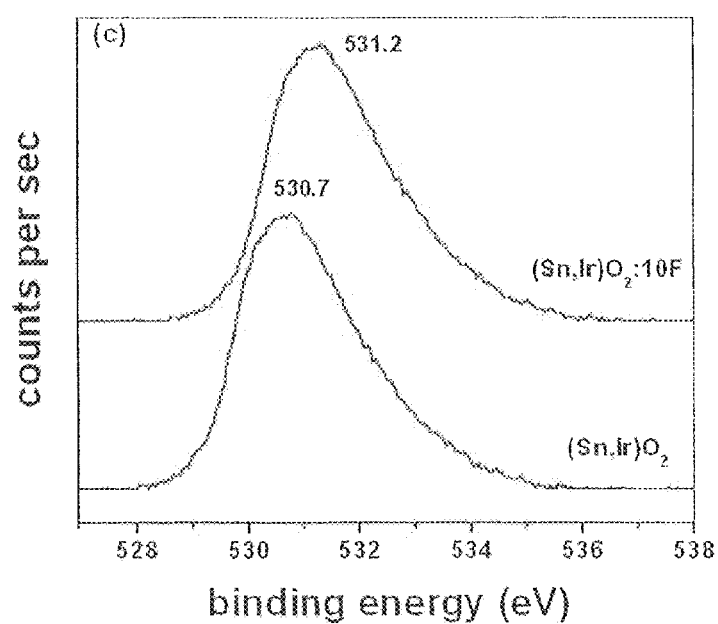
FIG. 38c is a XPS spectra of Sn $3d_{5/2}$ and Sn $3d_{3/2}$ doublet of $(Sn,Ir)O_2$ and $(Sn,Ir)O_2$:10F thin film.

To determine the valence state of Ir, Sn, O and to confirm the presence of F in the (Sn,Ir)$O_2$:F system, XPS studies were performed on the thin film. The XPS spectra of Ir, Sn and O1s of (Sn,Ir)$O_2$ and (Sn,Ir)$O_2$:F containing 10 wt % F are shown in FIGS. 38a, 38b, and 38c, respectively. The XPS spectra of Ir of (Sn,Ir)$O_2$ showed the presence of Ir $4f_{5/2}$ and Ir $4f_{7/2}$ doublet corresponding to the characteristic binding energy ~61.7 eV and ~64.6 eV (FIG. 3a), respectively, and O1s peak centered at ~530.7 eV (FIG. 3c) which was consistent with the bulk $IrO_2$ values. The XPS spectra of Sn for (Sn,Ir)$O_2$ also showed peak separation of $Sn3d_{5/2}$ and $Sn3d_{3/2}$ with a binding energy of ~486.9 eV and ~495.3 eV (FIG. 38b), respectively, and the O1s line centered at ~530.7 eV (FIG. 38c) which was consistent with stoichiometric $SnO_2$. In the case of (Sn,Ir)$O_2$:F, the presence of F could not be detected by XPS analysis probably due to the low concentration of F actually retained within the lattice. The binding energy of $Ir_{4f}$, $Sn_{3d}$ and O1s core level increased by ~0.5V, an indirect reflection of the stronger binding likely due to the higher electro-negativity of fluorine incorporated into the lattice. F incorporation clearly had a net positive impact on the electrochemical activity of (Sn,Ir)$O_2$:F solid solution most likely attributed to the improved electronic conductivity and the electrochemical stability.

Electrochemical Performance

The electrochemical activity of nano-crystalline $IrO_2$, $SnO_2$:F and (Sn,Ir)$O_2$:F thin films of different composition was studied as an OER anode electro-catalyst for PEM-based water electrolysis. Linear polarization curve and non-linear Tafel plot are most often encountered due to large contribution of ohmic resistance ($R_\Omega$) which mainly arises due to the solution resistance of the electrolyte (solution resistance, $R_s$), the oxide film electrode resistance ($R_e$) and the accumulation of oxygen gas bubble covering the electrode surface during water electrolysis occurring at higher current density (bubble resistance, $R_{bub}$). These contributions were also observed herein. To evaluate the inherent electrochemical property/electrode kinetics of the electrocatalyst, the polarization curve of different samples, conducted in the presence of 1N $H_2SO_4$ solution at 40° C. with a scan rate of 1 mV/sec, was plotted after appropriately correcting for the total ohmic loss ($iR_\Omega$). The value of the solution resistance ($R_s$) and the electrode resistance ($R_e$), respectively, of the different samples, tabulated in Table 7, was obtained from electrochemical impedance spectroscopy (EIS) measurements conducted at different potentials with respect to NHE at 40° C.

Figure 39A:
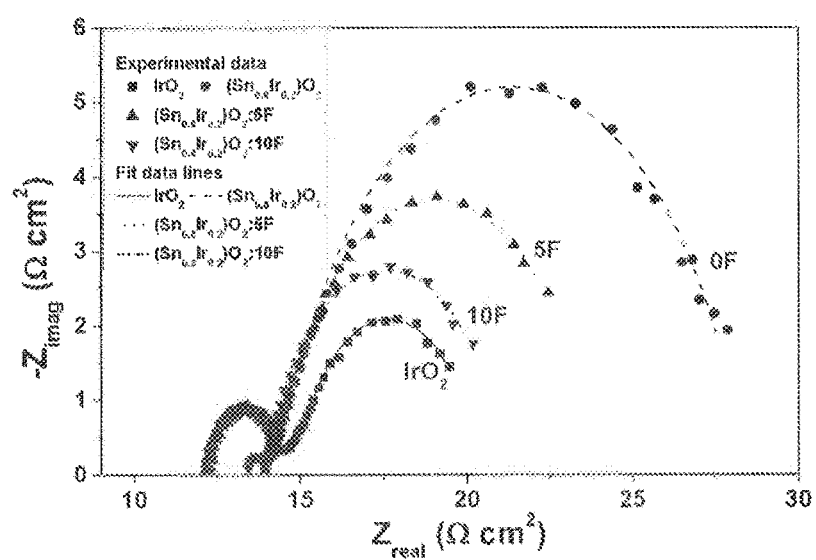
FIG. 39a is an electrochemical impedance plot of $IrO_2$ and $(Sn,Ir)O_2$:F obtained at 1.6V at 40° C. in the presence of 1N $H_2SO_4$ solution in the frequency range of 100 mHz-100 kHz.

FIG. 39a showed the electrochemical impedance plot of $IrO_2$ and $(Sn,Ir)O2:F$ obtained at 1.6V at 40° C. in the presence of 1N $H_2SO_4$ solution in the frequency range of 100 mHz-100 kHz. The impedance parameters (Table 7) was obtained by fitting the experimental data (FIG. 39a) using the ZView software from Scribner Associates with a circuit model $R_s(R_eQ_1)(R_{ct}Q_{dl})$, where $R_s$ was the solution resistance, $R_e$ was the electrode resistance, $R_{ct}$ was the charge transfer resistance, $Q_1$ was the constant phase element (CPE) and $Q_{dl}$ included contributions from both the double layer capacitance and pseudocapacitance, respectively. As shown in Table 7, the value of the electrode resistance ($R_e$) of $(Sn,Ir)O_2:F$ decreased with increase in F content in the parent $(Sn,Ir)O_2$ lattice which arose due to the improved electronic conductivity of $(Sn,Ir)O_2:F$ with increase in F. Consequently, $(Sn,Ir)O_2:F$ with 10 wt % F exhibited almost identical electrode resistance ($R_e$~1 $\Omega/cm^2$) as pure $IrO_2$ suggested the identical electronic conductivity of both systems. The low frequency EIS plot of pure $IrO_2$ and $(Sn,Ir)O_2:F$, shown in FIG. 39a, showed a well formed semicircle related to OER and also showed that the diameter of the low frequency semicircle typically a measure of the polarization resistance ($R_{ct}$) and thereby the catalytic activity of the electrode, decreased (Table 7) with increase in F. The above results therefore clearly suggested that the electro-chemical activity of $(Sn_{0.8}Ir_{0.2})O_2:F$ increased with increase in F and moreover, the polarization resistance ($R_{ct}$) value of $(Sn_{0.8}Ir_{0.2})O_2:10F$ was similar (~7 ohm) to that of pure $IrO_2$ (~6 ohm) which further indicated that both systems exhibited almost equivalent electro-catalytic activity as detailed below.

Figure 39B:
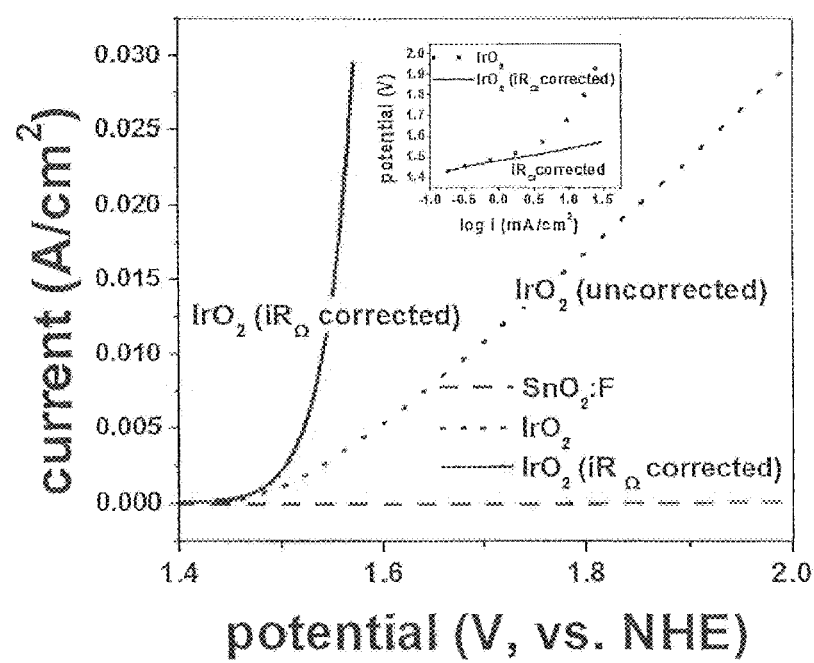
FIG. 39b is a polarization curve of pure $IrO_2$ and $SnO_2$:10F film showing a Tafel plot of pure $IrO_2$ before and after iRΩ correction.
Figure 39C:
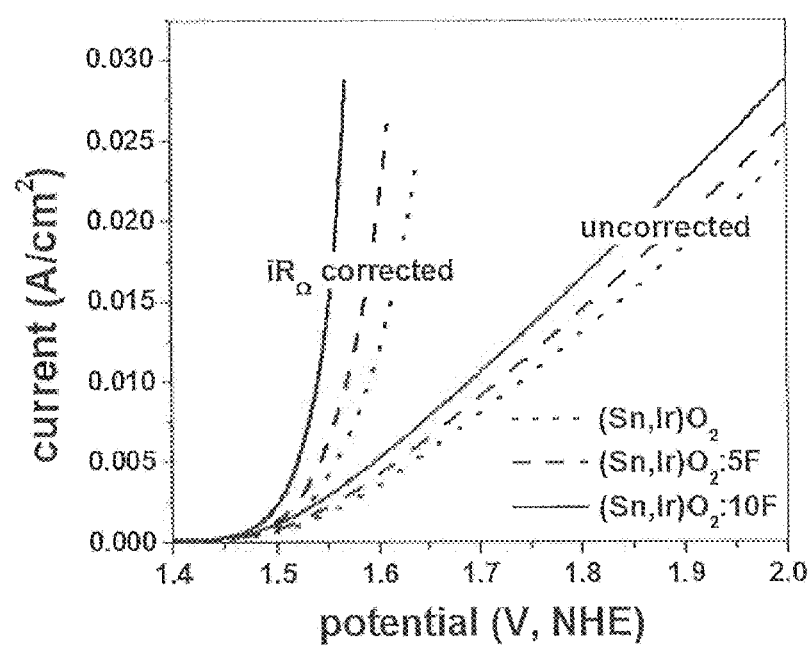
FIG. 39c is a polarization curve of $(Sn,Ir)O_2$:F film of different compositions conducted in the presence of 1N $H_2SO_4$ solution at 40° C. with a scan rate of 1 mV/sec before and after iRΩ correction.

The polarization curve of pure $SnO_2:F$ and $IrO_2$ film, before and after ohmic resistance correction ($iR_\Omega=iR_s+iR_e$) without considering the bubble resistance, conducted in the presence of 1N $H_2SO_4$ solution at 40° C. with a scan rate of 1 mV/sec, was plotted in FIG. 39b. The polarization curve of $SnO_2:F$ in FIG. 39b showed no catalytic activity for water electrolysis, as expected. Nanocrystalline pure $IrO_2$ clearly indicated (FIG. 39b) the occurrence of the water splitting (oxygen evolution reaction) reaction at a potential of ~1.43V vs. NHE. The current density at ~1.55V (vs. NHE), the typical voltage selected to check for electrochemical activity for water electrolysis obtained from $iR_\Omega$ corrected plot was ~0.014±0.001 A/cm² at 40° C. with a total loading ~0.3 mg/cm² of $IrO_2$. The Tafel slope of pure $IrO_2$ calculated from $iR_\Omega$ corrected Tafel plot (over-potential vs. log i) shown in the inset of FIG. 39b was ~60 mV/decade, which corresponded to a two electron pathway reaction assuming the transfer coefficient of ~0.5. The polarization curve for the various $(Sn,Ir)O_2:F$ films before and after $iR_\Omega$ correction ($R_\Omega=R_s+R_e$ tabulated in Table 7) corresponded to the different compositions of F, plotted in FIG. 39c also showed that water splitting (oxygen evolution reaction) occurred at the potential of ~1.43V (vs. NHE) irrespective of the composition which was identical to that of pure $IrO_2$. Furthermore, the current density at ~1.55V (vs. NHE) obtained from $iR_\Omega$ corrected plot for undoped $(Sn,Ir)O_2$ solid solution (0F) with an identical total loading ~0.3 mg/cm² was ~0.0042±0.0001 A/cm² at 40° C. which was almost three times lower than pure $IrO_2$. However, as shown in FIG. 39c, the current density of $(Sn,Ir)O_2:F$ increased with increase in F. In fact, $(Sn,Ir)O_2:F$ containing 10 wt % F showed a current density of ~0.014±0.001 A/cm² at ~1.55V (vs. NHE) which was comparable with that of pure $IrO_2$ shown in FIG. 39b. It had also been observed that the current density decreased with continued increase in F content above 10 wt % F. The Tafel slope of $(Sn,Ir)O_2:F$ with 0, 5, and 10 wt. % F (Table 7), calculated from the corresponding $iR_\Omega$ corrected Tafel plots, was 76, 70, 62 mV/decade, respectively, which also suggested that the electrochemical activity of $(Ir,Sn)O_2:F$ increased with increase in F with corresponding decrease in the Tafel slope for increasing F content reaching an optimal value for $(Sn_{0.8}Ir_{0.2})O_2:10F$ exhibiting comparable electrochemical activity to that of pure $IrO_2$ (~60 mV/decade).

Figure 39D:
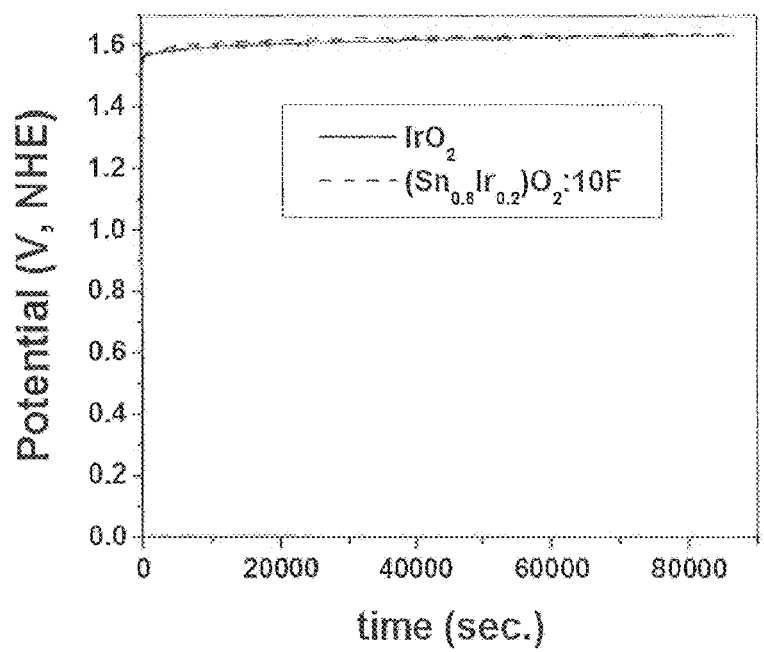
FIG. 39d is a plot of the variation of potential vs. time in the chronopotentiometry test of pure $IrO_2$ and $(Sn_{0.80}Ir_{0.20})O_2$:10F performed in a 1N $H_2SO_4$ solution under current density of 14 mA/cm2 at 40° C.

To study the electrochemical stability/durability of the anode electro-catalyst $(Sn,Ir)O_2:F$ in 1N $H_2SO_4$ during OER, chrono-potentiometry (CP) test was conducted for 24 h at 40° C. at a constant current density ~14 mA/cm² corresponding to the potential of 1.55V, the standard accepted potential for estimating electrochemical activity in FIGS. 39b and 39c and hence also selected as the potential to determine the current density for assessing the degradation or loss of activity of the catalyst as a function of time in CP studies. The CP curves, obtained at a constant current of ~14 mA/cm², of $(Sn,Ir)O_2:10$ wt % F combined with that of pure $IrO_2$ were shown in FIG. 39d. The CP curve clearly showed an increase in potential (after $iR_\Omega$ correction) with time which may be due to one of the following: 1. Dissolution of the irregular coating located at the edge of the mud cracks; 2. Diffusion controlled reaction; and 3. Evaporation induced loss of electrolyte. A steady increase in potential (1.63V after 24 h correspond to 1.60V after 2 h) was noticed after 2 h of the initial period for both $(Sn,Ir)O_2:10$ wt % F and pure $IrO_2$ which suggested that $(Sn_{0.8}Ir_{0.2})O_2:10F$ had similar structural stability compared to pure $IrO_2$. However, the ICP analysis conducted in the 1N $H_2SO_4$ electrolyte solution collected after 24 h of CP measurement, showed no presence of Ir up to 10 wt % F which suggested that the steady increase in potential for $IrO_2$ and $(Sn_{0.8}Ir_{0.2})O_2:10F$ during the CP measurement (FIG. 4d) was due to loss of fuel rather than dissolution of the $IrO_2$ or $(Sn_{0.8}Ir_{0.2})O_2:10F$ electro-catalyst from the surface.

Theoretical Analysis

The experimental results outlined above clearly indicated that formation of single phase rutile type solid solution of F doped $(Sn_{0.80}Ir_{0.20})O_2$ with reduced Ir content and incorporation of F had a significant impact on the electrochemical activity as well as the electrochemical stability (durability). The superior electrochemical activity of $(Sn_{0.8}Ir_{0.2})O_2:F$ with 10 wt % of F was expected to depend on the electronic structure as well as electronic conductivity of the $(Sn_{0.8}Ir_{0.2})O_2:F$ electrode since no significant change in structural parameters of molar volume and crystallite size with addition of different amount of F was observed. From a theoretical perspective, the effect of composition on the electronic structure in general, and the electronic conductivity with increase in F-concentration in the oxide could be considered as one of the factors contributing to the improved electrochemical performance.

Although addition of minor amounts of $IrO_2$ to $SnO_2$ rendered the $(Sn,Ir)O_2$ solid solution electrochemically active, from a theoretical standpoint in order to explain the experimentally observed unusually high electro-catalytic activity of $(Sn,IrO_2):F$ and its optimal chemical composition it would be more pertinent and appropriate to assess the evolution of the electronic structure beginning with pure $IrO_2$ oxide through $(Ir,Sn)O_2$ ending with the final compositions of the F-doped $(Ir,Sn)O_2$ oxide. A comparison of the $IrO_2$ electronic structure with that of $(Sn,Ir)O_2:F$ oxides provided insight into the role of fluorine in the context of the improved electrochemical performance observed for F doped $(Sn_{0.8}Ir_{0.2})O_2$. The following oxide solid solution compositions were chosen: pure $IrO_2$, $(Sn_{0.75}Ir_{0.25})O_2$, $(Sn_{0.75}Ir_{0.25})O_{1.5}F_{0.5}$, $(Sn_{0.75}Ir_{0.25})OF$, and $(Sn_{0.75}Ir_{0.25})O_{0.5}F_{1.5}$ corresponding to 0, 5.6, 11.0, and 16.4 wt % F, respectively. The total energy, electronic and optimized crystal structures, together with the total and projected densities of electronic states of the above mentioned compounds were calculated using the first principles approach within the density functional theory.

Figure 40:
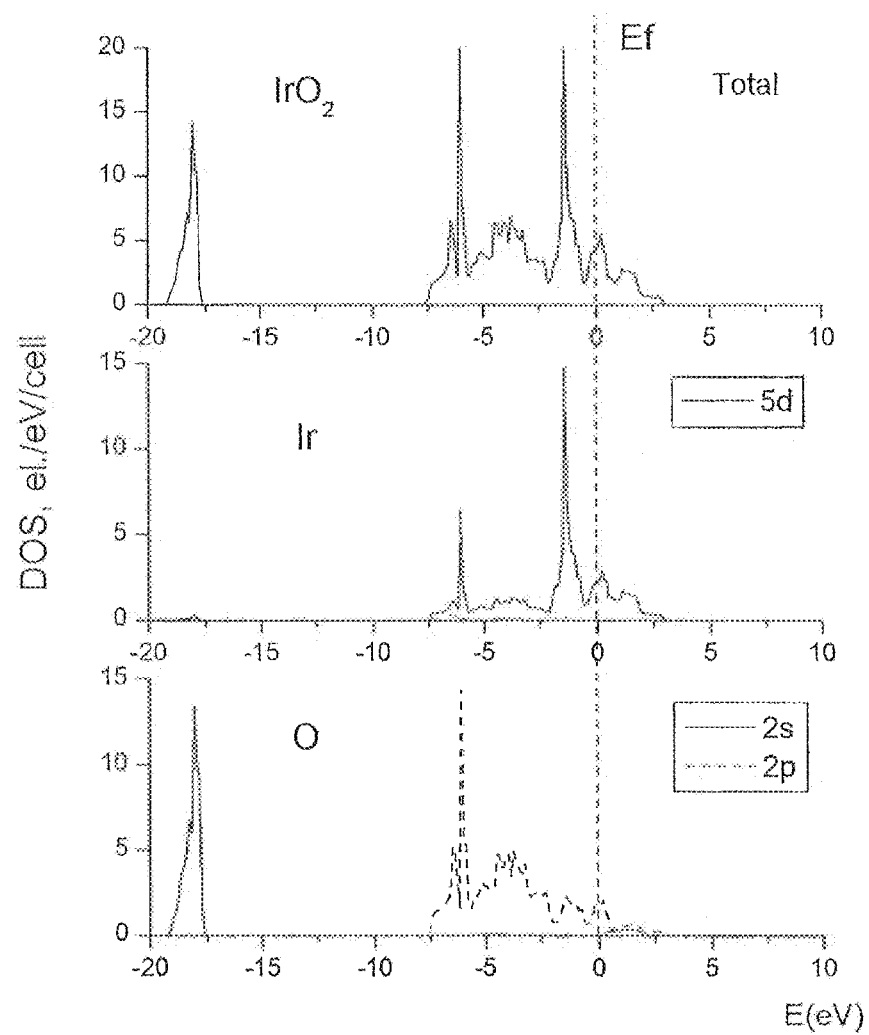
FIG. 40 is a plot of total and partial DOS for $IrO_2$.
Figure 41A:
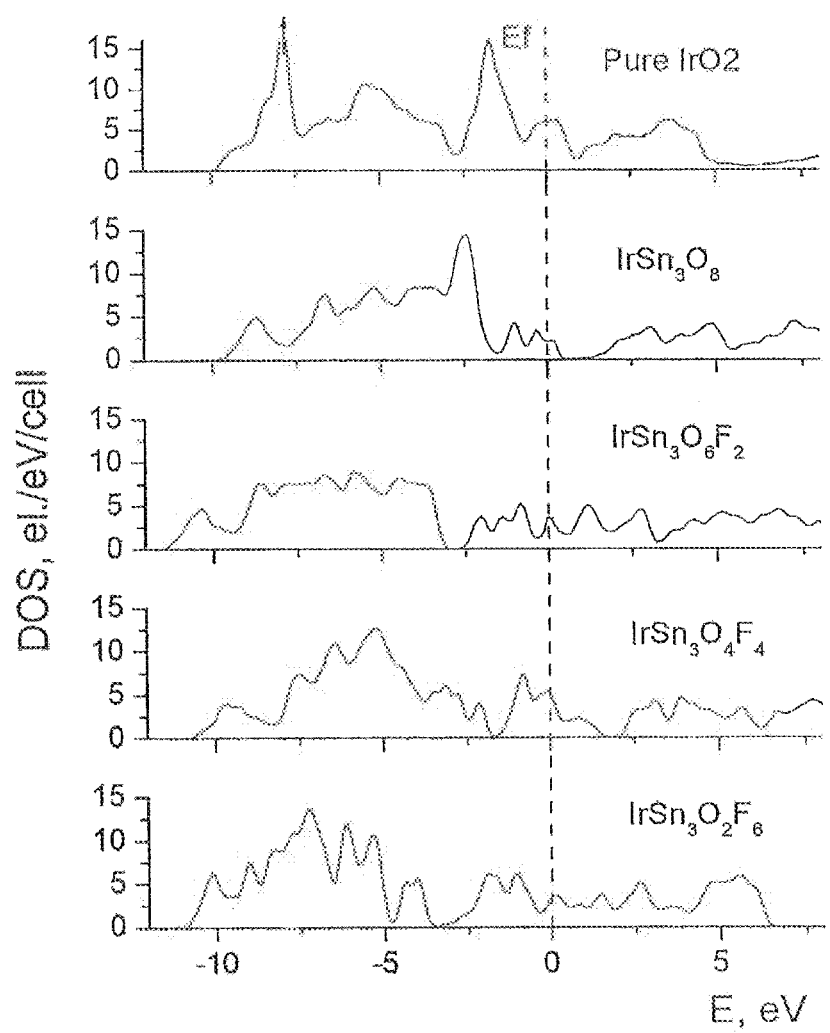
FIG. 41a is a plot of total DOS.
Figure 41B:
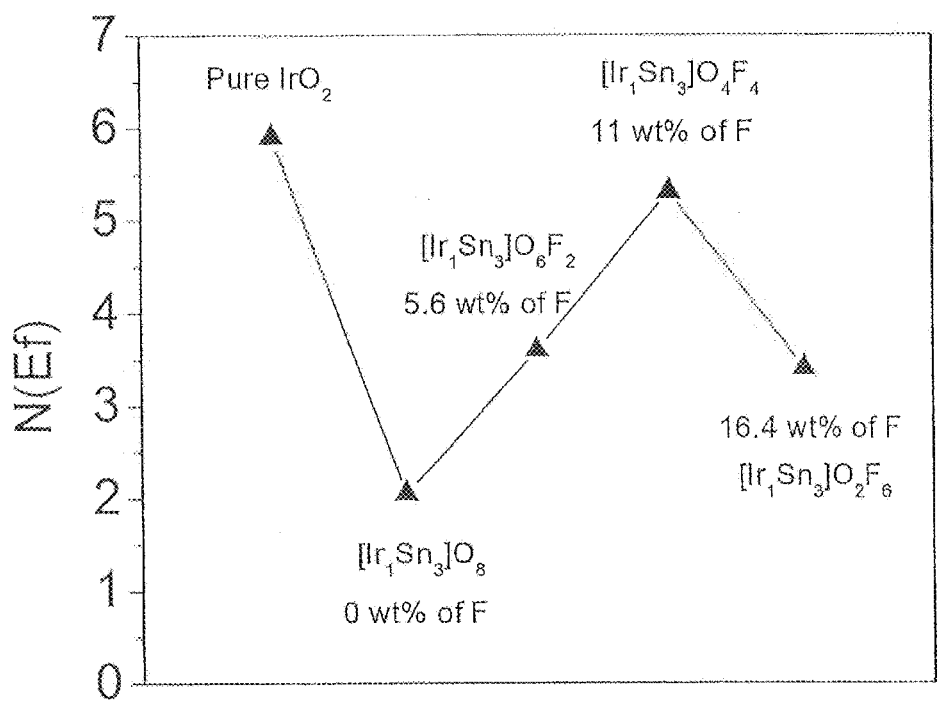
FIG. 41b is a plot of DOS at Fermi level for all materials considered: $IrO_2$, $(Sn,Ir)O_2$, $(Sn,Ir)O_2$:F.

The total and projected densities of electronic states calculated for pure $IrO_2$ are shown in FIG. 40. The main energy band structure of $IrO_2$ consisted of two bands. The low energy band between −19.2 and −17.5 eV was composed of the 2s states of oxygen and the wide valence band around Fermi level consisted of hybridized O 2p-Ir 5d states with two prominent peaks corresponding to these O 2p and Ir 5d states thus contributing to the well-known metallic conductivity of $IrO_2$. Incorporation of Sn into the $IrO_2$ matrix was likely to augment the electronic properties of the compound and the electronic structure of the bulk as well as the electronic structure of the most stable surface were calculated for $(Sn_{0.75}Ir_{0.25})O_{2-x}F_x$ with x=0, 0.5, 1, and 1.5. The total electronic densities of states for all these compositions were correspondingly shown in FIG. 41a. One can see that all of the compounds demonstrated metallic behavior although to different extents. FIG. 41b depicted the dependence of $n(E_F)$ vs. composition for $(Sn,Ir)O_2$:F. For comparison, the value of $n(E_F)$ was normalized to electrons per one $(Sn,Ir)O_2$:F formula unit. The graph clearly showed the reduction in conductivity of pure $IrO_2$ to $(Sn_{0.75}Ir_{0.25})O_2$ with $IrO_2$ introduction into the $SnO_2$ lattice representing a decrease in Ir-content of 0.25 atoms per formula unit. The incorporation of fluorine improved the conductivity drastically to an optimal value almost matching that of pure $IrO_2$ rendered at an F-content ~10-11 wt % of fluorine in the oxide. Poor electronic conductivity was expected to impair the overall catalytic activity of the material, which was confirmed by the total lack of electrochemical response of $(Sn_{0.80}Ir_{0.20})O_2$ devoid of fluorine (see FIG. 39c).

A descriptor was defined as a gravity center of the d-band center of the noble metal $\varepsilon_d$ usually located in the vicinity of the Fermi level which determined catalytic activity at surface. An optimal position of the d-band center provided an optimum highly favorable interaction between the catalytic surface and the various species participating in the catalytic reactions predominantly occurring on the surface leading to an expected maximum catalytic activity. Thus, such an interaction was considered "just appropriate" implying leading to a moderate effect allowing the reagents and products to both adsorb at the surface and also desorb most efficiently. An adjustment of the d-band center position with respect to the Fermi level may likely contribute to the design of highly active and electrochemically stable electro-catalysts.

Figure 42:
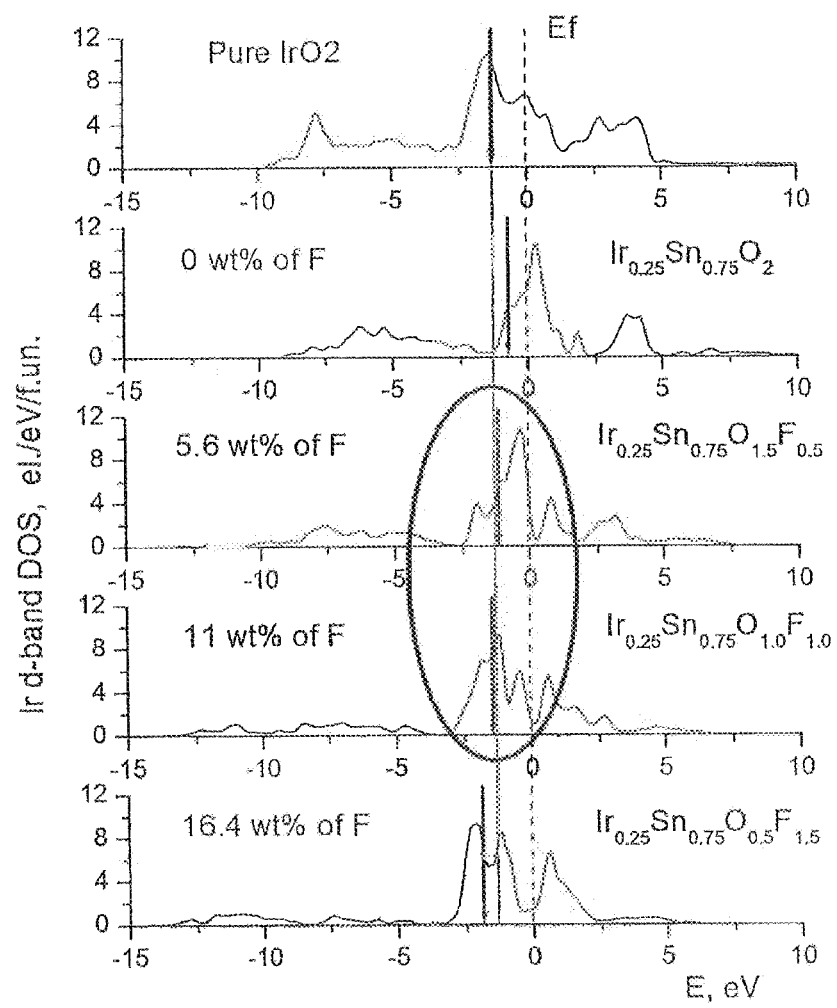
FIG. 42 is a plot of Ir d-band partial DOS for all materials considered: $IrO_2$, $(Sn,Ir)O_2$, $(Sn,Ir)O_2$:F; wt % F=0, 5.6, 11, and 16.4 wherein arrows denote positions of the d-band centers, $\varepsilon d$.

The electronic structure of the stable surfaces for all the above mentioned Ir-based oxides was calculated and the positions of the corresponding Ir d-band centers were obtained as a first moment of $n_d(E)$: $\varepsilon_d = \int n_d(E)EdE/\int n_d(E)dE$. FIG. 42 showed the partial Ir d-band densities of states together with the corresponding centers of these zones marked with vertical arrows on the graphs. The d-center for pure $IrO_2$ was located around 1.33 eV below the Fermi level. This position was considered as a reference point for comparison of the catalytic activities of the other oxides. Introduction of substantial amount of Sn (namely, 75 at %) to the oxide resulted in hybridization between Sn 5s, 5p and Ir 5d-states leading to a shift of the Ir d-band center up to the position at −0.75 eV below the Fermi level indicating that in general, an overall chemisorption reaction of the different species reacting at the surface was noticeably stronger for this composition rather than for pure $IrO_2$.

Assuming pure $IrO_2$ demonstrated optimal catalytic activity corresponding to $\varepsilon_d$=−1.33 eV it was suggested that a significant drop in the activity observed experimentally for $(Sn_{0.8}Ir_{0.2})O_2$ composition (see FIG. 39c) could be most likely explained by the positive shift of the Ir d-band center deviating the catalytic activity from its optimal value. Such a behavior of the d-band center could be attributed to the complex hybridization of the electronic Ir d-states and corresponding s and p-states of Sn and O during solid solution formation of the two binary oxides. Further consideration of the effects of fluorine doping in the formation of the electronic structure in general, could be explained in terms of this shift of the d-band center.

Figure 43:
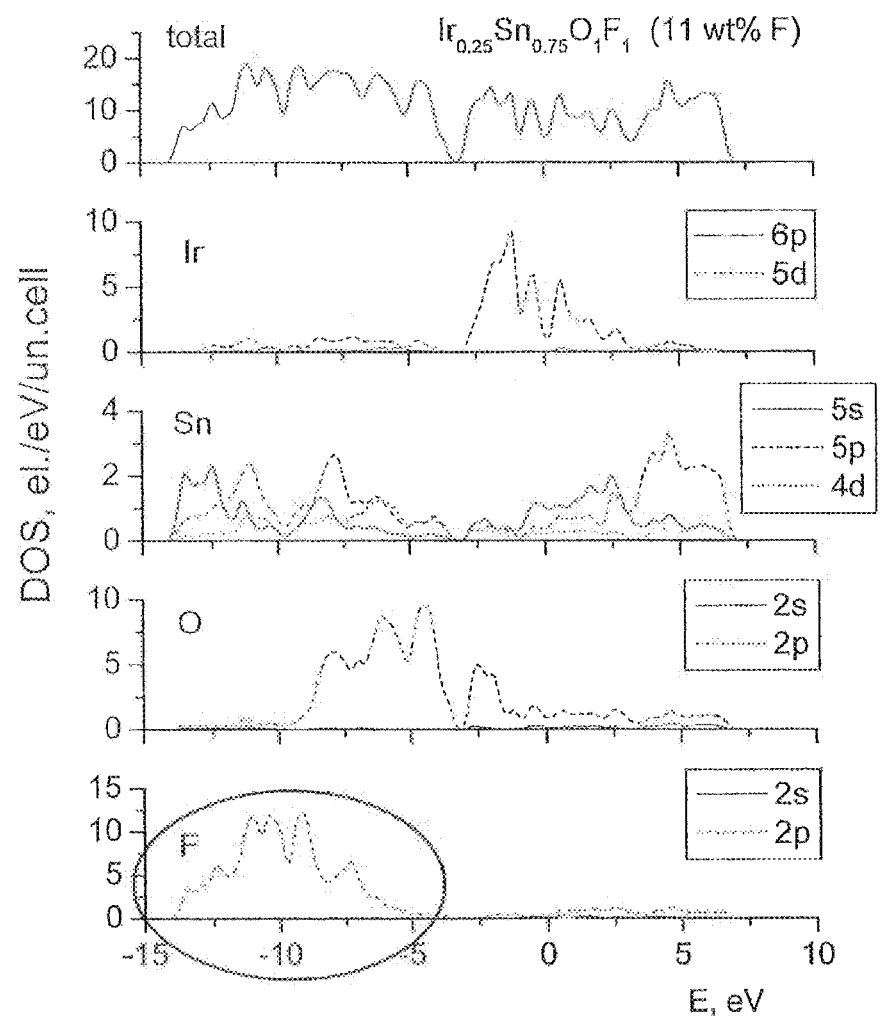
FIG. 43 is a plot of total and partial DOS for $(Sn,Ir)OF$ for F corresponding to 11 wt %.

FIG. 43 shows the total and partial DOS for $(Sn_{0.75}Ir_{0.25})O_{1.0}F_{1.0}$. Introduction of fluorine manifests in an appearance of the F 2p-band mostly below −5 eV with negligible amount of other states in the entire energy domain. Increase in F-content resulted in a more pronounced 2p states leading to a stronger hybridization effect between F 2p- and Ir 5d-states. As a result, the Ir d-band center location moved from −0.75 eV for the non-fluorine composition downward towards the position corresponding to pure $IrO_2$ (−1.33 eV) with increase in the F-content. As shown in FIG. 42 at 5.6, 11, and 16.4 wt % of F, the d-band center passed accordingly through −1.23, −1.41, and −1.87 eV positions, respectively, indicating significant improvement in the overall catalytic activity with increase in the F-concentration. The optimal F-concentration at which the d-center of $(Sn,Ir)O_2$:F returned back to the position corresponding to pure $IrO_2$ can therefore be expected to be around 9-10 wt % of F which was in agreement with experimental results discussed above.

Thus, with the increase in F content, the d-band center shifted downward on the energy scale returning back to the position corresponding to pure $IrO_2$ at 9-10 wt % of F-concentration rendering the system essentially mimicking the electronic and electro-catalytic properties of pure $IrO_2$. A combination of the improved metallic electronic conductivity and the d-band center position being optimal for $(Sn_{0.8}Ir_{0.2})O_2$ doped with ~10 wt % of F matching that of $IrO_2$ conceivably rendered this oxide demonstrating the high catalytic activity experimentally observed comparable to pure $IrO_2$. Additionally, for this composition the electronic structural change resulted in the entire oxide (not only Ir cations) becoming catalytically active mimicking the catalytic behavior of pure $IrO_2$. The addition of a relatively small amount of Ir into the $SnO_2$ matrix significantly modified the overall electronic structure of the resulting oxide introducing highly prominent 5d-band of Ir modified by the 2p-band of F. In contrast, pure $SnO_2$ or F-doped $SnO_2$ did not feature a noticeable valence d-band due to an absence of d-electrons on the outer electronic shells of the constituent elements (Sn, O, F). Thus, an introduction of Ir modified the material to be different from the original $SnO_2$:F, such that from the electronic structure point of view Ir-doped $SnO_2$:F resulted in the oxide exhibiting electrochemical characteristics similar to pure $IrO_2$ rather than Ir-free $SnO_2$:F. This change in the electronic properties was in accordance with the excellent electro-catalytic activity observed in this material. Thus, $(Sn_{0.8}Ir_{0.2})O_2$ doped with ~10 wt % F would potentially be a suitable oxygen evolution electro-catalyst composition for water electrolysis resulting in almost ~80% reduction in the noble metal content.

Thus, $(Sn,Ir)O_2$:F is a promising OER anode electrocatalyst with the ability to significantly reduce the noble metal oxide loading without compromising the electrocatalytic performance and electrochemical stability. Generation of the (Sn,Ir)O$_2$:F anode electro-catalysts in powder form with high specific surface area could be expected to exhibit similar or higher performance representing significant reduction in capital cost of PEM-based water electrolyzers without resulting in major alterations or any compromises, adverse reaction or reduction in the electrochemical performance.

Conclusions

It was demonstrated that F doped (Sn$_{0.80}$Ir$_{0.20}$)O$_2$ was a suitable OER electro-catalyst for PEM-based water electrolysis, synthesized as a thin film on Ti foil exhibiting an improved electrochemical performance with increasing F. The electrochemical activity of (Sn$_{0.80}$Ir$_{0.20}$)O$_2$:F increased with increase in F with the electrochemical performance of current density, polarization resistance, Tafel slope and stability/durability at an optimal composition of 10 wt % F matching that of pure IrO$_2$. It was demonstrated that a positive shift of the Ir d-band center of (Sn$_{0.80}$Ir$_{0.20}$)O$_2$ with respect to pure IrO$_2$ was due to the complex hybridization of the Ir d-states and corresponding s and p-states of Sn and O during formation of the solid solution of the binary oxide causing deviation of the catalytic activity from its optimal value. Incorporation of F particularly, at 9-10 wt % of F the d-band center returned back to the position corresponding to pure IrO$_2$ demonstrating high catalytic activity comparable to that of pure IrO$_2$. Further, (Sn$_{0.8}$Ir$_{0.2}$)O$_2$:F doped with ~10 wt % of F demonstrated electronic conductivity similar to pure IrO$_2$. As a result, it was concluded that (Sn$_{0.8}$Ir$_{0.2}$)O$_2$:F doped with ~10 wt % of F would be a suitable oxygen evolution electro-catalyst composition for water electrolysis that resulted in almost ~80% reduction in noble metal content, and thus a significant reduction in the overall capital cost of PEM based water electrolyzers.

TABLE 7

Impedance parameters and Tafel slope of IrO$_2$ and (Sn, Ir)O$_2$:F obtained fitting the experimental EIS data to the equivalent circuit R$_s$(R$_e$C$_1$)(R$_{ct}$Q$_{ct}$) and Tafel plot, respectively.

| composition | R$_s$ (ohm) | R$_e$ (ohm) | R$_{ct}$ (ohm) | Tafel slope (b) |
|---|---|---|---|---|
| IrO$_2$ | ~13.8 | ~1 | ~6 | 60 |
| (Ir$_{0.8}$Sn$_{0.2}$)O$_2$ | ~12.1 | ~2.7 | ~15 | 76 |
| Ir$_{0.8}$Sn$_{0.2}$)O$_2$:5F | ~13.1 | ~1.8 | ~10 | 70 |
| Ir$_{0.8}$Sn$_{0.2}$)O$_2$:10F | ~13.3 | ~1 | ~6.7 | 62 |

Example 5

Electrodes Preparation

Iridium tetrachloride [IrCl$_4$, 99.5%, Alfa Aesar], tin (II) chloride dihydrate [SnCl$_2$. 2H$_2$O, 98%, Alfa Aesar], niobium chloride [NbCl$_5$, 99.95%, Alfa Aesar] and ammonium fluoride [NH$_4$F, Alfa Aesar] were used as the sources for IrO$_2$, SnO$_2$, NbO$_2$, and F respectively. Stock solutions corresponding to IrCl$_4$, SnCl$_2$.2H$_2$O and NbCl$_5$ of desired composition of (Ir$_{0.30}$Sn$_{0.35}$Nb$_{0.35}$)O$_2$ were homogenized in absolute ethanol in a glove box (MBraun Unilab Work station). NH$_4$F was also dissolved simultaneously in an ethanol:deionised water (5:1 volume ratio) corresponding to the nominal amount of F to be incorporated corresponding to 5, 10, 15, and 20 wt % F. The four stock solutions of IrCl$_4$, SnCl$_2$.2H$_2$O, NbCl$_5$ and NH$_4$F were then mixed together in a vial for synthesizing (Ir,Sn,Nb)O$_2$:F electro-catalyst. Spin coating of this solution was done on pretreated Ti substrates of ~1 cm$^2$ surface area. The Ti substrate on which the thin film precursors were spin coated was dried in air at 60° C. for 2 h. Subsequently, the substrates were thermally treated to 400° C. for 4 h in air to decompose the metal precursors resulting in the formation of (Ir,Sn,Nb)O$_2$:F solid solution films on the Ti foil. The loading of the electrochemically active (Ir,Sn,Nb)O$_2$:F solid solutions was ~0.3 mg/cm$^2$ based on the total weight for all the compositions.

Materials Characterization

Physico-Chemical Characterization

In order to perform qualitative phase analysis, the (Ir,Sn,Nb)O2:F thin films coated on Ti foil were characterized by X-ray diffraction (XRD). An operating voltage of 45 kV and a current of 40 mA was used in the Philips XPERT PRO system employing CuK$_\alpha$ ($\lambda$=0.15406 nm) radiation.

Scanning electron microscopy (SEM) was done in order to study the microstructure of the thin film electrodes. Energy dispersive X-ray spectroscopy (EDX) analyzer integrated into the SEM machine (Philips XL-30FEG) was used for quantifying the elements and x-ray mapping which provided the distribution of elements.

Electrochemical Tests

The electrochemical activity of (Ir,Sn,Nb)O$_2$:F of the different compositions, for OER in PEM-based water electrolysis, was tested using VersaSTAT 3 (Princeton Applied Research), in a three electrode cell configuration. The electrochemical reactivity and electrochemical kinetics of the electro-catalyst was determined from cyclic voltammetry, linear polarization and electrochemical impedance spectroscopy (EIS) measurements. 1N sulfuric acid solution was used as the electrolyte (source of fuel). Thin films of (Ir,Sn,Nb)O$_2$:F of different F compositions coated on the Ti foil were used as the working electrode with a total loading of ~0.3 mg/cm$^2$ for each system. A scan rate of ~1 mv/sec was used to record the polarization curve. Solution, electrode and polarization resistance of the electro-catalyst had been achieved via EIS using the circuit model R$_s$(R$_e$Q$_1$)(R$_{ct}$Q$_{dl}$), where R$_s$ was the solution resistance, R$_{ct}$ was the charge transfer resistance, Q$_1$ was the constant phase element and Q$_{dl}$ which was comprised of the double layer capacitance and pseudocapacitance. The Tafel plot after implementing the iR correction was given by the equation $\eta$=b log i+a; and the Tafel slope (b) had been used to determine the reaction kinetics. EIS was done in the frequency range of 100 mHz-100 kHz using the VersaSTAT 3 (Princeton Applied Research). Impedance data was fitted using the ZView software (Scribner Associates).

Chronoamperometry (CA) i.e. current vs. time measurement for all samples had been performed to assess the accelerated life test of the electrodes for PEM-based water electrolysis. A constant voltage of ~1.65V (vs. NHE) for 24 h using 1N H$_2$SO$_4$ at 40° C. had been applied employing the same three electrode cell configuration. The electrolyte solutions collected after 24 h of CA were then subjected to elemental analysis in an inductively coupled plasma optical emission spectroscopy (ICP-OES, iCAP 6500 duo Thermo Fisher). The amount of iridium, tin and/or niobium leached into the solution was determined and the stability and corrosion resistance of the prepared electro-catalysts was established.

Computational Methodology

The electrochemical activity of the (Ir,Sn,Nb)O$_2$:F electro-catalyst was expected to depend on the electronic structure and the electronic conductivity; and the cohesive energy of the system provides qualitative information regarding the structural stability of the electrode materials. Theoretical calculations were made to understand the effect of different (Ir,Sn,Nb)O$_2$:F compositions on the electronic conductivity, long term stability and the catalytic activity of the material. The electronic properties of the solid solution between $IrO_2$, $SnO_2$ and $NbO_2$ with and without the incorporation of different amounts of F were investigated to mimic the materials described in the experimental section. First principles approach was used to calculate the total energy, electronic and optimized crystal structures; total and projected densities of electronic states along with the cohesive energies for pure $IrO_2$ and different compositions of $(Ir,Sn,Nb)O_2$: Fusing the density functional theory. Tin oxide, niobium dioxide and fluorine had been introduced with $IrO_2$ to assess the electronic conductivity and structural stability of the compounds along with the electronic structure peculiarities related to the chemical compositions of the materials considered.

The bulk and surface of $(Ir,Sn,Nb)O_2$ doped with different amount of F was considered to exhibit rutile structure with a tetragonal unit cell and space group $P4_2/mnm$ following experimental validation. Based on this primitive rutile-type unit cell there had been chosen a four-fold 2×2×1 super-cell with different atomic configurations corresponding to the specific Ir, Sn, Nb and F compositions of the oxide solid solutions. To facilitate convenient calculations, the basic composition was chosen as 25 at % $IrO_2$-37.5 at % $SnO_2$-37.5 at % $NbO_2$ instead of 30/35/35 ratio. Such 25/37.5/37.5 composition although slightly different from the experimental ratio allowed the selection of smaller representative super-cells for all the calculation of bulk and surface electronic structures employed. Thus, the compositions of the solid solutions chosen to model the compounds considered in the experimental study were pure $IrO_2$ and $(Ir_{0.25}Sn_{0.375}Nb_{0.375})O_2$-xFx, where x=0, 0.5, 1.0, and 1.5 corresponding to 0, 4.5, 9.0, and 13.5 wt % of F, respectively. The compositions representing the incorporation of F were slightly different from the nominal composition of F studied as described above for the electrode preparation selected for computational convenience. A two-dimensional slab repeated in [1 −1 0] direction with 36 atom unit cell and a vacuum distance ~12 Å between adjacent images of the slab was selected for calculating (110) surface electronic properties.

The Vienna Ab-initio Simulation Package (VASP) was used within the projector-augmented wave (PAW) method and the generalized gradient approximation (GGA) for the exchange-correlation energy functional in a form suggested by Perdew and Wang for calculating the total energies, electronic structure, and density of electronic states.

It should be noted that for all the $(Ir,Sn,Nb)O_2$:F compositions, the corresponding atomic distributions were ambiguous and were represented by different spatial configurations. Several atomic configurations had been constructed for each composition and only those configurations that had the lowest total energies were considered.

Experimental Results

Figure 44:
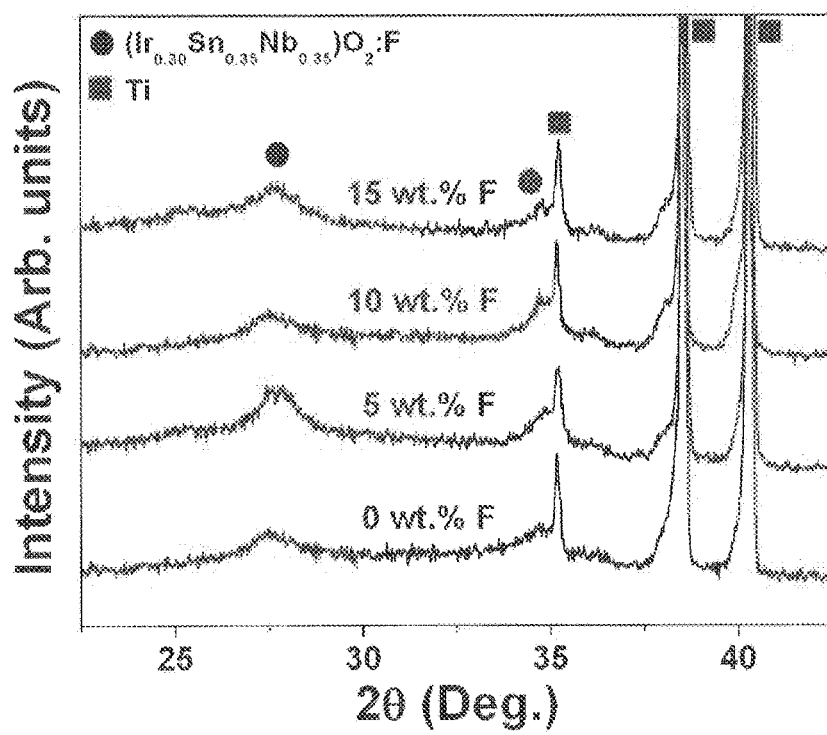
FIG. 44 is a XRD pattern of thin film $(Ir_{0.30}Sn_{0.35}Nb_{0.35})O_2$:F of different compositions coated on Ti foil.

The x-ray diffraction (XRD) patterns of thin film $(Ir,Sn,Nb)O_2$:F synthesized by thermal decomposition of $IrCl_4$, $SnCl_2 \cdot 2H_2O$, $NbCl_5$ and $NH_4F$ solution coated on the Ti foil and heat treated at 400° C. for 4 h is shown in FIG. 44. The XRD pattern of $(Ir,Sn,Nb)O_2$ (FIG. 44) exhibited a rutile type tetragonal structure similar to pure $IrO_2$ suggesting the formation of complete solid solution between $IrO_2$, $SnO_2$ and $NbO_2$. No additional peaks were seen other than rutile $IrO_2$ which concluded there was no undesirable phase formation. The lattice parameter of $(Sn,Nb)O_2$ was comparable to pure $SnO_2$ since the ionic radius of $Sn^{+4}$ (69 pm) was close to that of $Nb^{+4}$ (68 pm). Also, the molar volume of tin and niobium dioxides were 21.65 and 21.17 $cm^3$/mol respectively. In order to improve the electronic conductivity of $(Ir,Sn,Nb)O_2$, fluorine was incorporated in the structure to replace oxygen at nominal compositions of 5, 10, 15 and 20 wt. % F. The XRD patterns showing the $(Ir,Sn,Nb)O_2$:F solid solution for up to 15 wt. % F compositions, confirmed the retention of the tetragonal rutile structure similar to the parent $(Ir,Sn,Nb)O_2$ (FIG. 44). The lattice parameter (a~0.46 nm, c~0.31 nm) and molar volume of $(Ir,Sn,Nb)O_2$:x wt. % F (~20 $cm^3$/mol), calculated using least square refinement technique, was similar to pure $IrO_2$ (~19.7 $cm^3$/mol). This clearly indicated no effect of $F^-$ substitution for $O^{2-}$ on the molar volume of $(Ir,Sn,Nb)O_2$:F. It should be noted that this was due to the ionic radius of $O^{2-}$ and $F^-$ being similar (125 pm and 120 pm, respectively). The effective crystallite size of $(Ir,Sn,Nb)O_2$:F, calculated using the Scherrer formula, was ~4-6 nm irrespective of the amount of fluorine doping. This elucidated the nanocrystallinity of all the synthesized electro-catalysts.

Figure 45A:
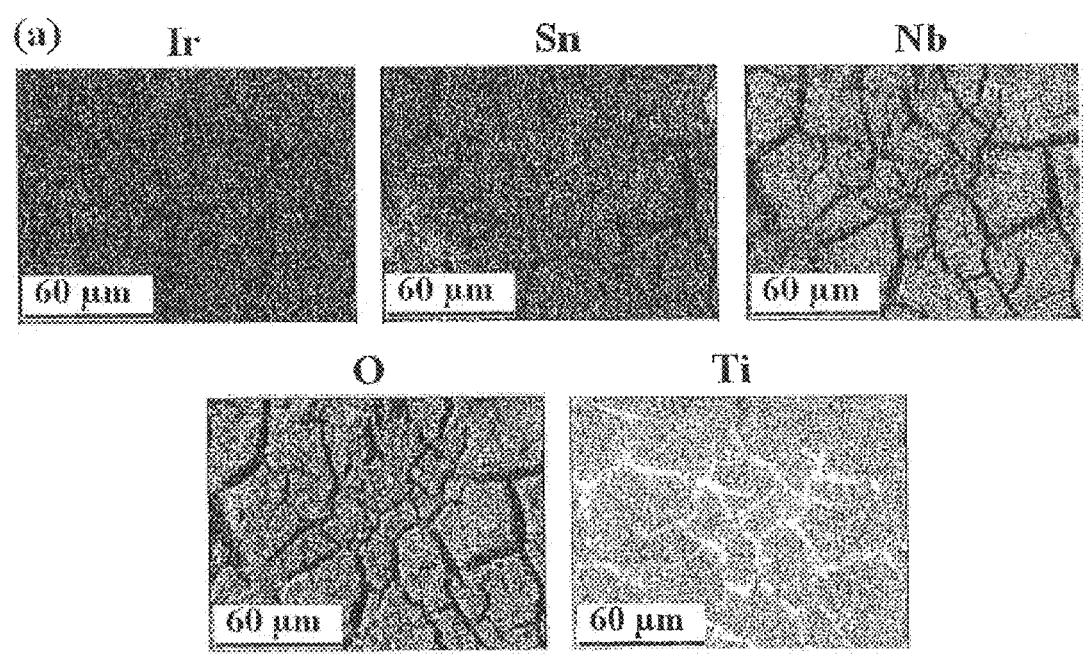
FIG. 45a is a x-ray mapping of Ir, Sn, Nb, O and Ti of the SEM micrograph.
Figure 45B:
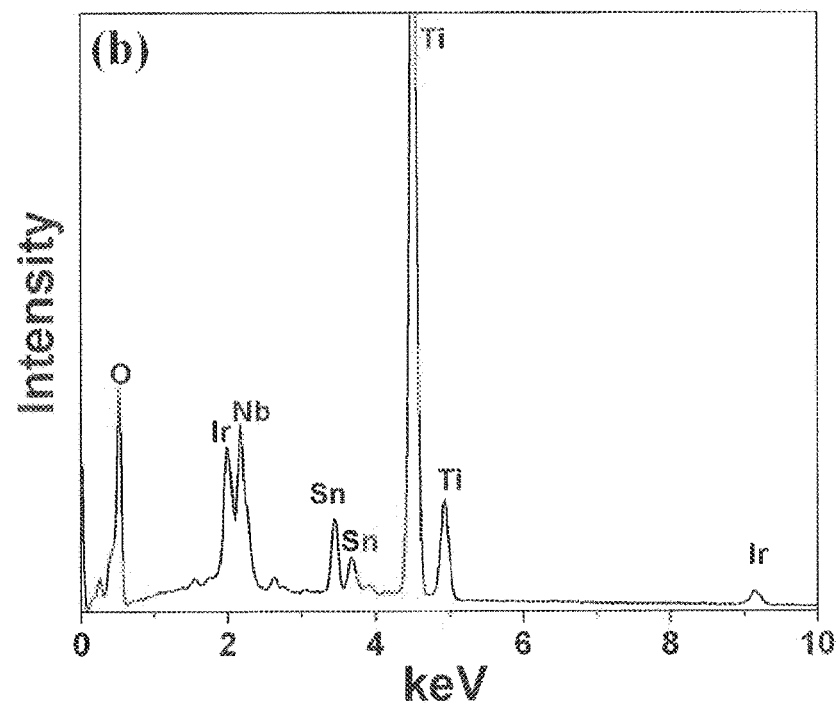
FIG. 45b is an EDAX spectra $(Ir_{0.30}Sn_{0.35}Nb_{0.35})O_2$:10 wt. % F film.
Figure 46A:
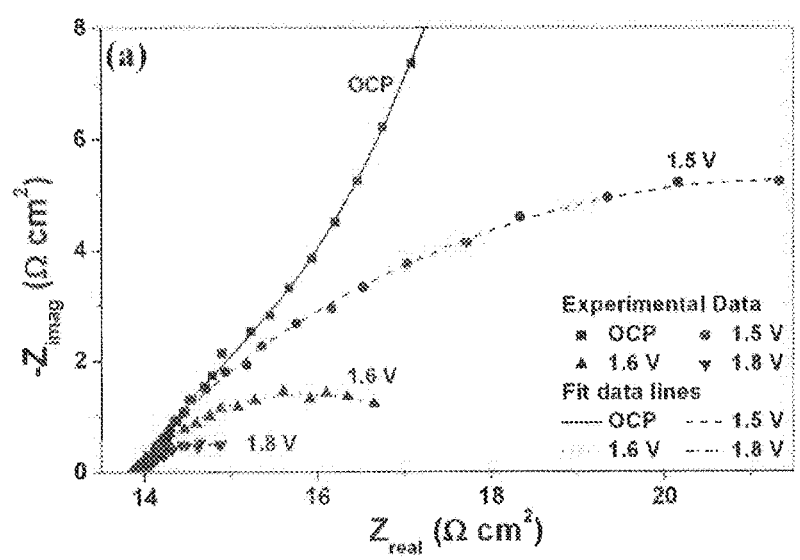
FIG. 46a is an EIS spectra of pure $IrO_2$.
Figure 46B:
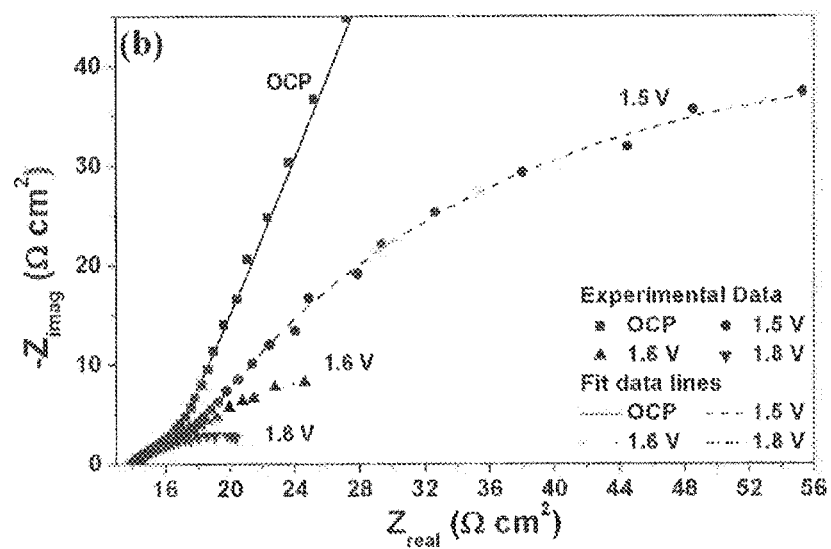
FIG. 46b is an EIS spectra of $(Ir,Sn,Nb)O_2$.
Figure 46C:
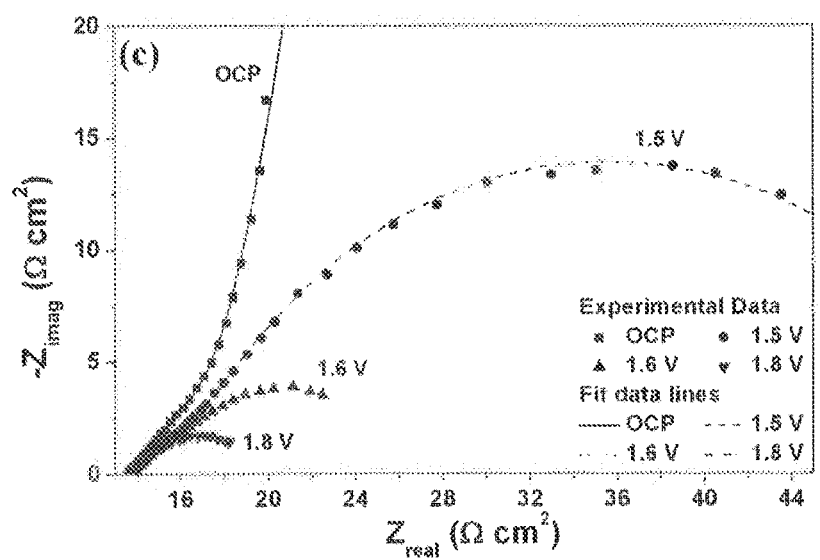
FIG. 46c is an EIS spectra of $(Ir,Sn,Nb)O_2$:5 wt. % F.
Figure 46D:
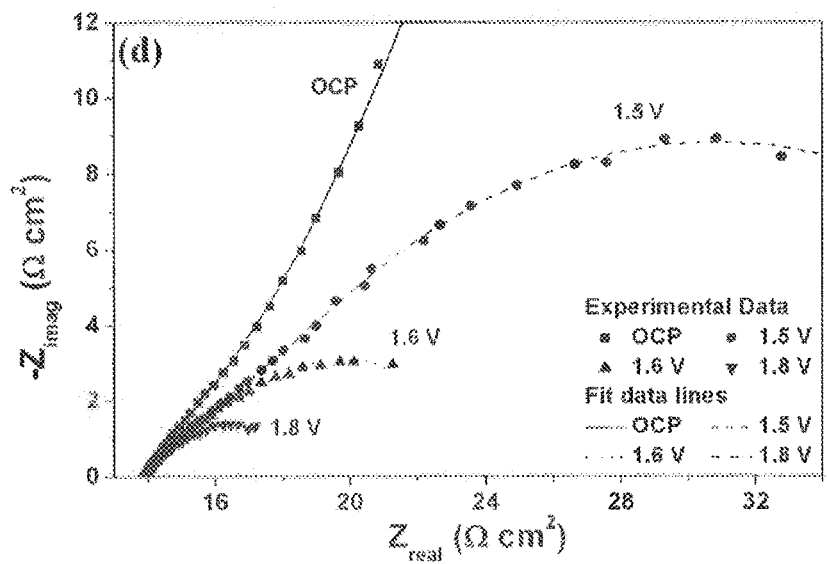
FIG. 46d is an EIS spectra of $(Ir,Sn,Nb)O_2$:10 wt. % F obtained at open circuit potential (OCP) and at different potentials (1.5V, 1.6V and 1.8 V) tested in 1N $H_2SO_4$ at 40° C.

Energy dispersive x-ray spectroscopy (EDX) confirmed the presence of elemental Ir, Sn and Nb in the $(Ir,Sn,Nb)O_2$:x wt. % F thin film, where x ranges from 0 to 20. However, EDX analysis did not detect the presence of F as expected. It should be noted that the final F content in the $(Ir,Sn,Nb)O_2$:F thin film may not be the same as the nominal composition started with due to the expected loss of the highly volatile F species during heat treatment of the precursors in air at 400° C. for 4 h. The x-ray mapping and EDX of the representative $(Ir_{0.30}Sn_{0.35}Nb_{0.35})O_2$:10 wt. % F film, is shown in FIGS. 45a and 45b, respectively. FIG. 45a clearly indicated the presence of Ir, Sn, Nb and O, which were homogeneously distributed within the $(Ir,Sn,Nb)O_2$:F grains without being segregated on any specific site. The SEM image (FIG. 45b) showed a characteristic sintered "mud crack" type morphology typically seen in chemically derived thin films. Quantitative composition analysis of the elements by EDX for all the $(Ir,Sn,Nb)O_2$:F films confirmed that the final elemental composition was very similar to the starting composition of the films barring the presence of F. Although EDX could not categorically confirm the presence of F, the improved electrochemical performance served as evidence of the presence of fluorine in the lattice.

The electrochemical activity was evaluated for the nanocrystalline thin film $(Ir,Sn,Nb)O_2$:F as a suitable anode electro-catalyst for the OER via PEM electrolysis. The linear polarization curve and non-linear Tafel plot were encountered due to ohmic resistance, which arose due to $R_s$ and $R_e$. The polarization curves of $(Ir,Sn,Nb)O_2$:F were used to evaluate the electrode kinetics after accounting for ohmic loss correction. Polarization was done in presence of 1N sulfuric acid at a scan rate of 1 mV/sec at 40° C. FIGS. 46a, 46b, 46c and 46d showed the EIS plot of $IrO_2$ and $(Ir,Sn,Nb)O_2$:F with 0, 5 and 10 wt. % F, respectively, obtained at open circuit potential (OCP), 1.5V, 1.6V and 1.8V (vs. NHE) at 40° C. in the frequency range of 100 mHz-100 kHz. It was shown that $R_s$ of $IrO_2$ and $(Ir,Sn,Nb)O_2$:F was unchanged at different voltages (FIG. 46). From the EIS plot, the semicircle seen at low frequencies was due to OER which would be a measure of $R_{ct}$. The $R_{ct}$ values decreased with increase in F content, indicating increase in electrochemical activity of the electro-catalyst. Table 8 showed $R_s$ and $R_{ct}$ at 1.6V for different F doping along with the Tafel slope. These results suggested that the electrochemical activity of $(Ir_{0.30}Sn_{0.35}Nb_{0.35})O_2$:F increased with increase in F content up to 10 wt. % F.

Figure 47A:
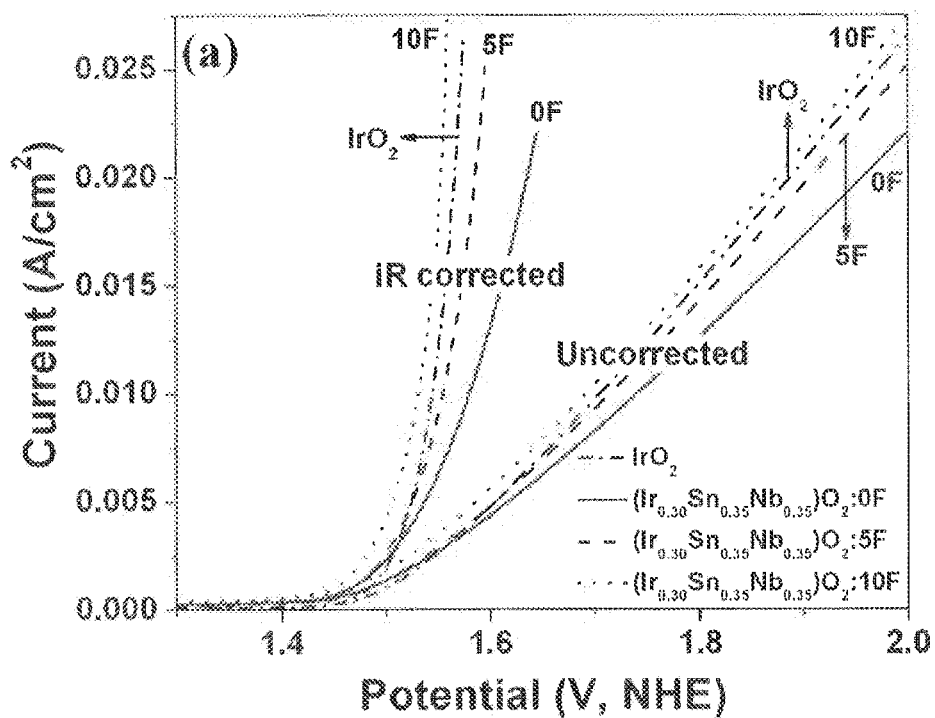
FIG. 47a is a polarization curve of pure $IrO_2$ and $(Ir,Sn,Nb)O_2$:F; with 0, 5 and 10 wt. % F before and after iR correction conducted in the presence of 1N $H_2SO_4$ solution at 40° C. with a scan rate of 1 mV/sec.
Figure 47B:
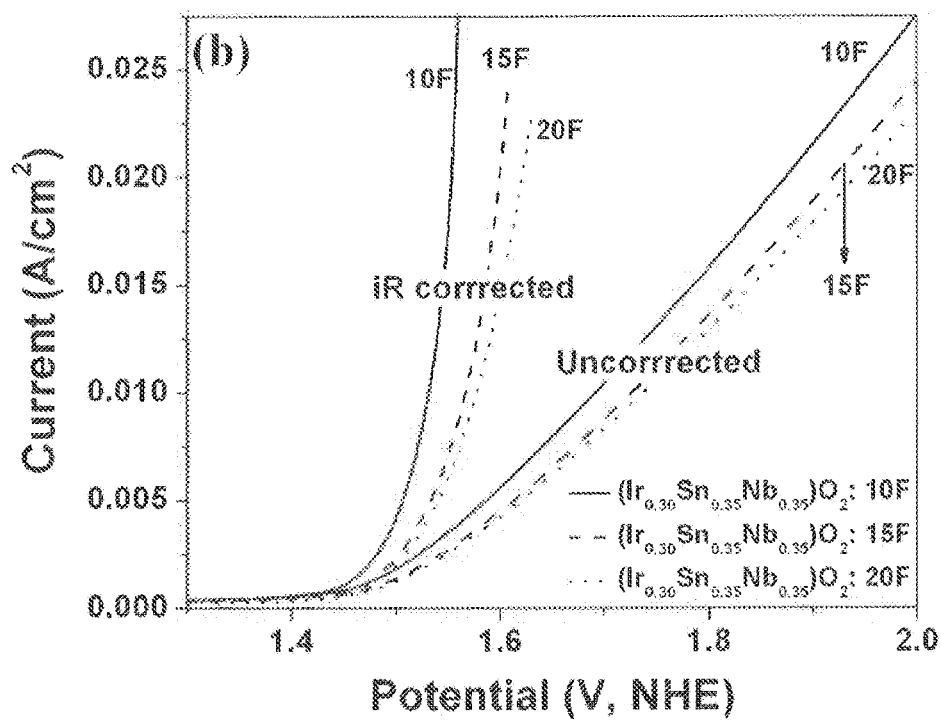
FIG. 47b is a polarization curve of $(Ir,Sn,Nb)O_2$:F with 15 and 20 wt. % F before and after iR correction conducted in the presence of 1N $H_2SO_4$ solution at 40° C. with a scan rate of 1 mV/sec.
Figure 48A:
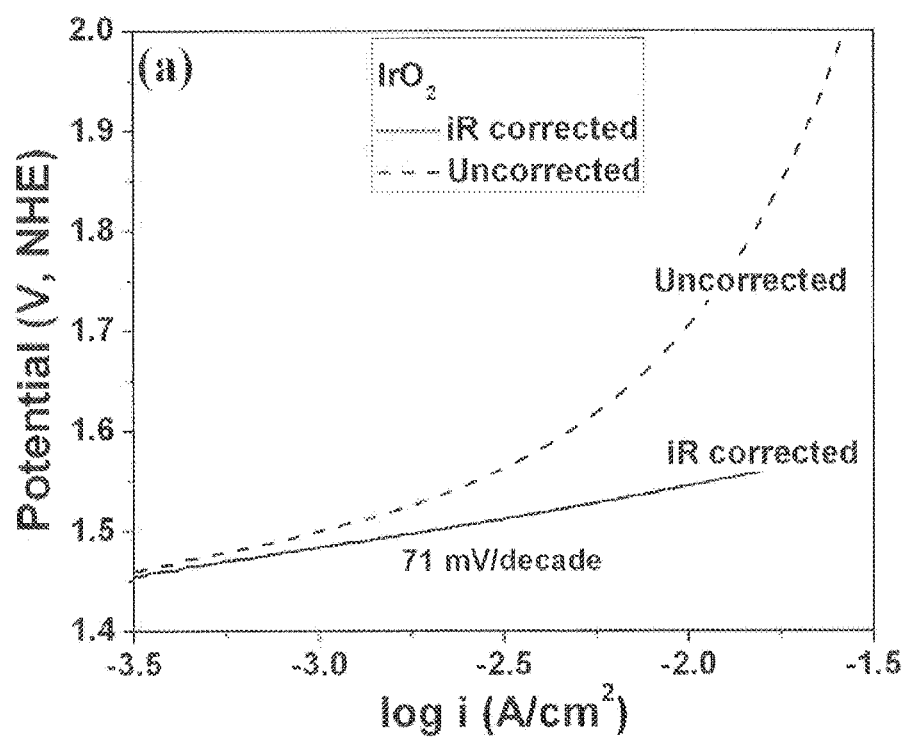
FIG. 48a is a Tafel plot of $IrO_2$ before and after iRΩ correction showing a tafel slope ~71 mV/dec.
Figure 48B:
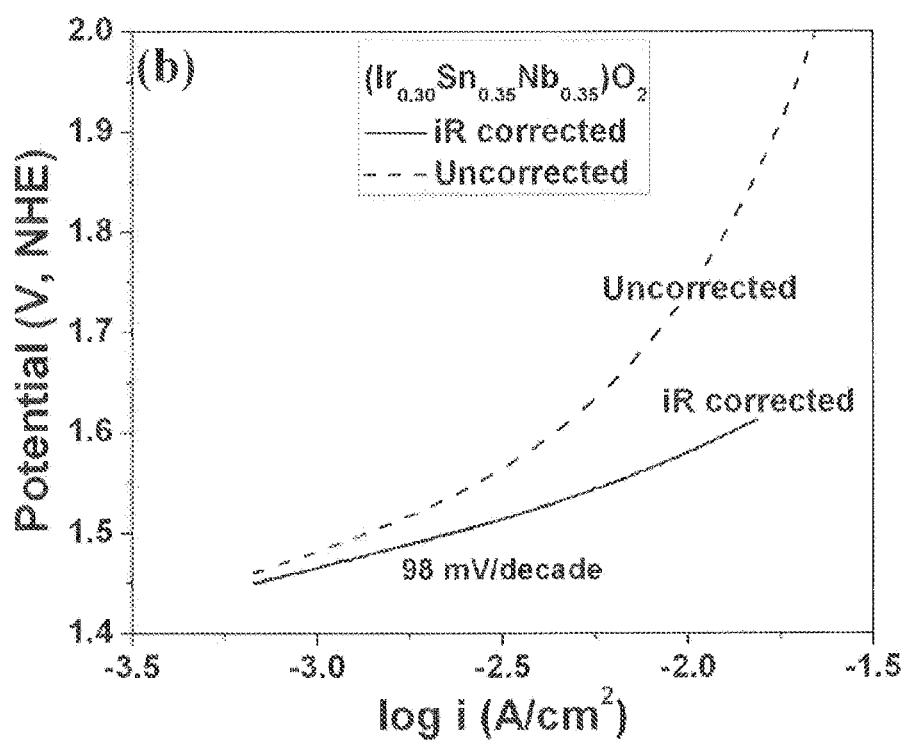
FIG. 48b is a Tafel plot of $(Ir,Sn,Nb)O_2$ before and after iRΩ correction showing a tafel slope ~98 mV/dec.
Figure 48C:
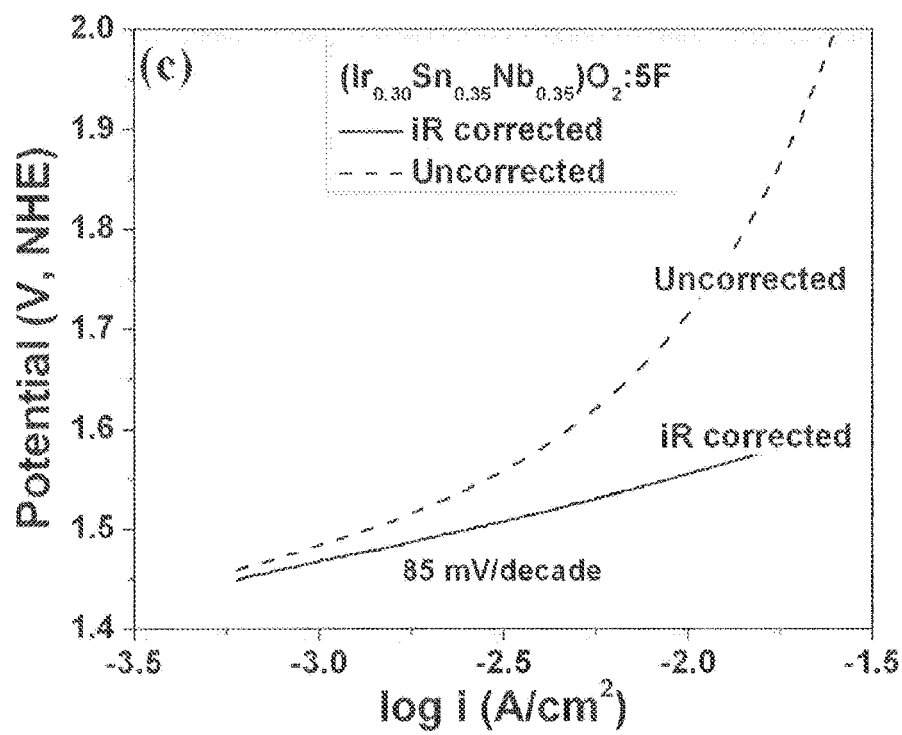
FIG. 48c is a Tafel plot of $(Ir,Sn,Nb)O_2$:5 wt. % F before and after iRΩ correction showing a tafel slope ~85 mV/dec.
Figure 48D:
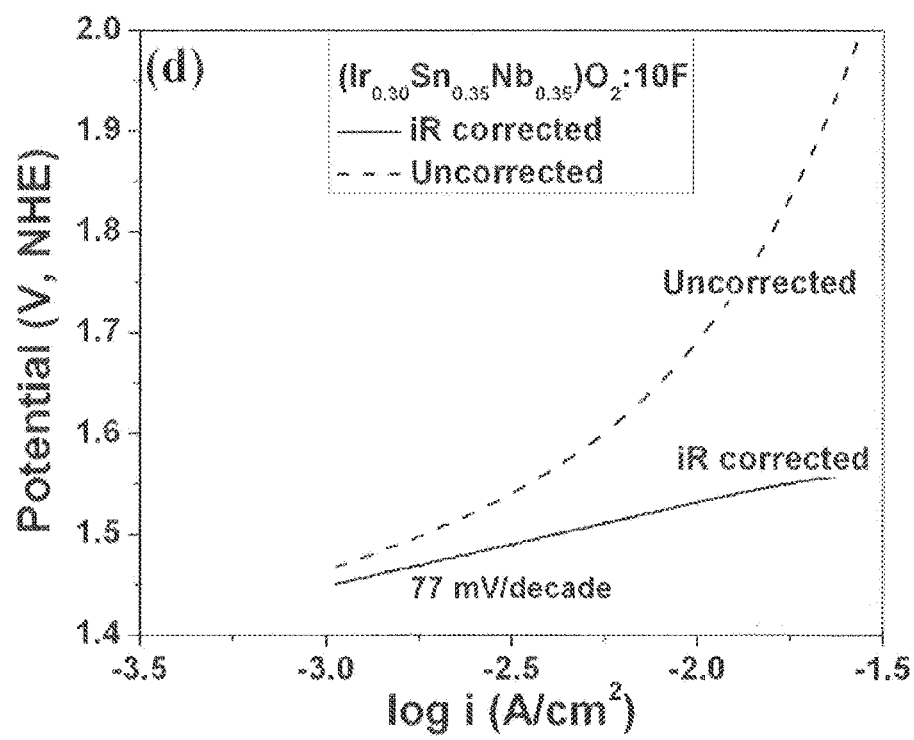
FIG. 48d is a Tafel plot of $(Ir,Sn,Nb)O_2$:10 wt. % F before and after iRΩ correction showing a tafel slope ~77 mV/dec.

FIG. 47a showed the polarization curve of pure $IrO_2$ and $(Ir_{0.30}Sn_{0.35}Nb_{0.35})O_2$:F thin film with 0, 5 and 10 wt. % F, before and after ohmic resistance correction conducted at a scan rate of 1 mV/sec. Nanocrystalline pure $IrO_2$ clearly indicated that the onset of OER or water splitting occurred at a potential of ~1.43V vs. NHE. The current density at ~1.55V (vs. NHE), considered as the typically selected voltage for electrochemical activity for water electrolysis obtained from the iR corrected plot was ~0.012 A/cm² with a total loading ~0.3 mg/cm² of $IrO_2$. Assuming the transfer coefficient of ~0.5, the Tafel slope of pure $IrO_2$, calculated from the iR corrected Tafel plot (over-potential vs. log i) shown in FIG. 48a, was ~71 mV/decade, which corresponded to the well known two electron pathway reaction. The polarization curve for the various $(Ir,Sn,Nb)O_2$:F films before and after iR correction corresponding to the different compositions of F (FIGS. 47a and 47b), also showed OER occurred at a potential of ~1.43V (vs. NHE) for all the compositions. Furthermore, the current density at ~1.55V (vs. NHE) obtained from the iR corrected plot in FIG. 47a for undoped $(Ir,Sn,Nb)O_2$ solid solution (0F) with an identical total loading of ~0.3 mg/cm² was ~0.0063 A/cm² which was almost half that of pure $IrO_2$. The current density of $(Ir,Sn,Nb)O_2$:F increased with increasing F content. In fact, $(Ir,Sn,Nb)O_2$:10 wt. % F showed a current density of ~0.016 A/cm² at ~1.55V (vs. NHE) which was slightly more than that of pure $IrO_2$ (FIG. 47a) for the same identical loading of ~0.3 mg/cm². The current density decreased with continued increase in F above 10 wt. % F as shown in FIG. 47b. The Tafel slope of $(Ir,Sn,Nb)O_2$:F with 0, 5 and 10 wt. % F (Table 8), calculated from the corresponding iR corrected tafel plots, were 98, 85 and 77 mV/decade as shown in FIGS. 48b, 48c and 48d, respectively. This clearly suggested that the electrochemical activity of $(Ir,Sn,Nb)O_2$:F increased with the corresponding decrease in the Tafel slope and increase in F content up to 10 wt. %. These results indicated that $(Ir,Sn,Nb)O_2$:10 wt. % F was the optimal composition exhibiting similar electrochemical activity as that of pure $IrO_2$.

The durability of the anode electro-catalyst $(Ir,Sn,Nb)O_2$:F had been studied by chronoamperometry (CA) measurement i.e. current signal vs. time conducted at a constant potential. The CA curves of $(Ir,Sn,Nb)O_2$:F along with $IrO_2$, shown in FIG. 49, were obtained at a constant voltage of ~1.65V (vs. NHE without iR correction). The higher initial current for the $(Ir,Sn,Nb)O_2$:F electrodes was due to higher OER activity as demonstrated in FIG. 47. There was a sharp drop in current for the initial small period of time (~1 h) for all the electrodes tested. This may be because of dissolution of the electro-catalyst material due to irregular coatings at the edge of the mud cracks. A steady decay of current was seen after this initial period for $(Ir,Sn,Nb)O_2$:F up to 10 wt. % F which suggested that $(Ir,Sn,Nb)O_2$:F (up to 10 wt. % F) had similar long term durability as pure $IrO_2$. The steady decay of current for $(Ir,Sn,Nb)O_2$:F may have been due to continuous exhaustion of fuel. As F content was increased over 10 wt. %, the stability seemed to decrease compared to the undoped $(Ir,Sn,Nb)O_2$. ICP was conducted on the $H_2SO_4$ electrolyte solution collected after the CA curves had been recorded. $(Ir,Sn,Nb)O_2$:10 wt. % F showed no Ir, ~0.15 ppm of Sn and ~0.15 ppm of Nb. Pure $IrO_2$ electro-catalyst also did not show any Ir leached out into the solution. However, the $(Ir,Sn,Nb)O_2$ electro-catalyst with 15 wt. % F dopant showed ~0.27 ppm of Ir, ~0.33 ppm of Sn and ~0.24 ppm of Nb in the solution after CA clearly reflected a more unstable catalyst. It successfully identified $(Ir_{0.30}Sn_{0.35}Nb_{0.35})O_2$:10 wt. % F as a promising anode electro-catalyst material that improved the catalytic activity and did not compromise the electrochemical stability. It is expected that the $(Ir,Sn,Nb)O_2$:F catalysts exhibit significant reduction in the overall costs of PEM electrolyzers.

Computational Study Results

Figure 50:
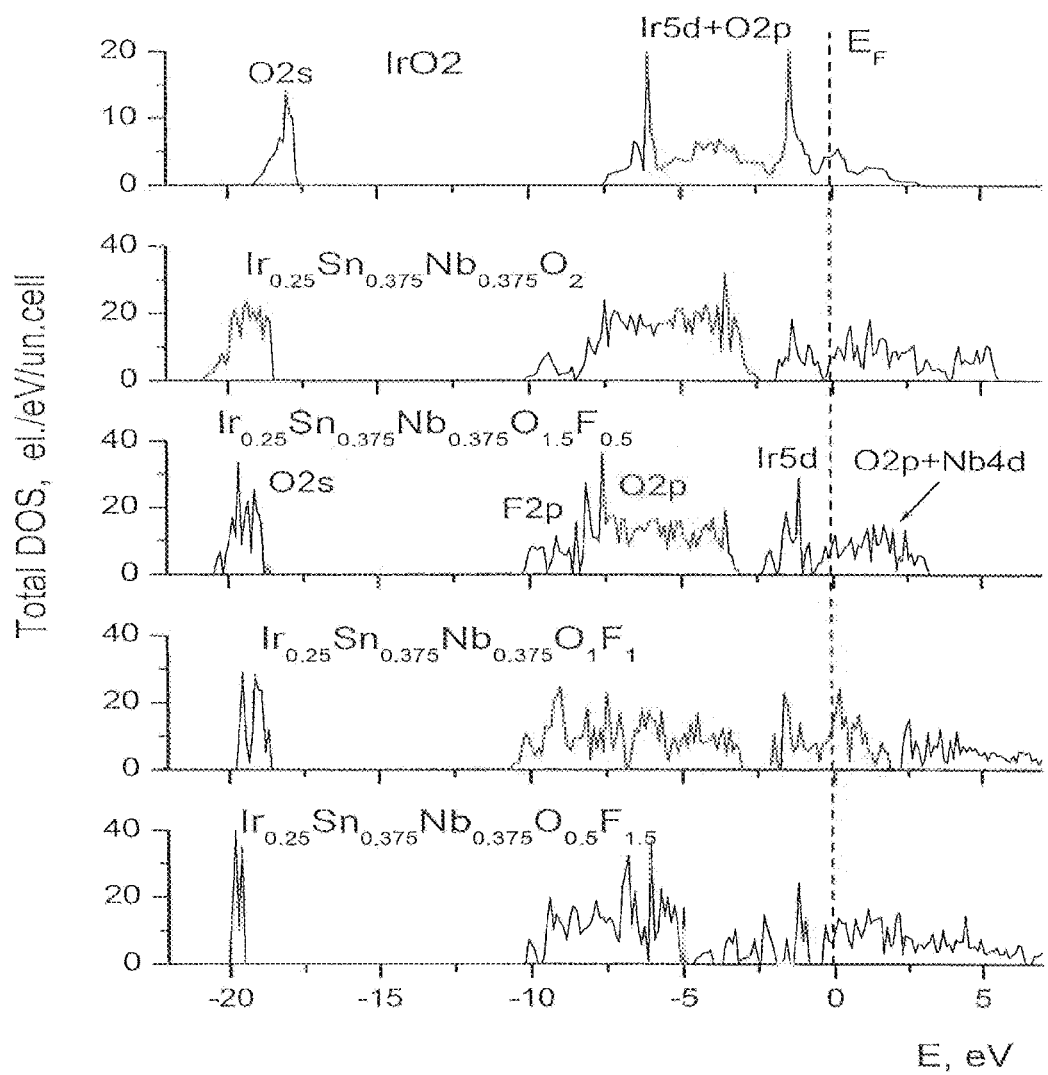
FIG. 50 is a plot of total bulk density of electronic states for pure $IrO_2$ and $(Ir_{0.25}Sn_{0.375}Nb_{0.375})O_2$-xFx (x=0, 0.5, 1, 1.5)

FIG. 50 showed the total densities of electronic states calculated for pure $IrO_2$ and all solid solutions considered in the study. The $IrO_2$ band structure consisted of two main bands. The 2s states of oxygen were in the low energy band between −17.5 and −19.2 eV. Around the Fermi level, there was a wide valence band which has hybridized O 2p-Ir 5d states. O 2p and Ir 5d states had 2 prominent peaks that provided the metallic type of electronic conductivity to $IrO_2$. Tin, niobium and fluorine had been introduced into the $IrO_2$ matrix which noticeably changed the electronic structures of the compounds along with all major projected electronic states denoted with corresponding orbital numbers. It was observed (FIG. 50) that all the materials remained metallic, although to different extents.

Figure 51:
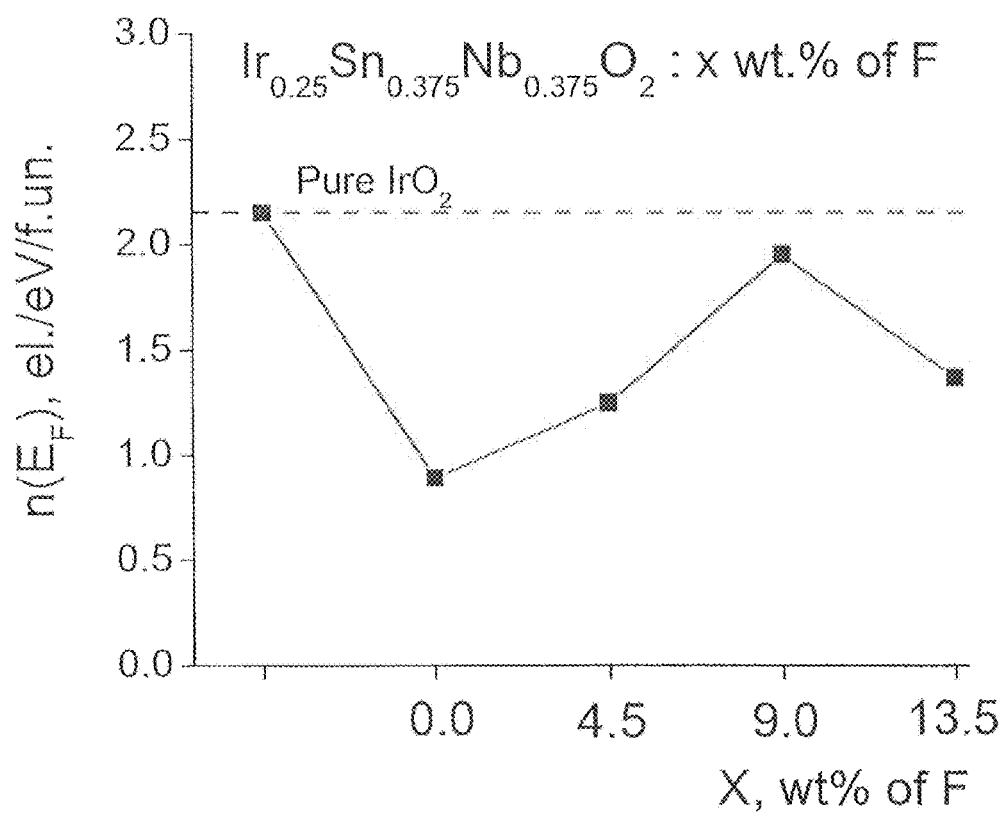
FIG. 51 is a plot of total bulk density of states at Fermi level for $IrO_2$ and $(Ir_{0.25}Sn_{0.375}Nb_{0.375})O_2$-xFx (x=0, 0.5, 1, 1.5)

It is well known that the metallic conductivity of a material is proportional to the density of states at Fermi level $n(E_F)$. This provided an opportunity for understanding and evaluating the correlation between chemical compositions of materials and their electronic conductivity. FIG. 51 showed the dependence of $n(E_F)$ vs. composition of $(Ir_{0.25}Sn_{0.375}Nb_{0.375})O_{2-x}F_x$. It is noted that the values of $n(E_F)$ had been normalized to electrons per one $(Ir_{0.25}Sn_{0.375}Nb_{0.375})O_{2-x}F_x$ formula unit for comparison. The value of $n(E_F)$ for pure $IrO_2$ was marked with a dash horizontal line as a benchmark of the electronic conductivity. FIG. 50 clearly showed that there was a drastic decrease in conductivity for 25% $IrO_2$. Such a drop in the electronic conductivity was expected due to presence of substantial amount of $SnO_2$ known to be a very poor conductor with a high band gap of 3.6 eV. Introduction of fluorine improved the overall conductivity reaching an optimal value at ~9-10 wt. % of F (FIG. 51). It agreed well with different theoretical studies and experimental validation for F doped tin oxide; wherein significant improvement in the electronic conductivity of $SnO_2$ was observed with introduction of ~10 wt. % of F due to an increase of the charge carriers concentration in the system. Since a necessary condition for excellent catalytic activity of the system was high electronic conductivity, the dependence showed in FIG. 51 may explain to some extent the intrinsic reasons of high electrocatalytic activity of the $(Ir_{0.3}Sn_{0.35}Nb_{0.35})O_2$:10 wt. % F solid solution.

Another aspect considered in the computational part relates to the catalytic activity of the surface being qualitatively characterized by the simple descriptor obtained from the electronic structure of the material. Such a descriptor was determined as a position of a gravity center of d-band of the metal $\varepsilon_d$ located usually in the vicinity of the Fermi level. The optimal position of the d-band center would provided, in turn, the optimal interaction between the surface and various species during catalytic water splitting on the surface leading to a maximum possible catalytic activity of the particular material. Hence, if an appropriate adjustment to the d-band center position with respect to the Fermi level was done, it likely would be critical in contributing to the design of novel highly active and electrochemically stable electro-catalysts.

Calculations were done for the electronic structure of the stable surfaces for all the mentioned $(Ir,Sn,Nb)O_2$ and the positions of corresponding d-bands centers had been obtained as a first moment of $n_d(E)$: $\varepsilon_d = \int n_d(E)EdE / \int n_d(E)dE$, where $n_d(E)$ is a sum of projected densities of d-electrons of Ir, Sn and Nb.

Figure 52:
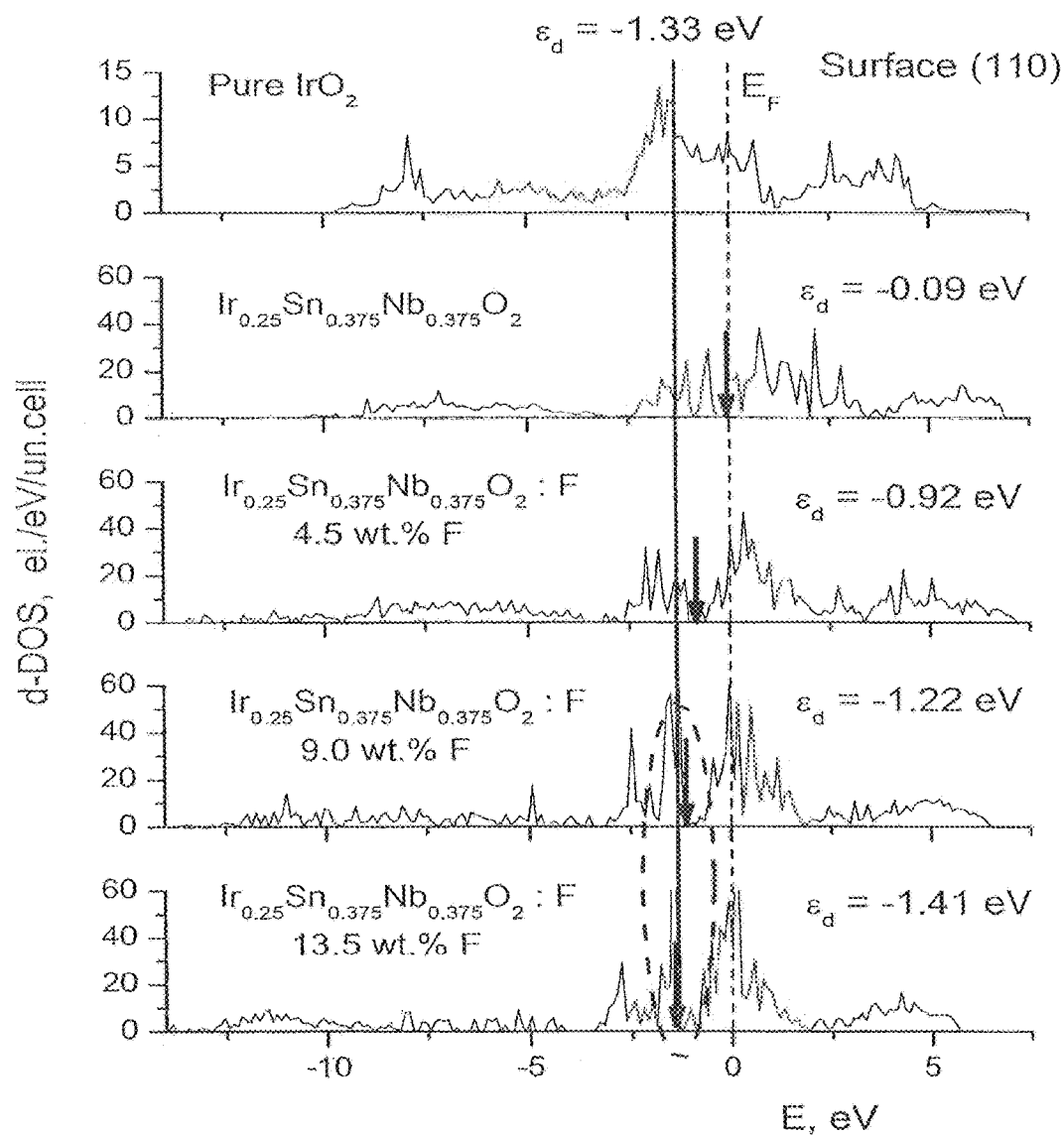
FIG. 52 is a plot of surface d-band projected DOS for $IrO_2$ and $(Ir_{0.25}Sn_{0.375}Nb_{0.375})O_2$-xFx (x=0, 0.5, 1, 1.5) wherein arrows denote positions of d-band centers εd.

FIG. 52 showed the projected sums of Ir, Sn and Nb d-band densities of states with their corresponding centers (blue arrows shown in FIG. 52). It was seen that the d-center for pure IrO$_2$ was located at ~1.33 eV below the Fermi level. This position was considered as a reference point for comparison of the catalytic activities of the other oxides. Substantial reduction of Ir content (up to 25 at %) along with an introduction of Sn- and Nb-electronic states led to a shift of the d-band center up to the position at −0.09 eV below the Fermi level. This clearly indicated that an overall chemisorption reaction of various species at the surface was quite stronger for (Ir$_{0.25}$Sn$_{0.375}$Nb$_{0.375}$)O$_2$ rather than for pure IrO$_2$.

Assuming pure IrO$_2$ as the gold standard OER catalyst, it demonstrated optimal activity as a catalyst at $\varepsilon_d$=−1.33 eV. It was suggested that the decrease in electrochemical activity seen in (Ir$_{0.30}$Sn$_{0.35}$Nb$_{0.35}$)O$_2$ electrode (FIG. 47a) may be due to the d-band center being at a more positive value and reducing the catalytic activity with respect to IrO$_2$. This shift in the d-band center could be attributed to an introduction of the additional Sn- and Nb-electronic states contributing to the total d-band of the system during formation of (Ir,Sn,Nb)O$_2$ solid solution. Further consideration of the effect of fluorine doping on the overall catalytic activity of the materials was conducted in terms of a change of the electronic structure of the compounds in general, and a shift in the position of the d-band center in particular.

Figure 53A:
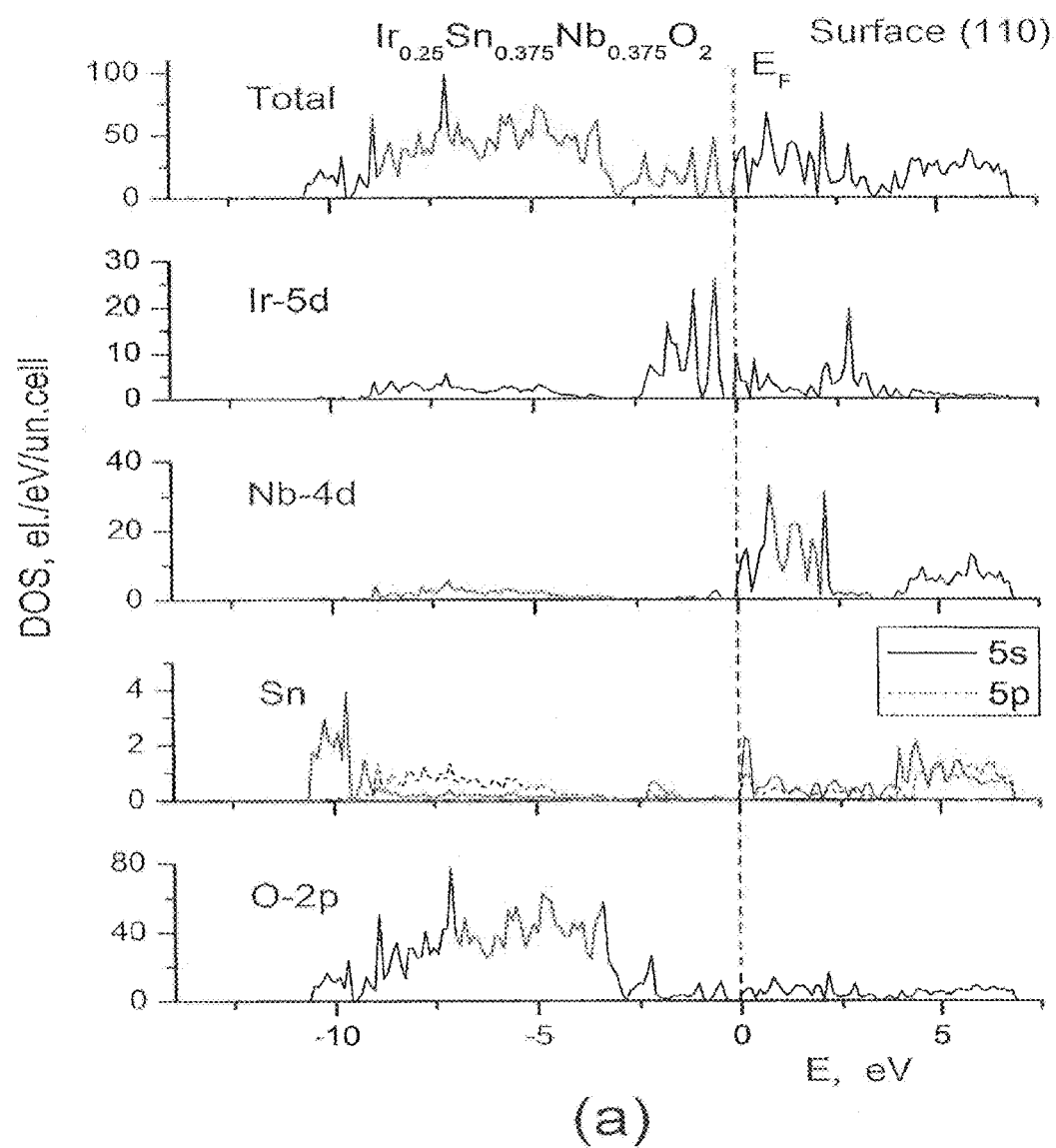
FIG. 53a is a plot of surface total and projected DOS for $(Ir_{0.25}Sn_{0.375}Nb_{0.375})O_2$.
Figure 53B:
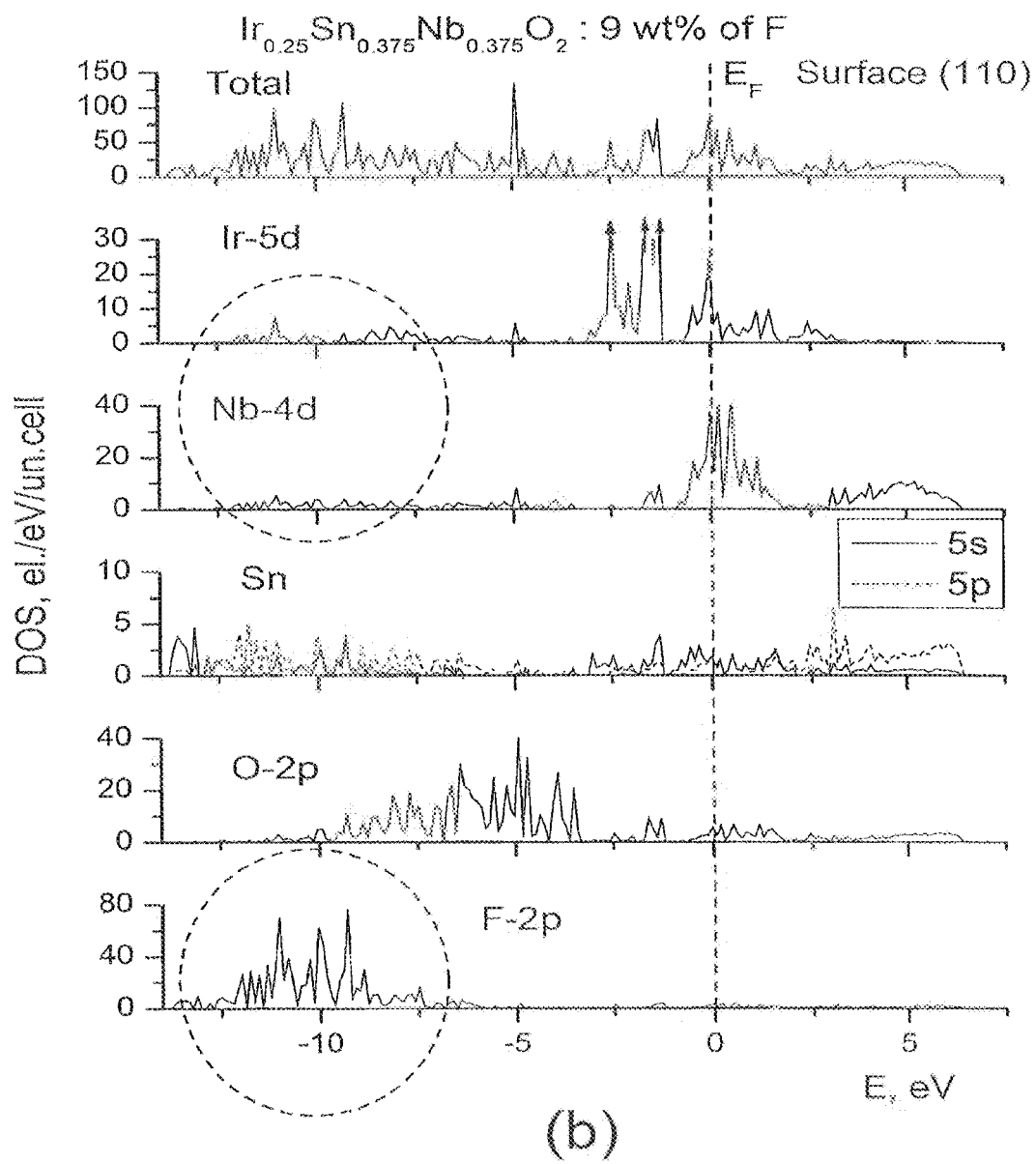
FIG. 53b is a plot of surface total and projected DOS for $(Ir_{0.25}Sn_{0.375}Nb_{0.375})O_1F_1$.

FIGS. 53a and 53b shows the total and projected DOS of (Ir$_{0.25}$Sn$_{0.375}$Nb$_{0.375}$)O$_2$ and (Ir$_{0.25}$Sn$_{0.375}$Nb$_{0.375}$)O$_1$F$_1$ oxides, respectively. Introduction of fluorine manifested in an appearance of the F 2p-band around −10 eV with negligible amount of other states in the entire energy domain (FIG. 53b). Increase in F-content resulted in a more pronounced 2p states leading to a stronger hybridization effect between F 2p- and Ir 5d- and Nb 4d-states. As a result, the overall d-band center location moved from −0.09 eV for the non-fluorine composition downward towards the position corresponding to pure IrO$_2$ (−1.33 eV) with increase in F content. It was observed from FIG. 52 that at 4.5, 9.0, and 13.5 wt. % F, the d-band center passed accordingly through −0.92, −1.22, and −1.41 eV positions, respectively, indicating significant improvement in the overall catalytic activity with increase in F concentration. The optimal F concentration at which the d-center of (Ir,Sn,Nb)O$_2$:F returned back to the position corresponding to pure IrO$_2$ expected to be around 10-12 wt. % of F which was in excellent agreement with the experimental results.

Figure 49:
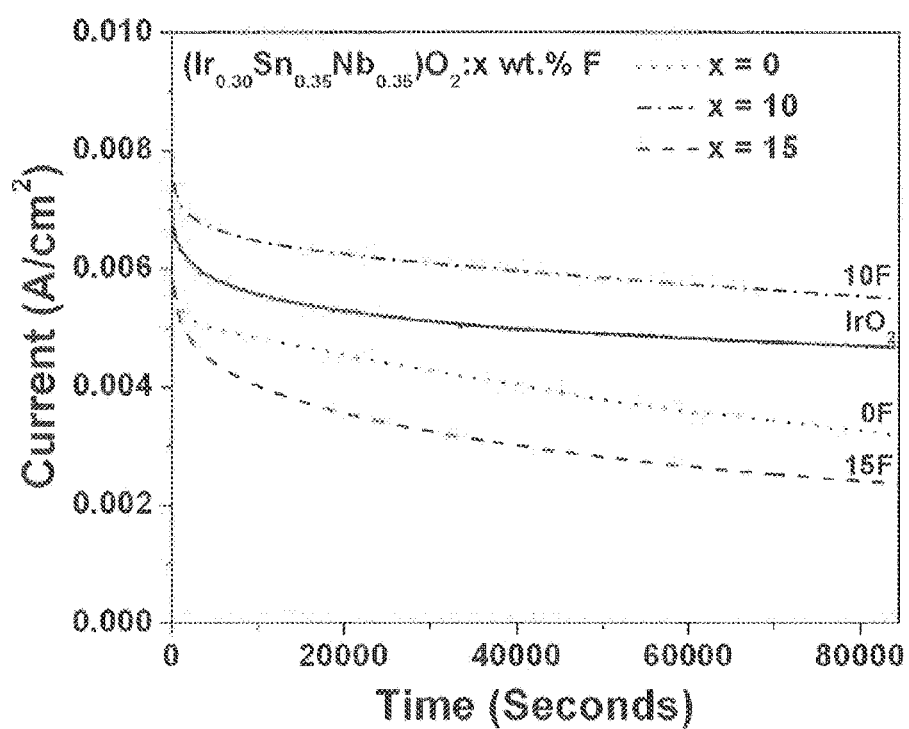
FIG. 49 is a plot of variation of current vs. time (chronoamperometry measurement) of pure $IrO_2$ and $(Ir_{0.30}Sn_{0.35}Nb_{0.35})O_2$:F performed in a 1N $H_2SO_4$ solution under 1.65V at 40° C.
Figure 54:
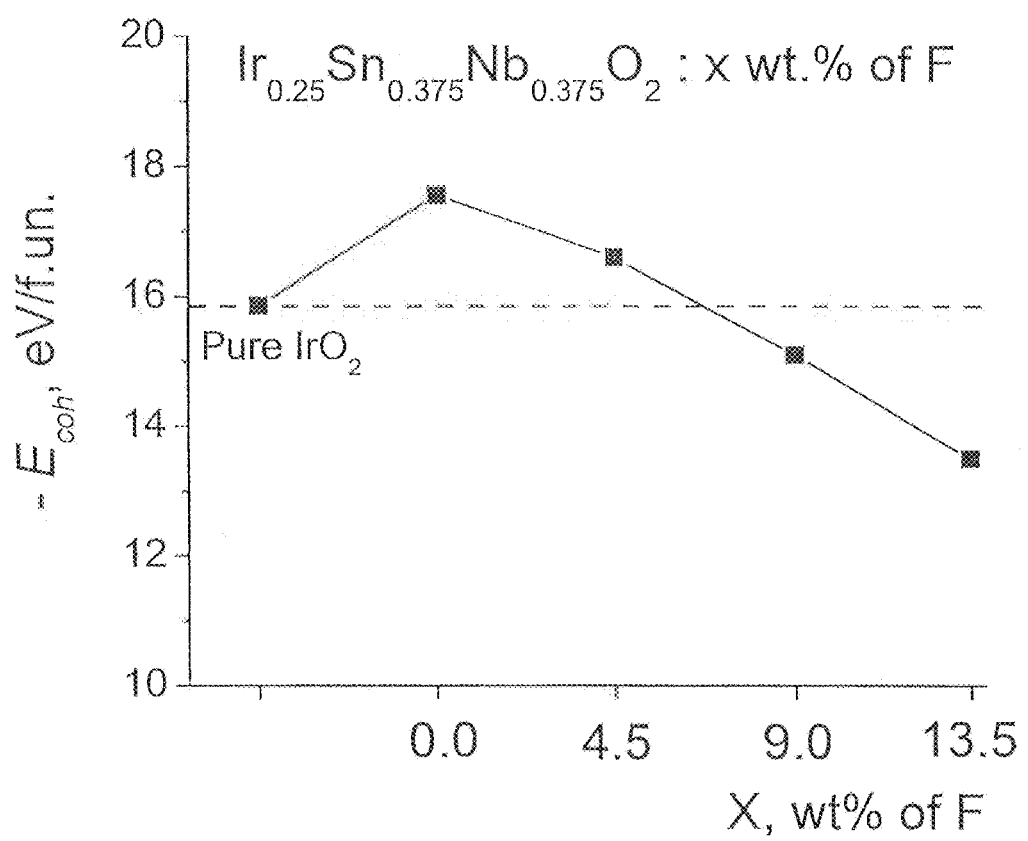
FIG. 54 is a plot of cohesive energy (−Ecoh) in eV per formula unit for pure $IrO_2$ and $(Ir_{0.25}Sn_{0.375}Nb_{0.375})O_2$-xFx.

The calculation of cohesive energy (E$_{coh}$) for the materials considered was plotted in FIG. 54. It is observed that with reduced Ir concentration and simultaneous increase of Sn and Nb content in the catalyst material led to a more negative value of E$_{coh}$. This was attributed to the formation of Nb—O bonds which were more strong than Ir—O (calculated E$_{coh}$ for pure NbO$_2$ is −18.251 eV/f·un. vs. −15.859 eV/f·un. for IrO$_2$). Introduction of F led to a gradual decrease in the cohesive energy (absolute value) due to weaker metal-F$^-$ bonds in comparison with corresponding metal-O$^{2-}$ ones (the lower negative charge of F$^-$ leads to the weaker electrostatic metal-fluorine interaction). Such a negative effect of F doping did not significantly affect the overall stability of the material. As shown in FIG. 54, E$_{coh}$ of the F doped (Ir,Sn,Nb)O$_2$ was equal to that of pure IrO$_2$ approximately at 7 wt. % of F. Further increase in F content resulted in the material displaying less stability compared to pure IrO$_2$. Although the optimal composition of the oxide with ~10 wt. % F demonstrated slightly lower E$_{coh}$ than the reference IrO$_2$, the overall stability of the material (qualitatively determined by the cohesive energy) was of the same order as pure IrO$_2$. This conclusion also agreed with the experimental results obtained from the CA curves as shown in FIG. 49.

Conclusions

Nanostructured thin films were synthesized on a Ti foil comprising a solid solution of F along with IrO$_2$, SnO$_2$ and NbO$_2$ to obtain F doped (Ir,Sn,Nb)O$_2$ electro-catalyst, and were evaluated as a promising anode electro-catalyst for OER in PEM-based water electrolysis. The molar volume of different compositions of (Ir,Sn,Nb)O$_2$:F was comparable to pure IrO$_2$ indicating that F$^-$ ion substitution/doping had no significant effect on the molar volume. The electrochemical performance of (Ir$_{0.30}$Sn$_{0.35}$Nb$_{0.35}$)O$_2$: x wt. % F with x varying from 0 to 20 as a promising oxygen evolution electro-catalyst had been done using 1N H$_2$SO$_4$ as a fuel at 40° C. The electrocatalytic activity measured at ~1.55V (vs. NHE) after iR correction, showed an increase in electrochemical performance with increase in F up to 10 wt. % F. (Ir,Sn,Nb)O$_2$:10 wt. % F showed ~26.7% higher current and much greater stability compared to undoped (Ir,Sn,Nb)O$_2$. As we increased the F content to 15 and 20 wt %, the activity and stability dropped yielding the optimum activity and stability at 10 wt. % F doping. The excellent electrochemical activity and durability exhibited by (Ir$_{0.30}$Sn$_{0.35}$Nb$_{0.35}$)O$_2$: 10 wt. % F rendered it an excellent material for its use as an anode in PEM-based electrolysis. Complementary theoretical studies conducted have demonstrated good correlation between the electronic structure peculiarities of the material and its excellent electrocatalytic properties that are in agreement with the comprehensive experimental observations.

TABLE 8

Impedance parameters and Tafel slope of IrO$_2$ and (Ir, Sn, Nb)O$_2$:F obtained by fitting the experimental EIS data and Tafel plot, respectively.

| Electrocatalyst composition | R$_s$ (Ω) | R$_{ct}$ (Ω) | Tafel slope (mV/dec) |
|---|---|---|---|
| IrO$_2$ | 13.84 | 6.48 | 71 |
| (Ir$_{0.30}$Sn$_{0.35}$Nb$_{0.35}$)O$_2$ | 14.02 | 23.75 | 98 |
| (Ir$_{0.30}$Sn$_{0.35}$Nb$_{0.35}$)O$_2$:5 wt. % F | 13.69 | 11.99 | 85 |
| (Ir$_{0.30}$Sn$_{0.35}$Nb$_{0.35}$)O$_2$:10 wt. % F | 13.87 | 9.98 | 77 |
| (Ir$_{0.30}$Sn$_{0.35}$Nb$_{0.35}$)O$_2$:15 wt. % F | 13.48 | 15.18 | 102 |
| (Ir$_{0.30}$Sn$_{0.35}$Nb$_{0.35}$)O$_2$:20 wt. % F | 13.55 | 16.73 | 106 |

The invention claimed is:

1. An electro-catalyst composition for an anode electrode of a proton exchange membrane-based water electrolysis system, comprising:
 a noble metal component of iridium oxide;
 a non-noble metal component selected from the group consisting of tantalum oxide, tin oxide, niobium oxide, titanium oxide, tungsten oxide, molybdenum oxide, yttrium oxide, scandium oxide, copper oxide, zirconium oxide, nickel oxide and mixtures thereof;
 optionally, a dopant; and
 the electro-catalyst composition having one of the following general formulas:

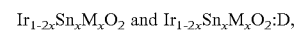

Ir$_{1-2x}$Sn$_x$M$_x$O$_2$ and Ir$_{1-2x}$Sn$_x$M$_x$O$_2$:D, wherein M represents Nb, Ta, Ti, W, Mo, Y, Sc, Cu, Zr, Ni and mixtures thereof, D represents at least one element of Groups III, V, VI and VII of the Periodic Table, and x is a value from greater than 0 to 49.5% based on weight of the composition, wherein the electro-catalyst composition is in a form selected from an oxide alloy and a solid solution, and wherein the electro-catalyst composition exhibits an electronic structure that mimics a noble metal oxide electro-catalyst composition absent of a non-noble metal.

2. The composition of claim 1, wherein the dopant is selected from the group consisting of fluorine, chlorine, bromine, iodine, sulfur, selenium, tellurium and mixtures thereof.

3. The composition of claim 1, wherein the dopant is present in an amount from greater than 0 to 20 weight percent based on weight of the composition.

4. The composition of claim 1, wherein the non-noble metal component and the noble metal component form a complete solid solution.

5. The composition of claim 1, wherein the composition is in the form of a nanocrystalline thin film, nanorods, nanoplates, nanoshells, nanoflakes, nanorods, nanospheres, or any nano-scale morphology coated on a current collector substrate.

* * * * *